(12) United States Patent
Martello

(10) Patent No.: US 10,078,499 B2
(45) Date of Patent: Sep. 18, 2018

(54) SYSTEM AND METHOD FOR MANIPULATING AND DISPLAYING DATA

(71) Applicant: Anthony Martello, Tempe, AZ (US)

(72) Inventor: Anthony Martello, Tempe, AZ (US)

( * ) Notice: Subject to any disclaimer, the term of this patent is extended or adjusted under 35 U.S.C. 154(b) by 151 days.

(21) Appl. No.: 14/833,024

(22) Filed: Aug. 21, 2015

(65) Prior Publication Data

US 2016/0266738 A1  Sep. 15, 2016

Related U.S. Application Data

(63) Continuation-in-part of application No. 14/644,196, filed on Mar. 10, 2015.

(51) Int. Cl.
| | |
|---|---|
| *G06F 3/00* | (2006.01) |
| *G06F 8/34* | (2018.01) |
| *G06F 17/24* | (2006.01) |
| *G06F 17/30* | (2006.01) |
| *G06F 17/22* | (2006.01) |

(52) U.S. Cl.
CPC ............ *G06F 8/34* (2013.01); *G06F 17/2241* (2013.01); *G06F 17/245* (2013.01); *G06F 17/246* (2013.01); *G06F 17/30* (2013.01)

(58) Field of Classification Search
CPC . G06F 3/0482; G06F 17/30554; G06F 3/0481
See application file for complete search history.

(56) References Cited

U.S. PATENT DOCUMENTS

| | | | | |
|---|---|---|---|---|
| 5,262,761 A | * | 11/1993 | Scandura | ............... G06F 3/0481 345/581 |
| 5,606,654 A | * | 2/1997 | Schuur | ..................... G09G 5/00 345/440 |
| 6,275,976 B1 | * | 8/2001 | Scandura | ............ G06F 11/3608 714/E11.208 |
| 2010/0333036 A1 | * | 12/2010 | Matsuyama | ....... H04N 5/44543 715/835 |

* cited by examiner

*Primary Examiner* — Haoshian Shih
(74) *Attorney, Agent, or Firm* — Wright Law Group, PLLC; Mark F. Wright

(57) ABSTRACT

The various implementations of the present invention are provided as a computer-based system for manipulating and displaying data. The system can be deployed as a keyword research tool configured pull keywords into the system from a variety of sources such as through various application programming interfaces ("API"), allow the user to copy and paste, import via a file format such as CSV, etc. or enter seed keywords that our system uses to find related keyword phrases from an internal database or external database via an application programming interface ("API"). The keywords are displayed to the user in groups with associated grouping blocks that will most often include blocks in the shape of an "inverted L" configuration to provide maximum utility. In the most preferred embodiments of the present invention, each keyword also comprises a plurality of associated metrics such as search volume, cost per click, competition level, etc. The grouping block is a general purpose invention that can be utilized in a variety of areas where grouping hierarchical information is required.

19 Claims, 53 Drawing Sheets

| cheap = affordable = inexpensive | cheap car insurance quotes online | 320 | $48.20 | 24 | .97 |
| | cheap auto insurance quotes online | 20 | 0 | 9 | .83 |
| | che | 0 | 0 | | |
| | cheap on-line automobile insurance | 0 | 0 | 1 | 0 |

FIG. 11

| Group Hierarchy | | | | Page URL | Traffic | PA | Keyword | Comp |
|---|---|---|---|---|---|---|---|---|
| car | insur | quote | | /car-insurance-quotes | 1376 | 65 | car insurance quotes | 42 |
| | | | | | | | car insurance quote | 73 |
| | | | | /car-insurance-online | 273 | 46 | car insurance quotes online | 65 |
| | | | | | | | online car insurance quotes | 45 |
| | | | free | /free-car-insurance | 187 | 36 | free car insurance quotes online | 63 |
| | | | | | | | free online car insurance quotes | 65 |
| | | | cheap | /cheap-car-insurance-online | 92 | 24 | cheap car insurance quotes online | 54 |
| | | | | | | | cheap online car insurance quotes | 65 |
| | | cheap | | /cheap-car-insurance | 320 | 62 | cheap car insurance quotes | 32 |
| | | | | | | | cheap car insurance quote | 35 |

FIG. 14

| PageURL | Keyword | Opt | Source |
|---|---|---|---|
| / | insurance | A+ | I, GWT, C1, C2, GO, BO |
| | insurances | A- | I, GWT |
| /car-insurance | car insurance | A+ | I, GWT, C1, C2, GO |
| | auto insurance | B- | I, GWT, CB, GO |
| | car auto insurance | C | CA |

1700 →
1710 — Opt
1720 — Source

FIG. 17

| online | | |
|---|---|---|
| Vol 8,110 | | car insurance quotes online |
| CPC $45.59 | | online car insurance quotes |
| free | Vol 7,000 | free car insurance quotes online |
| | CPC $49.69 | free online car insurance quote |
| cheap | Vol 740 | cheap car insurance quotes online |
| | CPC $63.39 | cheap online car insurance quote |

| Online + (free) | | |
|---|---|---|
| Vol 8,110 | | car insurance quotes online |
| CPC $45.59 | | online car insurance quotes |
| free | Vol 7,740 | free car insurance quotes online |
| | CPC $56.54 | free online car insurance quote |
| cheap | 2040 | cheap car insurance quotes online |
| | | cheap online car insurance quote |

| (motorcycle) + (car = auto = automobile) Vol 128,256 CPC | motorcycle | | motorcycle insurance |
|---|---|---|---|
| | | | insurance motorcycle |
| | Car = auto = automobile | | car insurance |
| | | | auto insurance |
| | | | car auto insurance |
| Car = Vol 22,360 CPC $38.85 Rank 8.7 | quote | | car insurance quote |
| | | | auto insurance quote |
| | | rate | car insurance rate quote |
| | | | automobile insurance quote rates |
| | | online | auto insurance quotes online |
| | | | online auto insurance quotes |
| | | cheap | cheap car insurance quotes online |
| | | | cheap auto insurance quote online |
| | | free | car free insurance online quotes |
| | | | free car insurance quotes online |
| moto Vol 8,990 CPC $19.84 Rank 23.8 | price | | motorcycle insurance prices |
| | quote | | motorcycle insurance quote |
| | | | motorcycle insurance quotes |
| | | online | motorcycle insurance quote online |
| | rate | | motorcycle insurance rate |
| | | | motorcycle insurance rates |
| | | best | motorcycle insurance rates best |
| | | | motorcycle insurance best rates |

2510 — top section; 2520 — Car section; 2530 — moto section

| (motorcycle) + (car = auto = automobile) | motorcycle | motorcycle insurance |
| --- | --- | --- |
| | | insurance motorcycle |
| | car = auto = automobile | car insurance |
| | | auto insurance |
| | | car auto insurance |
| Car = | quote | | car insurance quote |
| | | | auto insurance quote |
| | | rate | car insurance rate quote |
| | | | automobile insurance quote rates |
| | | online | auto insurance quotes online |
| | | | online auto insurance quotes |
| | | | cheap | cheap car insurance quotes online |
| | | | | cheap auto insurance quote online |
| | | | free | car free insurance online quotes |
| | | | | free car insurance quotes online |
| moto | price | | motorcycle insurance prices |
| | quote | | motorcycle insurance quote |
| | | | motorcycle insurance quotes |
| | | online | motorcycle insurance quote online |
| | rate | | motorcycle insurance rate |
| | | | motorcycle insurance rates |
| | | best | motorcycle insurance rates best |
| | | | motorcycle insurance best rates |

Fig. 26

After

3800

| free | free car insurance quotes online |
| | free online car insurance quote |
| cheap | cheap car insurance quotes online |
| | cheap online car insurance quote |

| (cheap) + (free) | cheap 3910 | cheap car insurance quotes online |
| | | cheap online car insurance quote |
| | free 3920 | free car insurance quotes online |
| | | free online car insurance quote |

| motorcycle | motorcycle insurance |
| | insurance motorcycle |
| price | motorcycle insurance prices |
| quote | motorcycle insurance quote |
| | motorcycle insurance quotes |
| online | motorcycle insurance quote online |
| rate | motorcycle insurance rate |
| | motorcycle insurance rates |
| best | motorcycle insurance rates best |
| | motorcycle insurance best rates |

| motorcycle | motorcycle insurance |
| | insurance motorcycle |
| price | motorcycle insurance prices |
| transactional — quote | motorcycle insurance quote |
| | motorcycle insurance quotes |
| online | motorcycle insurance quote online |
| rate | motorcycle insurance rate |
| | motorcycle insurance rates |
| best | motorcycle insurance rates best |
| | motorcycle insurance best rates |

4120

```
motorcycle
  price ─ motorcycle insurance prices
  <trans ─ insurance motorcycle
  quote ─ motorcycle insurance quote
    online ─ motorcycle insurance quote online
  rate ─ motorcycle insurance rate
         motorcycle insurance rates
    best ─ motorcycle insurance rates best
           motorcycle insurance best rates
```

FIG 43

```
motorcycle
  price ─ motorcycle insurance prices
  <trans ─ insurance motorcycle
  rate ─ motorcycle insurance rate
         motorcycle insurance rates
    best ─ motorcycle insurance rates best
           motorcycle insurance best rates
  quote ─ motorcycle insurance quote
          motorcycle insurance quotes
    online ─ motorcycle insurance quote online
```

FIG 44

| online | cheap | cheap car insurance quotes online |
| | | cheap auto insurance quote online |
| | free | car free insurance online quotes |
| | | free car insurance quotes online |

FIG 45

| online | cheap | cheap car insurance quotes online |
| | | cheap auto insurance quote online |
| | free | car free insurance online quotes |
| | | free car insurance quotes online |

FIG 46

| car | insurance | | | | car insurance<br>a a car insurance |
|---|---|---|---|---|---|
| | | cheap | | | cheap car insurance<br>car insurance cheap |
| | | | company | | cheap car insurance companies<br>cheap car insurance company |
| | | | student | | cheap car insurance for students<br>cheap student car insurance |
| | | | online | | cheap car insurance online<br>cheap online car insurance |

| cheap | company | student | online | teen |

FIG 53

| cheap | online | company | student | teen |

| Hunting | Running Spiders | Foliage Runners | Anyphaenidae |
| | | | Clubionidae |
| | | | Sparassidae |
| | | Ground Runners | Lycosidae |
| | | | Dysderidae |
| | | | Gnaphosidae |
| | Stalkers/Ambushers | Stalkers | Mimetidae |
| | | | Oxyopidae |
| | | | Salticidae |
| | | Ambushers | Thomisidae |
| | | | Philodromidae |
| | | | Pisauridae |

FIG 60

```
          free   | free car insurance quotes online
                 | free online car insurance quote
          cheap  | cheap car insurance quotes online
                 | cheap online car insurance quote
```
6500

FIG. 65

```
  Cheap + free  | cheap car insurance quotes online
                | cheap online car insurance quote
                | free car insurance quotes online
                | free online car insurance quote
```
6600

FIG 66

SYSTEM AND METHOD FOR MANIPULATING AND DISPLAYING DATA

RELATED APPLICATIONS

This patent application is a continuation-in-part of U.S. patent application Ser. No. 14/644,196, which application was filed on Mar. 10, 2015 and which application is incorporated herein by reference. U.S. patent application Ser. No. 14/644,196 claims the benefit of U.S. Provisional Patent Application Ser. No. 61/950,688, which application was filed on Mar. 10, 2014 and which application is incorporated herein by reference.

BACKGROUND OF THE INVENTION

1. Technical Field

The present invention relates generally to the field of computerized searching and more specifically relates to systems and methods for manipulating and displaying data in a user-configurable fashion.

2. Background Art

With the widespread adoption and availability of the Internet, the Internet has become a valuable tool for research, shopping, entertainment, and other activities. Since the Internet now comprises billions of pages of information, it has become increasing difficult to quickly and efficiently search for and locate the desired information. To facilitate access to the information on the Internet, search engines have been developed to sort and display information to users. Most Internet search engines use proprietary algorithms to score and "rank" web pages for presentation to users with the most relevant web pages being ranked "higher" and being presented first. Since most users won't look beyond the first few pages of results for any given search, it is very important to design web pages that will rank high in the search engine results. Many Internet search engines use some form of keyword or key phrase and linking schema to provide targeted search results that are responsive to a user's search request.

Search engine optimization ("SEO") is the process of affecting the visibility of a website or a web page in a search engine's "natural" or un-paid ("organic") search results. In general, the earlier (or higher ranked on the search results page), and more frequently a site appears in the search results list, the more visitors it will receive from the search engine's users. SEO strategy may include targeting different kinds of search, including image search, local search, video search, academic search, news search and industry-specific vertical search engines.

As an Internet marketing strategy, SEO also considers how search engines work, what people search for, the actual search terms or keywords typed into search engines and which search engines are preferred by their targeted audience. Optimizing a website for SEO purposes may involve identifying relevant keywords and phrases, editing website content to include relevant keywords and phrases, modifying the hypertext markup language ("HTML") used to create the webpages at the website so as to include relevant keywords and phrases, and the associated coding to both increase its relevance to specific keywords and to remove barriers to the indexing activities of search engines.

To assist in identifying and analyzing relevant keywords and phrases, Internet marketing and SEO professionals will frequently use various keyword research tools. A keyword research tool is a software program that takes a starting or "seed" keyword or phrase (e.g., "cheap car insurance") and, using the seed, returns a list of related keywords and phrases. In general, the results are generally retrieved from a data source specifically developed for this purpose. In many cases, each returned keyword or phrase will also have metrics such as search volume, cost per click, competition level, etc. This information helps the user determine which keywords they want to target for inclusion in search engines searches. These tools generally offer a method for the person to select the words of interest and place them on a shortlist or to remove keywords from consideration if they are not of interest for a specific application.

SEO professionals will often spend a significant amount of time ensuring that their webpages are optimized for the most relevant keywords used in searches so that targeted traffic will be sent to the desired website pages. Entire websites may be designed for specific keyword and phrases, anticipating exactly what keywords and phrases will be used to search for the products or services advertised at the target website. Also, Internet marketers optimize informational webpages on a site with the intention of earning the visitors business at a later time or by generating revenue from advertising. While SEO optimization can increase the probability of higher search engine rankings, there are limits to the effectiveness of the processes and procedures used to identify the best keywords and phrases that will drive traffic to the website.

For example, many people search the Internet for "auto insurance" when they really are looking for "car insurance" as opposed to "truck insurance" or "motorcycle insurance." An Internet marketing professional would likely want to consider the keywords "auto" and "car" as equivalent. It is common to set synonym equivalencies by manually entering them into the system and letting the algorithm utilize this data. But even in this case there are situations where this will be unlikely to provide the desired results. A pre-configured search phrase such as "auto insurance for two wheel vehicles" may logically be associated with the "motorcycle insurance" category and produce search results targeted towards motorcycle insurance, even though in practice a person may be searching for "moped insurance." Another potential limitation of keyword grouping theory is the possible desire to include an item in a group although it does not hierarchically fit in that group. For example, a search engine marketer may designate a page to target "car insurance" but a search engine such as Google® not only ranks that page for car insurance related terms but may also rank it very high for "truck insurance deals" even though there is already another page dedicated to "truck insurance" which is not ranking highly for this keyword. The Internet marketer may want to manually assign the keyword to the page that it is currently highly ranking on. Of course those skilled in the art will recognize that the algorithm could be modified to account for this type of variation but there will always be some cases where an algorithm can't account for so manual adjustment will almost always be a functional requirement.

The same is true for groups and not just items. A user may have a reason for manually combining groups that the algorithm did not put together. For example, the algorithm may create two separate groups such as "car insurance for women" and "ladies car insurance." Manually combining these groups makes sense if the algorithm was not designed to automatically due so.

Since grouping information such as keywords often involves working with large numbers of items at a time (as many as several thousand) allowing the user to quickly and easily manipulate this data is important to promote maximum productivity. Many current tools have cumbersome methods for manually overriding defaults such as requiring the user to click a checkbox next to the item in question, click a menu to select an action, and then click a button to execute that action. Doing this dozens or hundreds of times makes the work burdensome. Many tools that group keywords put the keywords into individual folders making it impossible to view all of the keywords in one grouped list. Most commonly keyword research tools display the results in a single ungrouped list making the process of deciphering and using the results in the decision-making process less than intuitive.

These, and other similar limitations, make the process of identifying and selecting the best keywords to drive Internet traffic less efficient and effective than it might be. Accordingly, without improvements in the current systems, procedures, and methods for working with search engine tools, the ability to effectively and efficiently ensure that Internet marketers and SEO professionals are able to retrieve and display important information such as keywords and phrases will continue to be sub-optimal.

BRIEF SUMMARY OF THE INVENTION

The various implementations of the present invention are provided as a computer-based system for manipulating and displaying data. The system can be deployed as a keyword research tool configured to take imported keywords from a variety of internal, external and client provide sources as well as allowing the user to enter seed keyword phrases (e.g., "cheap car insurance") and create a list of related keyword phrases from an internal database or external database via an application programming interface ("API"). Keywords from all sources are combined into a single list with no duplicate keywords. The keywords are most preferably displayed to the user in a single list with grouping symbols (called grouping blocks) to the side of the keywords. The most useful form of grouping block is in the shape of an "inverted L", referred to as an "L-block", to provide maximum utility. In the most preferred embodiments of the present invention, each keyword also comprises a plurality of associated metrics such as search volume, cost per click, competition level, etc.

Some of the most salient features of the present invention include:
  Automatic grouping into mutually exclusive and hierarchical groupings
  Visual keyword groupings presented to the user in a graphical user interface with "grouping blocks" of various shapes including rectangular as well as those that look like an inverted "L."
  Grouping blocks contain tools (via icons or context menu) that provide functionality to the block that allows the user to perform functions on the data in or related to each group.
  Tools to operate on grouping blocks individually or in combination.
  Ability to change the view of a grouping block.
  Ability to control which blocks display to the user at any one time.
  Manual override of automatic groupings with a drag and drop functionality implemented in the graphical user interface. Groupings can be manually combined by dragging and dropping a grouping onto another. For example, a "motorcycle insurance" keyword group could be dragged onto a "truck insurance" group to form a "motorcycle/truck" insurance group if such a need arised. Additionally, individual keywords can be moved to different groups via drag and drop functionality.
  Manual addition and deletion of individual keywords.
  Manual addition and deletion of keywords in bulk.
  Manual tagging of groups to indicate the user's interest or state in their process in each group. For example, users can tag a group to add it to a "short list" of terms they are considering targeting. Using "color tagging"
  Ability to view groups based on tagged state.
  Different types of grouping blocks: Semantic and category. For semantic blocks the hierarchical relationship they display is based on the relationship of the words in their defining terms which is directly related to the individual words in each keyword phrase. For example "car insurance quotes" is in a semantic subgroup of "car insurance" because of the relationship of the words in the phrase itself. Category based blocks where the subblocks of a particular block are based on categorical relationship. For example, a subgroup "slip and fall" is a subcategory of "personal injury." Another example is "Greenwich" is a subcategory of "Connecticut" since it is a town in Connecticut.
  Drag & drop functionality of grouping block. To combine blocks or move blocks.

Some of the other unique features of the present invention include:
  Grouping blocks display summary information about the group. Example, total search volume for the keywords in the group. There are two varieties of this summary data: regarding an individual group and regarding all groups within the scope of a grouping block.
  Grouping blocks display the word or phrase that defines the grouping.
  Ability to manually modify the automatically generated hierarchy order. Example change Car>insurance>cheap>teen to Car>insurance>teen>cheap Some additional features of the graphical user interface for the present invention include:
  Equivalent terms input box—A graphical user element that allows the user to indicate synonyms to be used by the grouping algorithm when determining which group to put a keyword in. Example the command ["car"="auto"="automobile"] would cause the algorithm to treat each of these three words as equivalent words and the grouping algorithm would treat them as if they were the same word.
  Required terms input box—A graphical user element that allows the user to indicate words that must appear in each keyword phrase in the list returned by the algorithm. Example, if the term "insurance" were included in the required terms input box, it would ensure that all keyword phrases displayed to the user included this word.
  Negative terms input box—A graphical user element that allows the user to eliminate keyword phrases from the initially presented list that contain one of the indicated words. For example, including the word "truck" in the negative terms input box would ensure that no keyword phrase such as "truck insurance" would appear in the list generated by the algorithm and these phrases would be excluded from the display.
    Collapsible grouping blocks—Clicking on a small arrow or other icon (e.g., "+" or "−" sign, etc.) will alternatively collapse or expand the group to allow the user to show root page's keywords only.

Tagging system to allow the user indicate their level of interest in a particular group to aid in the process of narrowing the list of keywords.

Some additional functionality of the present invention that aid in its utility:

Integration with external data sources such as those that provide keywords or keyword related data, webpage data, etc.

Providing multiple methods for the user to add keywords to a project.

A visual counter that displays how many keywords are in the project, how many groups are in the project, how many keywords are visually displayed to the user and how many groups are visually displayed to the user.

Ability to display webpage level data such as the number of visitors to a page so that that number is clearly associated with the group of keywords assigned to the page.

Ability to control how much data is pulled into the project from various sources to help the user control project size or manage data related to their available data usage limits.

Processing seed keywords through a synonym finder that identifies exact synonyms such that they represent the exact same object or idea in reality. Commonly referred to as entities in programmer parlance.

BRIEF DESCRIPTION OF THE FIGURES

The preferred embodiments of the present invention will hereinafter be described in conjunction with the appended drawings, wherein like designations denote like elements, and:

FIG. 11 is a schematic representation of grouping blocks and UI controls for a user interface element for manipulating and displaying data in accordance with a preferred exemplary embodiment of the present invention—this diagram illustrates functionality for inserting an item into a page group manually;

FIG. 14 is a schematic representation of grouping blocks and UI controls for a user interface element for manipulating and displaying data in accordance with a preferred exemplary embodiment of the present invention—illustrates data columns which display website specific data;

FIG. 17 is a schematic representation of the data grid illustrating the columns for on-page optimization score and item (keyword) sources used in conjunction with a user interface element for manipulating and displaying data in accordance with a preferred exemplary embodiment of the present invention;

FIG. 19 is a schematic representation illustrating a user interface element for manipulating and displaying data in accordance with a preferred exemplary embodiment of the present invention—diagram illustrates the before state of the user action of clicking and dragging a grouping block's horizontal leg to another grouping block's horizontal leg in a parent/child block relationship;

FIG. 20 is a schematic representation illustrating a user interface element for manipulating and displaying data in accordance with a preferred exemplary embodiment of the present invention—diagram illustrates the after state of the user action of clicking and dragging a grouping block's horizontal leg to another grouping block's horizontal leg in a parent/child block relationship;

FIG. 25 is the same as FIG. 24 but highlights the effect on the grouping block's summary data.

FIG. 26 is a schematic representation illustrating a user interface element for manipulating and displaying data in accordance with a preferred exemplary embodiment of the present invention—illustrates that subpage blocks can be recombined with vertical leg grouping blocks;

FIG. 38 is a schematic representation illustrating a user interface element for manipulating and displaying data in accordance with a preferred exemplary embodiment of the present invention—illustrates the before state for the combination of two "horizontal only" grouping blocks at the same level of the hierarchy;

FIG. 39 is a schematic representation illustrating a user interface element for manipulating and displaying data in accordance with a preferred exemplary embodiment of the present invention—illustrates the after state for the combination of two "horizontal only" grouping blocks at the same level of the hierarchy;

FIG. 41 is a schematic representation illustrating a user interface element for manipulating and displaying data in accordance with a preferred exemplary embodiment of the present invention—illustrates the location of the mechanism for manually creating a grouping block in an existing hierarchy on the left side of a grouping block. Also illustrates the before state of the blocks where a user is inserting a manually inserted category block;

FIG. 42 is a schematic representation illustrating a user interface element for manipulating and displaying data in accordance with a preferred exemplary embodiment of the present invention—illustrates mechanism for manually creating a grouping block in an existing hierarchy on the left side of a grouping block that allows the user to enter a defining term. Also, illustrates the before state of the blocks where a user is inserting a manually inserted category block;

FIG. 43 is a schematic representation illustrating a user interface element for manipulating and displaying data in accordance with a preferred exemplary embodiment of the present invention—illustrates the after state of the blocks where a user inserted manually category block;

FIG. 44 is a schematic representation illustrating a user interface element for manipulating and displaying data in accordance with a preferred exemplary embodiment of the present invention—illustrates the after state of the blocks where a user previously inserted a manual category block and then manually dragged another group into the manually created category block;

FIG. 45 is a schematic representation illustrating a user interface element for manipulating and displaying data in accordance with a preferred exemplary embodiment of the present invention—illustrates the before state where a vertical only block has a horizontal block manually added to it;

FIG. 46 is a schematic representation illustrating a user interface element for manipulating and displaying data in accordance with a preferred exemplary embodiment of the present invention—illustrates the after state where a vertical only block has a horizontal block manually added to it;

FIG. 48 is a schematic representation illustrating a user interface element for manipulating and displaying data in accordance with a preferred exemplary embodiment of the present invention—illustrates the grouping block functionality that provides for constraining the height of all horizontal legs and their associated rows to display at most two items;

FIG. 49 is a schematic representation illustrating a user interface element for manipulating and displaying data in accordance with a preferred exemplary embodiment of the present invention—illustrates the before state where a grouping block is moved outside of its immediate parent's scope and indicates where the block is clicked and dragged and dropped to;

FIG. 53 is a schematic representation illustrating a user interface element for manipulating and displaying data in accordance with a preferred exemplary embodiment of the present invention—illustrates the before state when moving a horizontal only block to a hierarchically equivalent location among its peer blocks;

FIG. 54 is a schematic representation illustrating a user interface element for manipulating and displaying data in accordance with a preferred exemplary embodiment of the present invention—illustrates the after state when moving a horizontal only block to a hierarchically equivalent location among its peer blocks;

FIG. 59 is an example of the use of grouping blocks to group concepts relating to household goods to illustrate the use of grouping blocks outside the area of keyword research;

FIG. 60 is an example of the use of grouping blocks to group concepts relating to the scientific field of arachnology to illustrate the use of grouping blocks outside the area of keyword research;

FIG. 65 is a schematic representation illustrating a user interface element for manipulating and displaying data in accordance with a preferred exemplary embodiment of the present invention.

FIG. 66 is a schematic representation illustrating a user interface element for manipulating and displaying data in accordance with a preferred exemplary embodiment of the present invention.

DETAILED DESCRIPTION OF THE INVENTION

Figure 1:
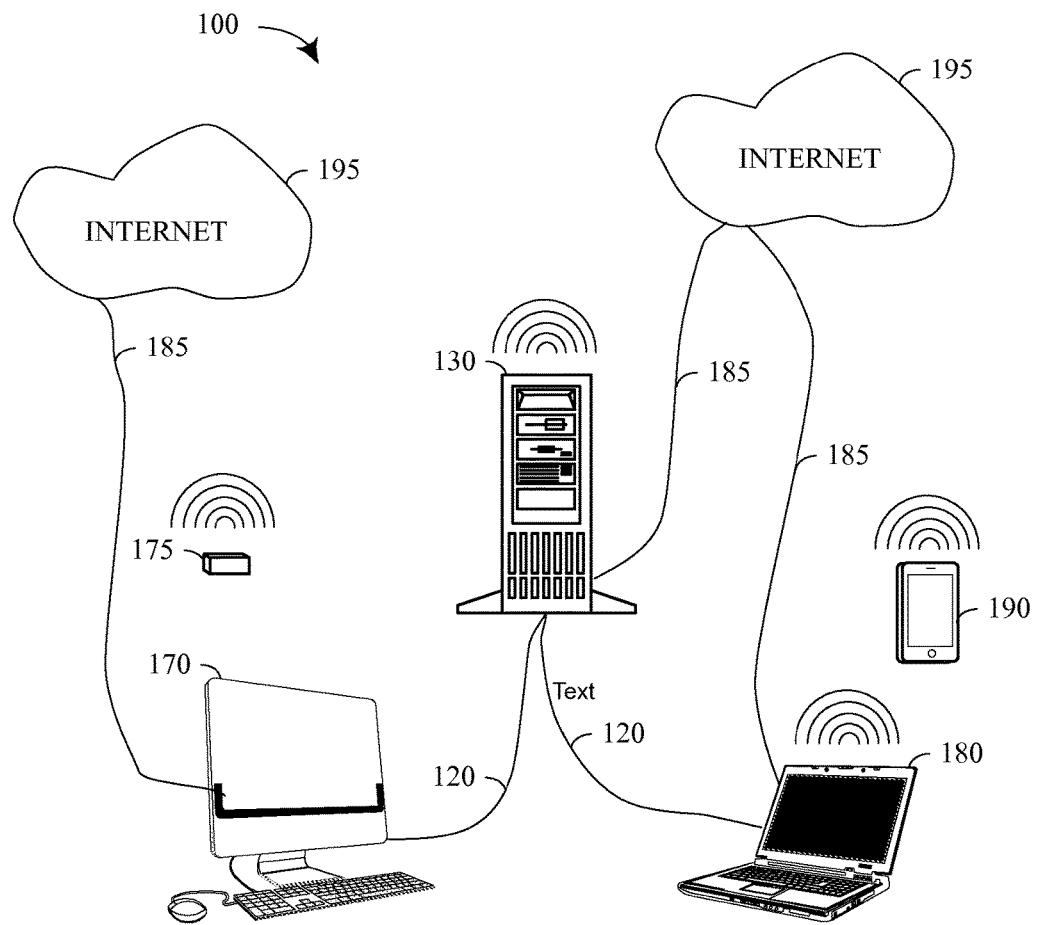
FIG. 1 is a schematic diagram of a computer-based system for manipulating and displaying data in accordance with a preferred exemplary embodiment of the present invention.

The various implementations of the present invention are provided as a computer-based system for manipulating and displaying data. The system can be deployed as a keyword research tool configured to pull together keywords from a plurality of sources including but not limited to import directly from APIs of data service providers such as SEMRush®, Google® Analytics, Google® Webmaster Tools, and any other data source that can be integrated via API or similar technology, manually imported using CSV file format, copy and pasted into a form in the tool or take seed keywords (e.g., "insurance", "cheap car insurance") and create a list of related keywords from an internal database or external database via an application programming interface ("API"). (For purposes of this disclosure, "keyword" and "keyword phrase" are considered to be synonymous and may be used interchangeably.) The resulting keywords are most preferably displayed to the user via a graphical user interface in groups. Each keyword group contains the most relevant keywords for optimizing a webpage for SEO purposes, making application of the keywords to the webpage a straight forward proposition. The keyword groups are most preferably arranged using one or more "grouping blocks", that are shaped as vertical or horizontal rectangles or as the combination of a vertical and horizontal rectangle in the shape of an "inverted L," that can be used to display the hierarchical relationship between the keyword groups.

In the most preferred embodiments of the present invention, each keyword also is associated with a plurality of related metrics such as the number of searches performed in search engines for individual keywords (search volume), the cost per click typically paid by search marketing advertisers (CPC), difficulty to rank in organic search for the keyword (competition level), etc. This information helps the user determine which keywords they want to target in search engines. Additionally, the user can display columns to associate each group with a URL on the website in question or the traffic received to that page over a specified period of time or the strength of that page as compared to the level of competition.

Relevant words and phrases related to the target keywords may be obtained from third party keyword suggestion sources (e.g., Grepwords®, Semrush®, Wordstream®, etc.) or may be generated using other tools and techniques known to those skilled in the art. Once the relevant words and phrases have been obtained, the user interface provides a series of tools that allow the user to manipulate and adjust the grouping of the keywords so as to maximize the set(s) of keywords that should be applied to a given website for Internet marketing, SEO and PPC (pay-per-click) purposes.

As previously mentioned, the most preferred embodiments of the present invention comprise one or more rectangles many shaped like an inverted "L-shaped" grouping blocks for visualization purposes. This unique configuration keeps the keywords in a single left-aligned list while visually illustrating the hierarchical relationship between the keyword groups. Additionally, the fact that the blocks have "width", unlike lines, allows for unique user interactivity and functionality.

Grouping blocks can be nested and maintain all of their other properties such as keeping keywords left aligned in a single list.

Grouping blocks have unique properties unlike standard user interface controllers such as tree controllers, tree diagrams (org charts) or cluster diagrams.

Grouping blocks are unlike a standard tree controller which progressively indents each sub item to illustrate the hierarchical relationship between the items. While this approach is useful, we found that the keywords would no longer be visually perceived as a single list but perceived as disjointed groups. Also this configuration would make it difficult to display metrics associated with each keywords.

Grouping blocks are unlike tree diagrams or org chart diagrams that could also display the required relationships between keywords. Tree diagrams are generally considered to be unsatisfactory because they: 1) require a lot of mental energy to comprehend the relationships between the individual keywords; 2) do not provide the ability to visualize the items as a single list; and 3) do not provide the data in a single list, making it more difficult to include metric data related to each item (such as search volume data for keywords).

Grouping blocks are most similar to cluster diagrams. A clustering diagram uses lines and connectors that are "outdented" into the left margin (or right, bottom or top) allowing the grouped items to remain left aligned in a single list and allows for the display of associated metrics in columns. The weakness of the clustering diagram is that the lines branch out in visually distracting ways. Also the connectors are thin lines. Like the tree controllers it takes a lot of mental energy to trace the lines with the eye to match them to the grouped items. Finally, cluster diagrams are display only and provide no interactivity.

Grouping blocks solve the problems that these other grouping methods do not. And uniquely grouping blocks allow the user to more directly perceive the relationships because the "blockiness" makes them more easily perceived. This blockiness aids the eye by drawing it effortlessly across the row of associated data. And subgroups are more directly perceived because the vertical leg of the inverted-L essentially encapsulates its subgroups.

Unique Nature of the "Inverted L" Grouping Block:
Grouping Block Shapes:
The "Inverted-L" Shape:

The "inverted-L" shaped grouping block is used when a group (or "page") is a parent to one or more other groups (or pages). Or more generally when a concept is a parent to one or more subconcepts.

For example, "insurance" is a parent concept to both "car insurance" and "motorcycle insurance." A website could have pages for all three concepts. Therefore the inverted-L is used where the horizontal leg encapsulates the parent concept group "insurance" and the blocks encapsulating the child concept groups "motorcycle insurance" and "car insurance" are placed below the horizontal leg but to the right of the vertical leg of the parent block. The vertical leg of the inverted-L is set to a length just tall enough that all subgroup grouping blocks fit. This process can be repeated so that there are grouping blocks within the scope of other grouping blocks.

In general, the horizontal leg of the L-shaped block groups items that represent a parent concept to the groups within the scope of the vertical leg.

Other Shapes:

In certain applications, a user may not want to generate a page for "insurance" but wants to generate a page for "car insurance" and a page for "motorcycle insurance" only. In this instance, the user might still want to have a grouping block to visually group these two as types of "insurance." In this case, only a vertical leg is required (i.e. "vertical only" grouping block) to represent the "insurance" concept as a parent concept to "car insurance" and "motorcycle insurance" since there is no page needed for the parent concept.

The horizontal leg of a grouping block groups the keywords. A vertical leg groups other grouping blocks. In general, there are three types of grouping blocks:

"Horizontal only"—Groups keywords but does not have subgroups.

"Vertical only"—Groups other grouping blocks but does not also group keywords for a parent page of a concept.

"L-block"—combination of a vertical and a horizontal grouping block. The horizontal leg groups keywords for a parent page and the vertical leg groups subgroups.

Reason for the inverted-L shape as a block:

A visual way of grouping items into a group was needed. This is the function of the horizontal leg.

A visual way of grouping groups into other groups was needed. This is the function of the vertical leg.

A way of visually displaying the hierarchy of grouped groups was needed. This allows for blocks "under" other blocks. (i.e. subblocks or subgroups).

A way of displaying a parent group that is left aligned with all other groups yet visually groups all of its subgroups. This is the function of both horizontal and vertical legs together in the shape of an inverted L.

The inverted-L grouping block satisfies all four of these needs. 1) To visually group items (such as keywords) into a group a rectangle to the left of the items can be used. 2&3) To further group groups into other groups and display their hierarchy, more than one rectangle can be used. For example three rectangles could be used to represent one parent concept with two child concepts (One large rectangle on the left and two smaller ones stacked on top of each other to the right). 4) The trouble comes when you try to represent say two concepts where one is a parent of the other one but the parent item must be left aligned with and vertically above the child item. In this case the solution is to consider the three blocks previously mentioned but merge the top and left blocks into an inverted-L shape. Now this block represents a parenting relationship and can be visually displayed in line with the child groups.

Horizontal and Vertical Legs of the Inverted-L Grouping Block:

To visually group items such as keywords into a group, the horizontal leg of the inverted-L accomplishes this by using its height as a grouping symbol. To visually group groups, the vertical leg of the inverted-L accomplishes this. To visually display the hierarchy, the inverted-L block is a combination of two rectangles. The horizontal rectangle (horizontal leg) represents a specific group that is a parent concept to all subgroups under it. The vertical height of the horizontal leg spans the height of the item rows containing the keywords (or grouped items). The vertical rectangle (vertical leg) represents the overall concept of the group and contains all subgroups including the parent group. (The term "vertical leg" in this context is the entire vertical length of the block not just the portion that encapsulates the subgroups.)

Grouping Blocks are one of the most unique features of the present invention.

Information Displayed within Grouping Blocks:

Summary & Aggregate Information:

Optionally, data about the items that grouping blocks apply to can be displayed directly within the area of the blocks. The horizontal leg may display summary or aggregate metrics of the data displayed in the table for the group within the scope of the horizontal leg. For example, the sum of all of the search volumes for all keywords assigned to a page could be displayed directly within the grouping block (such as within the horizontal leg since this information is derived from the information grouped by the horizontal leg). Likewise summary or aggregate metrics of the data displayed in the table for all groups within the scope of the vertical leg (in this context vertical leg is the entire height of the block including the height of the horizontal leg) can be displayed in the area of the grouping block (for example in the vertical leg).

To clarify, the vertical leg can display summary metrics for all pages and subgroups within the L-block's scope. So if all keywords within the scope of the inverted-L had a total search volume of 40,000 visits then this number could be displayed in the vertical leg of the grouping block. Similarly, since the horizontal leg applies to the grouped items within its scope, the summary information displayed in the horizontal leg would apply to just that item group. So if a particular item group of keywords had a total search volume of 1200 then this information could be displayed within the horizontal leg. In the preferred implementation of the present invention the summary data is placed within the leg of the inverted-L that is most relevant to the meaning of the number.

For example, since the horizontal leg governs an item group then the summary data for that item group is in that leg. For summary data that applies within the scope of the entire inverted-L grouping block then that information is displayed within the vertical leg because the vertical leg defines the entire scope of the block. The reason for placing this summary data within the blocks is to make it easy for the user to judge the value or importance of each group and make decisions as to what actions to take such as deleting or combining groups. The reason for including this information within the blocks is because that is where the user's eye will be when they need to take action since action will typically involve clicking and dragging or right clicking the grouping blocks directly.

In the above examples, only a single summary metric was illustrated but a plurality of such metrics can be displayed. Furthermore, these metrics can be user designed and configurable.

Optionally, the group summary information contained within the horizontal leg can be displayed in the data grid as summary or data aggregation rows below each group's item metrics for each page (1510). Placing this information in this location will be helpful to the user when they are scrutinizing individual page metrics across multiple pages and comparing them with each other. This idea can be extend to the scope of a vertical leg to provide summary data for the entire block Grouping Blocks as a Visual Aid:

Grouping blocks also make it easy for the eye to move across the entire group row. The eye can easily move from the grouping block's horizontal leg across the entire group row to effortlessly understand what information falls within that block's scope. This reduces mental fatigue and confusion that occur with other visual grouping methods such as tree controllers or cluster diagrams. This is accomplished by the fact that the grouping block has "visual area." The eye sees this area that it matches and lines up with the information in the group rows. So the eye more easily relates the "group symbol" with the data. This is unlike the thin lines of tree diagrams or clustering diagrams where there is no "visual area" of the grouping symbol to associate with the "visual area of the rows containing data".

Grouping Block Functionality:

Grouping blocks are not simply static visual symbols. They are interactive tools and provide information about the items within their scope. They can also be moved and combined. They can perform calculations or operations on the data within their scope. These functions are made available to the user through buttons within the block or through a context menu available by right clicking. Buttons on the horizontal leg operate on data or information within the scope of the horizontal leg. Likewise buttons or the context menu available by right clicking the vertical leg operate on data or information within the scope of the vertical leg.

Group rule (or differentiator or "defining term") indicator per group (530)—In each grouping block there is a visual indication of how that group is defined—what types of items it includes. This is typically a word or series of words or symbols such as "car" or "los angeles" and in the most preferred embodiment of the present invention is in the upper left corner of the grouping block. These words along with their user (or system) defined equivalencies make it clear to the user what each group represents in relation to the other groups.

For example, if there are three inverted-L shapes where each is a subgroup under the previous one then the group rule indicators in the upper left corners from left to right could be "insurance", "car", "online." Or using arrow symbol to show the directional relationship: insurance>car>online. This indicates the outer group "insurance" has a subgroup relating to "car insurance" which has a subgroup related to "car insurance online." Another way of saying this is that "online" is under "car" and "car" is under "insurance."

The above example illustrates one type of grouping block context that the invention allows. This type is called a "semantic" grouping block because the items in the subgroups contain all of the words (or the same meaning of the word) of the parents. For example, in the example above the group containing "car insurance online" has a parent group containing the word "car" and a great grandparent containing "insurance." So the subgroups contain the words displayed in the Group Rule (corner of the grouping blocks). So the hierarchy is structuring groups based on whether the Group Rule word is contained in each keyword.

But there are other ways to group items. One very common method is by category. For example, an attorney's website might have pages about "personal injury" as well as "business law." In this case, the user may want to group concepts such as "slip and fall" and "car accident" under the category "personal injury" and to group "patents" and "trademarks" under "business law." In this case "slip and fall" does not contain any of the same words as "personal injury." A category based grouping method is needed to handle this situation. This is the role of the "category grouping block."

Figure 40:
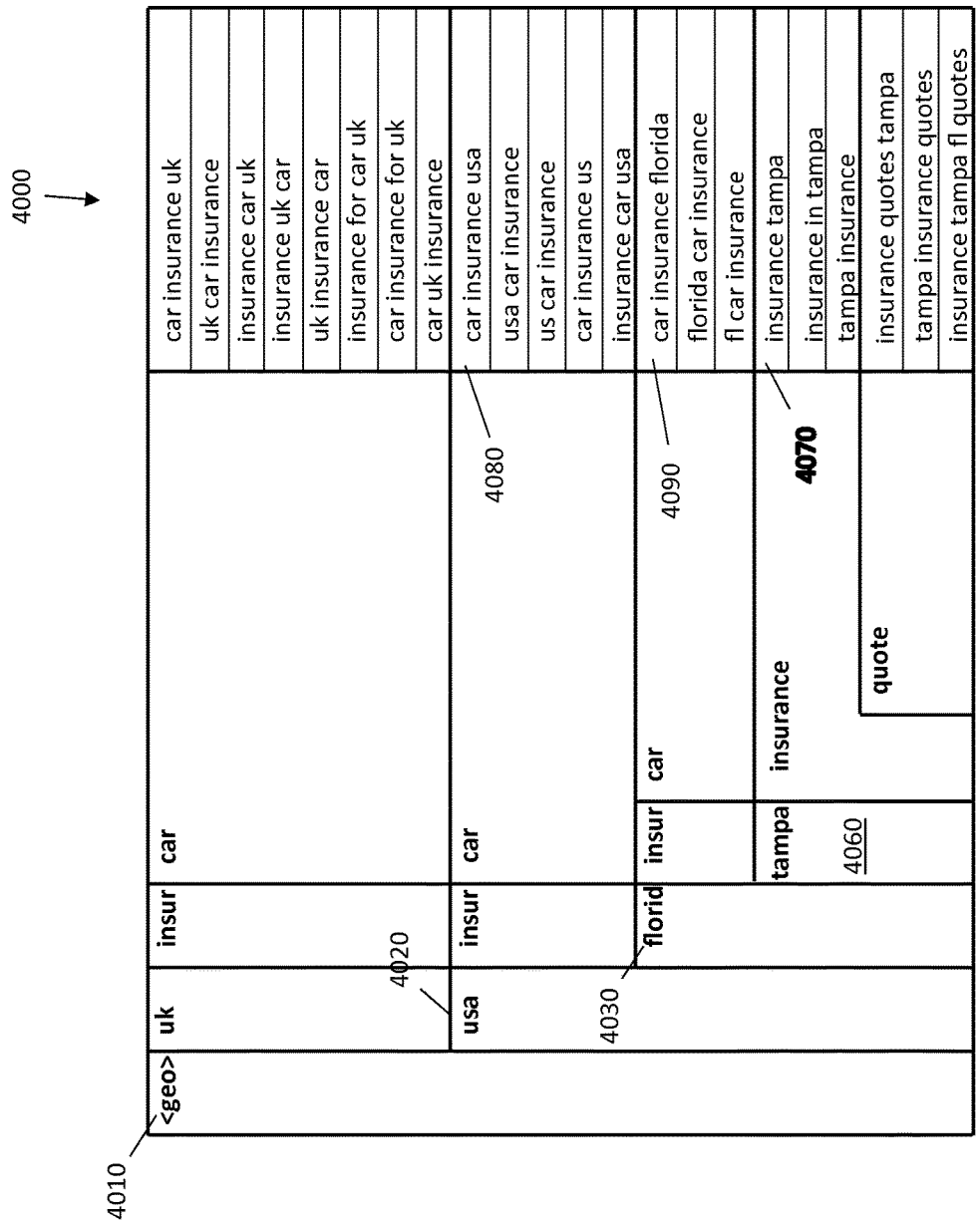
FIG. 40 is a schematic representation illustrating a user interface element for manipulating and displaying data in accordance with a preferred exemplary embodiment of the present invention—illustrates category based grouping blocks in the context of geographic grouping.

As depicted in FIG. 40, another example of the use of the category grouping block is in the case of grouping keywords relating to geographic regions. So a category grouping block of "florida" (4030) could contain a keyword "insurance tampa" (4070) even though the word "florida" or even the abbreviation "fl" does not appear in the keyword. In the case of category blocks a database (or other data store) must be populated with information about the hierarchical relationship between the categories so that the grouping blocks can be arranged to display the relationship. So based on the relationships between the categories the system knows that "tampa" is a city in "florida" and automatically places any item (such as a keyword) containing "tampa" into the "florida" and then visually arranges the blocks to show the relationship. Typically, the categories are calculated first (displaying the category blocks towards the left of the hierarchy) and then the semantic hierarchy blocks are assembled under each category (i.e. to the right) as depicted in FIG. 40. Also note in FIG. 40 that there is a dedicated "geo" block which is a vertical only category block. This allows all geo terms to be encapsulated in a single block at level 1 in the hierarchy. The "geo" block can be manually created by the user or automatically inserted by the system when there are geographically related keywords in the list. Optionally the user can turn off the special geographic grouping and allow the groups containing geographic terms to fall into the hierarchy based on their semantic relationships within the hierarchy.

As illustrated above, both category blocks and semantic blocks can be used within the same hierarchy. A particular block can behave as both a category and semantic block. For example, in a geographic context a block with a group rule of "usa" (4020) could encapsulate keywords that contain "usa" such as "car insurance usa" (4080) but also encapsulate the keyword "car insurance florida" (4090) because Florida is contained within the United States (i.e. USA). In this case it is behaving as both a "semantic" grouping block in the case of keyword "car insurance usa" (4080) but also as a "category" grouping block in the case of "car insurance florida" (4090).

Both category and semantic grouping blocks can be either algorithmically (automatically) created or manually created by the user.

When a hierarchy is algorithmically calculated it first looks for any rules for grouping by category that the user has defined or are prebuilt into the system. After it groups by category it then groups within each category semantically. (Optionally the user could select for the reverse process or another process that can be programmed into the system.)

A typical type of predetermined category structure that a user could input is for the legal profession using a text file that can be imported into the system similar to the following:

Law>personal injury>slip and fall
Law>personal injury>car accident
Law>personal injury>car accident>drunk driving
Law>personal injury>car accident>head on collision
Law>personal injury>dog bite
Law>business>patents
Law>business>trademarks This hierarchical ordering would be used by the system to create category grouping blocks. Then within each category grouping the sematic grouping methodology would be utilized.

Another example of using category based grouping blocks is to categorize items by stages in a thought process. For example, in the area of search marketing keywords have implicit in them an intent by the searcher. A searchers entering keyword phrases such as "what is car insurance", "how do you get the best deal on car insurance" and "cheap car insurance." All have different intents. The first two are looking for information. The third is looking to purchase. So keywords and keyword groups can be categorized as "informational" and "transactional" (transactional meaning they are looking to perform some transaction). Grouping blocks can be used to group keyword groups by these category types. These groupings can be automatically determined by the system or manually by the user.

Another example of category based grouping along these lines is to group keywords to a sales funnel. The user may identify five stages in the sales funnel for the business they are optimizing the site for. Based on the user's interpretation of the intent behind each keyword they can map the keywords to the each of the identified sales stages. This could be performed manually by the user or automatically by the system based on system defined rules or user defined rules. Since any group type can contain any other group type the user can build up a structure containing multiple types of category grouping blocks along with semantic grouping blocks. So in our example the user could have both intent based categories (such as informational and transactional) and sales funnel based categories and also include semantic grouping blocks.

To manually create a category or semantic grouping block the user can right click on the blank canvas of a project and select from a context menu an option to create either a semantic block or a category block. Then to build up a hierarchy the user can either right click (or use a menu on the main menu or a button on the toolbar) on the canvas again to create a block that is a peer of the first block using the same method as used to create the first or to right click on the first block and select from the context menu an option to create a subblock of the first. The user can build up any structure they chose using this method. The user can then assign a Group rule to each block by clicking the block and either using the context menu, a menu or a toolbar button. In the case of a semantic rule the user enters a word such as "car." To populate the hierarchy with keywords the user can then either manually import them, manually type them using the method of inserting individual keywords into groups or have the system automatically use the words in the Group Rules in the hierarchy as "seed" terms a then pull keywords from available data sources.

For example, if a user manually created a hierarchy containing a block with location in the hierarchy car>insurance>cheap, then the keyword phrase "car insurance cheap" would be used as a seed to populate that block, keywords would be pulled from available data sources and the group would be populated with the results. Each group in the hierarchy would perform an analogous operation to populate each group in the entire hierarchy.

Grouping blocks display buttons within their shape that operate on the group they are associated with. For example there are two delete buttons on the L-block. The one on the horizontal leg deletes the horizontal leg (and the items such as keywords and their data associated with it). The one on the vertical leg deletes the entire block.

In the most preferred embodiments of the present invention, grouping blocks contain a button to load additional subgroups of the current group. A project may have more keywords than are displayed in the user interface. This can be for various reasons one of which is to reduce the number of groups in the display so that the user is not overwhelmed with thousands of groups to consider. The system is designed to be configured to display a fixed number of groups on first load (e.g., 200). Any groups that do not make this cutoff can still be displayed for the user. If a particular group has subgroups that have been calculated by the system but not displayed in the user interface and a button will appear on the block with a number next to it which indicates how many subgroups the group has that are not displayed.

The user can choose to click this button and load these subgroups. The user can optionally load a subset of these groups if they choose. For example there may be 745 unloaded subgroups of a particular group and the user may only want to load the next 50 based on the established method for ranking them (such as the total search volume for the group). When the user chooses to load subgroups of a particular group it is possible that the subgroups themselves will have unloaded subgroups and the user can then chose to load those by clicking the button. The reason for this methodology is so that the user is not overwhelmed this thousands of groups that all have to be considered. By only displaying a selection and allowing the user to dive deeper into groups of interest the user saves time and mental energy.

Grouping blocks include a "color tagging" method to allow users to select groups of interest and then view just those groups yet still have the capability to view the entire structure. By default all groups are tagged "gray" and display gray colored circles on the horizontal and vertical legs. A user can change the color by clicking. If the user clicks a gray circle it turns white. White indicates that the user "likes" the group and wants to shortlist it for later consideration. The user can change their mind and then click and hold on the circle to reveal a menu that allows the color to be changed, perhaps back to gray if the user changes their mind. If the user clicks a delete button on the block the block is removed from the display as usual but the color tag is set to black. (On the toolbar there is a menu where the user can choose to view only groups that have been tagged a certain way, for example to view only the "white" groups. This menu allows the user to view blocks tagged as "white", "black", "red", "gray". The menu also offers "All" which displays all colors except for black. To view groups tagged as black the user must select black from the menu.

In at least some preferred embodiments of the present invention, there are color tags applied to both the vertical and horizontal legs. If the horizontal leg's color tag is clicked or changed that change applies to only the horizontal legs items. If the vertical leg's color tag is changed that setting applies to all the color tags within the scope for that vertical leg and all color tags within it are changed to the selected color. A user is free to then change individual horizontal or vertical leg color tags that were subgroups of the parent group whose color tag they just changed.

The color tag "red" is reserved by the system for groups that are newly displayed to the user within and existing project. This way if a user opts to load non-displayed subgroups they will be able to easily see which groups were added. After a period of time or based on other criteria the red circle change to gray unless the user changed them in the meantime. Red tags have the same meaning a gray in terms of meaning "default." i.e. the user has made no explicit decision regarding the group.

The system can be configured with additional color tags to allow for additional flexibility. Additional tags can be defined by the user.

Since clicking the delete button tags keywords as "black" and does not actually delete them from the project a separate function is available that will allow a user to completely remove groups an keywords from the project.

Grouping block collapse controller (850)—Each block that has a vertical leg has the ability to be collapsed so that only a horizontal row is displayed (such as the horizontal leg). If the block is an L-block then the horizontal leg is displayed with three dots in the bottom left of the block where the part of the vertical leg used to be. This has the effect of hiding the subgroups. If the block is a vertical only block then the row collapses to an arbitrary height determined by the system (such as the height of a keyword row). There is a button on these blocks that toggles this functionally to collapse and un-collapse the block.

Referring now to FIGS. 41, 42, 43 the blocks also have a controller 4110 associated with them (such as a tab outside the block along the left side of the block or above the block) that allows the user to insert a block into the hierarchy 4130. The user can enter a defining term in the provided controller 4120. If the block is a category block it will typically carry and indication that it is a category block. In the example here the defining term is encapsulated in angled brackets but any suitable method of identifying the block type is acceptable such as the block being a different color or carrying an icon indicating its type. In the example the controller 4110 is a tab on the left side of the block but other methods and locations of inserting manual block are available. Other methods could include context menu for example. Other location could include above or below a block or to the right of a block. When a user adds a block using this method it is by default a category block. Optionally the user could create a semantic block.

Category blocks can be manipulated in the same ways as sematic blocks such as using drag and drop to combine them, move them, etc. A user can also drag and drop other blocks inside them. FIG. 44 shows the result of dragging the "rate" block into the "<transactional>" category block.

In FIG. 45 and FIG. 46, each vertical only leg 4510 can have a horizontal leg manually added to it 4610 using an appropriate controller such as by using the block's context menu. Then the user can begin to add items to the block manually or automatically by using an automatic population method that the system provides or the user has defined. The user may also prefer not to add any items to the group but still assign a URL to the group. The reason for this is that the site that is being optimized may have a page that the SEO expert wants to account for in their hierarchy but does not want to target any keywords to.

Similarly, each horizontal only leg can have a vertical leg added to it with analogous capabilities for populating it with sub blocks and items. When the cursor moves over blocks the block and the items and data within the scope of that portion of the block are highlighted so the user can see what will be selected if they click. When a block is clicked it becomes selected and is visually highlighted in a bolder way than when the cursor was moved over it. If the horizontal leg is clicked then the horizontal leg is highlighted and all of its associated data in the table is highlighted. If the vertical leg is clicked then the entire block is selected and is visually highlighted and all of its associated keywords and data.

Once a block is selected, various operations can be performed on it such as moving it with drag and drop, combining it with other blocks with drag and drop, deleting the block using the context menu or a keyboard shortcut, or selecting an action from the context menu.

Multiple blocks can be selected at the same time and operations can be performed on the group such as using a menu, toolbar item or context menu. Operations on multiple blocks simultaneously include deleting blocks, moving blocks with drag and drop, moving blocks by copy and paste. A range of blocks can be multi selected or individual blocks can be independently selected and added to the list of multi-selected items. If individual blocks are selected then the user as the option to delete the blocks that are between the selected blocks as well as deleting the selected blocks.

Various metrics can be pulled for the keywords within the scope of a selected block. For example if the horizontal leg is selected then the Google ranking position of the project's defined target site for each keyword in the scope of the horizontal leg can be calculated as well as for any other metric within the scope of that leg. Similarly if the vertical leg is selected then metrics for the keywords or target page can be calculated for the items in the scope of the vertical leg.

Figure 47:
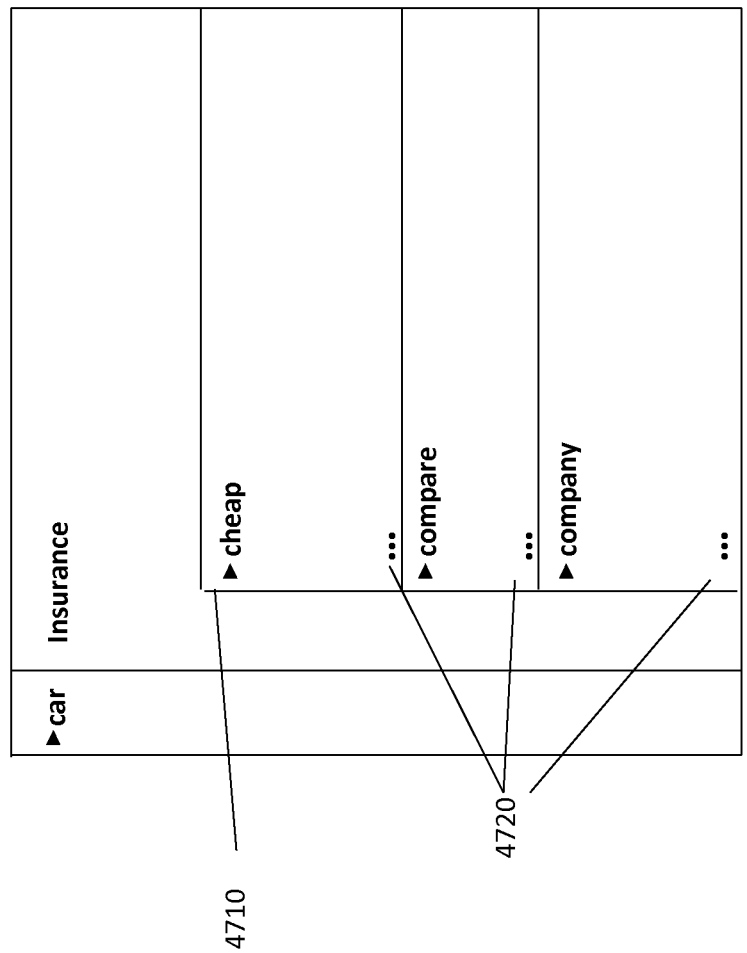
FIG. 47 is a schematic representation illustrating a user interface element for manipulating and displaying data in accordance with a preferred exemplary embodiment of the present invention—illustrates blocks all at the same level of the hierarchy that are collapsed (i.e. if they have a vertical leg the vertical leg and all of its subgroups are hidden)

Referring now to FIG. 47, any block that has a vertical leg such as an L-block can be collapsed so that its subgroups can be hidden by clicking a controller (shown here as a triangle) on the block or using the context menu or another system provided controller. Clicking this triangle initially collapse the block, leaving only the horizontal leg visible and displays an indication 4720 (shown here as three dots) to the user that the block is collapsed and that there are subgroups hidden that can be made visible by clicking the collapse controller again. Blocks in their collapsed state retain all of their functionality including drag and drop and behave exactly as if they were not collapsed.

For example, if a user drags a horizontal let to it's parent L-block then it is converted to a subpage block within the receiving horizontal leg. The same occurs if the block was collapsed. To get the result of dragging the subblock's vertical leg to the parent's horizontal leg the user would click the left side of the collapsed block which now acquires the functions of a vertical leg and drags it to the horizontal leg of the parent then the entire subgroup is then converted to a subpage group just as it would if the subgroup was not collapsed and the user clicked the vertical leg and dragged it into the parent's horizontal leg.

If the user wishes to simply move a block and all of its subgroups as you would normally do when not collapsed by dragging he vertical leg, the user can accomplish by clicking the left side of the collapsed block where that side of the block will now assume the functionality of the vertical leg.

All other functionality the block contains when not collapsed is available while it is collapsed whether it be moving.

Collapsing blocks can be performed in bulk on all blocks at the same level of the hierarchy. For example, the user can request to collapse all blocks at the third level of the hierarchy as shown in 4700. This operation can be performed using a UI controller to "collapse all at this level" such as the context menu on the block. The reason a user would want to collapse all blocks at the same level of the hierarchy is to make it easy to quickly view all of the major themes at that level without having to scroll through all of the subgroups. The user can reverse this operation by using the UI controller to "expand all at this level."

Referring now to FIG. 48, additional user interface elements are depicted. As shown in FIG. 48, since each group can contain a large number of items a lot of visual real estate can be taken up on the screen by items that are essentially the same or nearly the same. For example a group containing an item "cheap car insurance companies" could have easily 20 or more keywords in the group where they all basically mean the same thing. It is not necessary for the user to see all of them on screen all the time. So they system includes the ability to constrain each horizontal leg's height to display a smaller number of items in each group, for example at most two 4810 as shown in the diagram 4800. This allows the user to see several examples of the items in that group without taking up so much of the screen. This allow the user to view more of the hierarchy on the screen and have a better understanding of the overall structure.

Both the ability to collapse all at the same level (FIG. 47) and the ability to limit the number of visible items in a group (FIG. 48) can be both used at the same time to give an even more compact view of the overall hierarchy.

Moving Blocks to Change Hierarchy:

If the default algorithm does not hierarchically arrange the groups to the user's liking the user can easily change the groupings manually by clicking and dragging the blocks to change the hierarchy. For example in the previously mentioned ordering the user could click the "online" grouping block and move it above the "car" block to change the hierarchy to "insurance>online>car." By default all subgroups within the scope of the outer most grouping block changing position will recalculate their groupings.

Need for Manual Adjustment:

In many cases, automated algorithmic groupings produce results that are close to what is needed but requires a human to make judgment calls about the ideal groupings since they must match some human preconception that the algorithm was inadequate to address. For example, in the area of search marketing many people search for "auto insurance" when they really are looking for "car insurance" as opposed to "truck insurance" or "motorcycle insurance." The Internet marketer would likely want to consider as equivalent the phrases "auto" and "car". The system allows the user to set synonym equivalencies by manually entering them into the system and letting the algorithm utilize this data. But even in this case there are situations where this will fail such as for a keyword like "auto insurance for two wheel vehicles" which could logically be included in the "motorcycle insurance" category (although in reality a person could be searching for "moped insurance.").

Another case is where there is a reason for including an item such as a keyword in a group although it does not hierarchically fit in that group. For example, a search engine marketer may designate a page to target "car insurance" but a search engine such as Google not only ranks that page for car insurance related terms but also currently ranks it very high for "truck insurance deals" even though there is already another page dedicated to "truck insurance" which is not ranking highly for this keyword. The marketer may want to manually assign the keyword to the page that it is currently highly ranking on instead of to the lower ranking page. Of course the algorithm could be modified to account for this type of variation but there will always be some case that an algorithm can't account for so manual action will always be a functional requirement.

The same is true for groups and not just items such as individual keywords. A user may have a reason for manually combining groups that the algorithm did not put together. For example the algorithm may create two separate groups such as "walk in freezer" and "large commercial freezer". The marketer may have reason to assign these to the same page of a website and the algorithm would likely not have grouped these to the same page. The present invention makes it easy for the user to manually combine these groups by clicking and dragging one group onto another.

Since grouping information such as keywords often involves working with large numbers of items at a time (thousands or millions) allowing the user to quickly and easily manipulate this data is critically important to promote maximum productivity. Many current tools that group information such as keywords often have cumbersome methods for manually overriding defaults such as requiring the user to click a checkbox next to the item in question, click a menu to select an action, then click a button to execute that action. Doing this dozens or hundreds of times makes the work burdensome. To solve this problem we allow the user to drag and drop to make these changes. They can click and drag an item (such as a keyword and its associated metrics) from one group to another, or click and drag one group onto another to combine them or click and drag to move a group to a different location in the hierarchy.

Another way that keyword tools typically are set up if they allow the user to change the groupings is by placing grouped items in folders. To view the keywords in a group you must click on a folder to view the keywords and you can only see the keywords in that folder—thus making it difficult for the user to see the overall relationships between the all of the keywords. The present invention solves this problem by displaying all keywords in a single list.

Group to Single Page Focus:

In SEO, it is a common practice to assign each targeted keyword to a single webpage. Each page is often assigned several keywords. Then the page is optimized for those keywords by including them or variations of the keywords in the page content and HTML code (such as in the body content and the "title" tag).

Most existing keyword grouping tools do not attempt to group keywords with the purpose of grouping specific sets of keywords to be used on individual pages of a website— they group only into generally related groups. The most preferred version of the algorithms of the present invention are configured to group keywords into groups appropriate for a single page of a site. To fully support the goal of targeting keywords to specific pages, the system provides for manual adjustments so the user can get the keyword groupings and grouping blocks just the way they want them. In fact, most Internet marketers perform the bulk of their keyword research not in dedicated keyword research tools but in a spreadsheet such as Microsoft® Excel®. The reason for this is that the existing keyword research tools do not work as a "keyword workspace" that allows the user to configure their information in a free form way. A spreadsheet provides that flexibility. However, since spreadsheets were not designed for keyword research they lack many features that that keyword researchers need. The present invention is designed to take the place of the spreadsheet in the keyword research process while also providing features more suited to keyword research.

Most other keyword tools are dedicated to creating groups appropriate for paid advertising such as a PPC campaign. While the present invention emphasizes its unique nature for supporting keyword research for non-paid search it is also applicable to paid search.

Some other tools produce groupings of various strictness to make the groups more finely grouped or less finely grouped. This approach, while useful for certain applications, can cause the user a significant amount of time in the keyword selection and page assignment process. In many cases, the user must export the keyword data from the system so that they can have more control over the grouping, selection and presentation of the keywords. In contrast, the present invention solves this issue by providing the required functionality to adjust keyword grouping and selection within a single user interface, without having to export and subsequently import into a program such as a spreadsheet to perform the additional configuration.

Single UI and Tool:

An important benefit of this invention is that the entire process of keyword research (from keyword discovery to grouping to page assignment) can be accomplished in a single user interface without the need to change screens or to export the keywords at any time. Additionally, the user can create projects and track historical performance over time to provide for continual management of the keywords throughout the life of the campaign. Additionally, additional algorithms can be developed that will automatically identify keyword suggestions based on automatically gathered information about changes in rankings, etc. and suggest those new keywords or keyword groups to the user by automatically adding them to the page group or hierarchy. A visual cue such as italics, color or an icon can be utilized to indicate that these keywords or groups were automatically suggested. This visual cue allows the user to decide whether they want to target this keyword or group or not.

This is particularly useful in our particular user interface because the keywords are already grouped by page and pages into a hierarchical display so it will be easy for the user to see what new keywords or groups are being suggested for that page because the suggested keywords will be displayed in the same screen that they will already be viewing on a periodic basis (ex. monthly). It will also be enjoyable for users to see newly suggested keywords each time they use the system. Other tools that provide automatic new keyword suggestions have a special section of the application for viewing "new keyword opportunities." Then the user needs to integrate those new opportunities into the existing strategy and display. Our system eliminates that step allowing the user to simply accept or reject the suggestion in place.

Various aspects of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Misc Computer Network Information:

These computer program instructions may also be stored in or on a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Additionally, various preferred embodiments of the program product may be configured to: create and modify multiple databases; track, update and store data related to the optimized manipulation and display of data such as keywords; configure and implement various display functions for a multitude of websites accessed by users; track and store information about various services and program features; and provide one or more user interfaces for accomplishing all of these functions.

In this fashion, the appropriate persons or entities can utilize the program product to initiate and complete a wide variety of database-related applications for keyword researching, Internet marketing and SEO activities. Similarly, a program product in accordance with one or more preferred embodiments of the present invention can also be configured to perform substantially all of the steps depicted and described in conjunction with the figures below for implementing a keyword tool and associated visual display of keywords as described herein.

While the present invention will be described in detail by using various examples of keyword researching for an SEO environment, those skilled in the art will recognize that the equipment, processes, methods and techniques described herein have broad applicability to other environments and applications where quick and efficient gathering of list based information, grouping such information, and grouping and/or sorting large quantities of related data is desirable.

Referring now to FIG. 1, a computer-based system 100 for keyword research and grouping in accordance with a preferred exemplary embodiment of the present invention comprises: a data server (computer) 130; at least one of a desktop computer 170 or a laptop computer 180; a wireless communication device 175; and an optional mobile communication device 190 (e.g., a smartphone or personal digital assistant "PDA") all connected or coupled via a local area network 120 to the Internet 195 via an Internet connection 185.

Taken together, the components of computer-based system 100 provide a platform for quickly and efficiently manipulating and displaying data such as keywords for a wide variety of purposes. Computer-based system 100 provides a mechanism for individuals and organizations to efficiently and effectively manipulate and display data such as keywords without the time-consuming and inefficient methods associated with traditional data gathering and manipulation tools.

In the most preferred embodiments of the present invention, computer-based system 100 is configured as a system that will be used to manipulate and display data such as keywords for Internet marketing and SEO purpose. However, those skilled in the art will recognize that the various preferred embodiments of the present invention have additional application in other, unrelated fields. For example, any field of endeavor where large numbers of related items or words need to be manipulated and displayed in a graphical user interface with flexible grouping functions would be well suited for adoption of one or more preferred embodiments of the present invention.

Network 120 represents any suitable computer communication link or similar communication mechanism, including some combination of a hardwired connection, an internal or external bus, a connection for telephone access via a modem, standard co-axial cable lines, high-speed T1 line, radio, infrared or other wireless communication methodologies (e.g., "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components known to those skilled in the art, whether currently known or developed in the future. It should be noted that portions of network 120 might suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard Internet connection 185 between at least some of the components of computer-based system for providing optimized message creation and delivery 100 for providing access to additional network resources and other remote locations. Network 120 provides for communication between the various components of computer-based system 100 and allows for relevant information to be transmitted from device to device. In this fashion, a user of computer-based system 100 can quickly and easily gain access to the relevant data and information utilized to manipulation and display of data such as keywords as described in conjunction with the various preferred embodiments of the present invention.

In the most preferred embodiments of the present invention, network 120 is configured to provide relatively high-speed transmission of textual information, audio and video data and signals, and also comprises at least an Internet connection 185 for transmission of data captured by one or more computers 170 or 180.

In addition to the other components shown in FIG. 1, a wireless communication access device 175 may optionally be communicatively coupled to network 120 and represents any type of wireless communication mechanism that is known to those skilled in the art to provide for wireless communication between network 120 and the various devices associated with network 120, including desktop computer 170, laptop computer 180 and as well as mobile communication device 190. The most preferred embodiments of an acceptable wireless communication access device may comprise any type of wireless bridge, wireless router, or wi-fi "hotspot."

Regardless of the specific components, physical nature, and topology, network 120 serves to logically and communicatively link the physical components of computer-based system 100, thereby enabling stable and consistent communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or mobile communication device 190 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer-based system 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 may be linked (via wired or wireless connection) to its own LAN or WAN and have access to one or more additional data servers (not shown this FIG.).

Similarly, laptop computer 180 may be any type of relatively lightweight portable computer system known to those skilled in the art that is capable of being configured for use with computer-based system 100 as described herein. This includes tablet computers (e.g., iPad®), pen-based computers and the like. Computer 180 may also be configured to allow the transmission and reception of audio signals, messages, communications, and various types of alerts via server 130 and network 120.

Additionally, netbooks, tablets, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in some preferred embodiments of the present invention, laptop computer 180 may be linked to its own LAN or WAN and has access to its own data server (not shown this FIG.).

In general, the communication between devices associated with data server 130 will be data associated with Internet marketing and SEO purposes. The users of desktop computer 170 and/or laptop computer 180 may be marketing professionals, researchers, consumers, and others who are seeking to create and modify keyword campaigns and identify the most appropriate keywords to be used or avoided for various keyword applications.

It should be noted that while FIG. 1 shows only a single desktop computer 170 and a single laptop computer 180, it is anticipated that the most preferred embodiments of the present invention will comprise dozens or even hundreds of computers 170 and laptop computers 180. Each of these computers 170 and 180 will be configured to access data server 130 in an appropriately secure way so as to accomplish the specific objectives of the user of the desktop computer 170 or laptop computer 180.

For example, a service provider may offer the use of the system of FIG. 1 in a software as a service (SAAS) environment and provide access to data server 130 via network 120 to subscribers or customers. In this fashion, the service provider and customers may utilize desktop computers 170 or laptop computer 180 or mobile communication device 190 to access data server 130 and access, create, update or otherwise modify various keyword searches, keyword campaigns, etc. An operator, located in a remote location, may use desktop computer 170 or laptop computer 180 to access data server 130 to retrieve information about the manipulation and display of data such as keywords by the users of computer-based system 100.

In at least some preferred embodiments of the present invention, multiple desktop computers 170 and multiple laptop computers 180 will all be configured to communicate simultaneously with data server 130 and with each other via network 120. In addition, the most preferred embodiments of the present invention include a SAAS or Platform as a Service (PAAS) environment where data server 130 may be operated in a hosted operation. In this fashion, multiple desktop computers 170 and laptop computers 180 will have access to data server 130 and the databases stored thereon via a global computer network such as Internet 195. Data server 130 is further described below in conjunction with FIG. 2 below.

An optional printer and an optional fax machine (not shown this FIG.) may also be deployed for various hard copy data output requirements and may be considered to be any standard peripheral devices used for transmitting or outputting paper-based version of website content generated in conjunction with the operation of computer-based system 100 (e.g., reports, communications, statistical analyses, automated letters, etc.). Finally, it should be noted that the optional printer and the optional fax machine are merely representative of the many types of peripherals that may be utilized in conjunction with computer-based system 100. It is anticipated that other similar peripheral devices will be deployed in the various preferred embodiment of the present invention and no such device is excluded by its omission in FIG. 1.

Mobile communication device 190 is representative of any type of cellular device, wi-fi or Internet enabled mobile communication device that may be communicatively coupled to computer-based system 100. This includes, for example, personal digital assistants ("PDAs"), Windows® mobile phone devices, Android® OS devices, Palm® OS devices, Pocket PC® devices, the Apple® iPod Touch®, the Apple® iPhone® and other various types of smartphones and portable communication devices, including tablets. Those skilled in the art will recognize these various devices and others that are suitable for deployment as mobile communication device 190. While somewhat less powerful than computers 170 and 180, mobile communication device 190 may also be configured to wirelessly communicate with data server 130 via network 120 to send and receive communications and data to and from data server 130. Given the standard functionality for devices that may be deployed as mobile communication device 190, this communication capability be provided by a wireless Internet connection (e.g. "wi-fi" or "wi-max") or a Bluetooth® connection as well as LTE and other cellular data communication networks.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that needs to be transferred from a database to the user of computer-based system 100.

Figure 2:
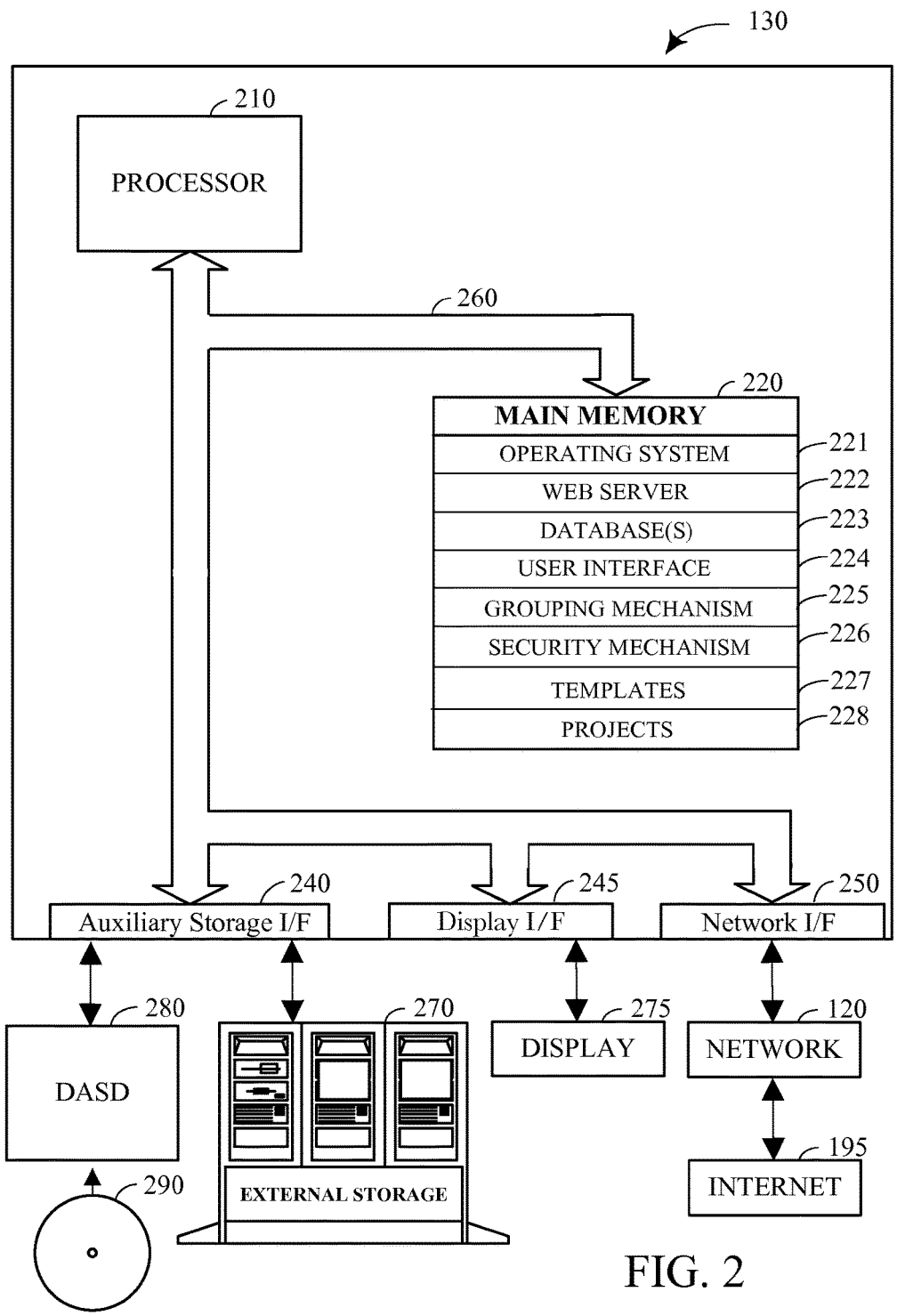
FIG. 2 is a block diagram of a server (computer) used for a computer-based system for manipulating and displaying data in accordance with a preferred exemplary embodiment of the present invention.

Referring now to FIG. 2, data server 130 of FIG. 1 in accordance with a preferred embodiment of the present invention represents one of many commercially available computer systems and those skilled in the art will appreciate that the methods and system of the present invention apply equally to any computer system, regardless of the specific operating system and regardless of whether the computer system is a traditional computer, a complicated multi-user computing device or a single user device such as a personal computer or workstation. Additionally, as further described below, certain processing and interaction may be performed using a web browser on the user's computer or workstation.

Data server 130 suitably comprises at least one Central Processing Unit (CPU) or processor 210, an auxiliary storage interface 240, a display interface 245, and a network interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 is configured to execute one or more software programs contained within main memory 220. Although data server 130 depicted in FIG. 2 contains only a single main processor 210 and a single bus 260, it should be understood that the present invention applies equally to computer systems having multiple processors and multiple system buses.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a non-volatile DVD or CD disk 290.

Display interface 245 is used to directly connect one or more displays 275 to data server 130. Displays 275 provide system administrators and users the ability to communicate with data server 130. Additionally, in certain preferred embodiments, data server 130 may have an integrated display 275.

Network interface 250 is used to connect data server 130 to network 120 and computer-based system 100, including computer 170 and computer 180 of FIG. 1. Network interface 250 broadly represents any suitable way to interconnect electronic devices, regardless of whether the network comprises present day analog and/or digital techniques or via some networking mechanism of the future.

It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: non-volatile and non-transitory recordable type media such as DVD and CD ROMS disks (e.g., disk 290), and transmission type media such as digital and analog communication links, including wireless communication links.

Main memory 220 suitably contains an operating system 221, a web server 222, one or more databases 223, a user interface 224, a grouping mechanism 225, a security mechanism 226, and one or more templates 227. The term "memory" as used herein refers to any storage location in the virtual memory space of data server 130. While the present various examples of the present invention are directed towards keyword grouping, those skilled in the art will recognize that additional application of the principles presented herein are readily adaptable to other scenarios where a hierarchical display of items is useful and in situations where grouping blocks may be used (e.g., to order actions).

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Web server 222 provides access, including a user interface, to allow individuals and entities to interact with graphical user interface 224, including via network 120 of FIG. 1.

Database 223 is representative of any suitable database known to those skilled in the art. In the most preferred embodiments of the present invention, database 223 will comprise a plurality of information that may be useful to an organization or individual that wants to provide for efficient and effective manipulation and display of data such as keywords in conjunction with a preferred embodiment of computer-based system 100 of FIG. 1.

Graphical user interface 224 is a software component that provides the users of computer-based system 100 of FIG. 1 a means for interacting with the various components of computer-based system for transforming website content for display on mobile devices. In at least some of the most preferred embodiments of the present invention, graphical user interface 224 is a web browser based interface, accessible to the users of computer-based system 100 via any standard web browser from any computer that is connected to the Internet. Additional details on graphical user interface 224 are presented below.

Additionally, at least one preferred embodiment of the present invention comprises a graphical user interface deployed on a mobile communication device 190. In this embodiment, a graphical user interface may be offered via an "app" customized for mobile communication device 190 or via a web browser based interface provides a connection to data server 130, allowing the user of mobile communication device 190 to access grouping mechanism 225 and database 223 will be accessible and customizable via the graphical user interface provided in conjunction with mobile communication device 190.

Database 223 may also be used to store user data (e.g., user profiles and account information, website preferences, organization profiles, etc.) containing detailed information about each user or group of users, including user phone numbers, email addresses, permissions, home and work addresses, etc.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 might also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize that database 223 may actually comprise a series of related databases, logically linked together. Depending on the specific application and design parameters, database 223 may take many different forms when implemented.

The most preferred embodiments of computer-based system 100 of FIG. 1 will include a grouping mechanism 225 in main memory 220. Keyword mechanism 225 will generally comprise a series of task-oriented routines (e.g., website parsing tools, data and content transformation tools, etc.). Keyword mechanism 225 is an automated programmable system that is capable of assisting users who access database 223 to manipulate and display data such as keywords.

In the most preferred embodiments of the present invention, grouping mechanism 225 will be configured to identify and group keywords for use in Internet marketing, SEO and PPC processes. Keyword mechanism 225 may be configured to operate programmatically or with the assistance of one or more humans.

In addition, the most preferred embodiments of the present invention comprise security mechanism 226 for verifying access to the data and information contained in and transmitted to and from data server 130 (e.g., user identity and authentication data, etc.). Security mechanism 226 may be incorporated into operating system 221 and/or web server 222. Additionally, security mechanism 226 may also provide encryption capabilities for other components of computer-based system 100 of FIG. 1, thereby enhancing the robustness of computer-based system 100 of FIG. 1. Security mechanism 226 is most preferably configured to protect the integrity and security of the information transmitted via network 120 of FIG. 1.

Further, depending on the type and quantity of information stored in database 223 and accessed by graphical user interface 224, security mechanism 226 may provide different levels of security and/or encryption for different computer systems 170 and 180 of FIG. 1 and the information stored in database 223. In some preferred embodiments of the present invention, security mechanism 226 may be contained in or implemented in conjunction with certain hardware components (not shown this FIG.) such as hardware-based firewalls, switches, dongles, and the like.

Templates 227 are typically user-developed components that are used to develop and save unique keyword research that can automate the process of manipulating and displaying data. For example, a user may wish to perform keyword research on a repetitive basis. The user can create and save a "template" using the results from a previously generated research effort. The saved template may be associated with keyword research projects they are doing for one or more websites. Since many Internet marketing agencies have multiple clients and those clients can have multiple websites, the use of templates can be very useful. Additionally, the user can use a site management page to include templates in folders that contain keyword projects generally for specific websites. Templates 227 may be stored as part of database 223.

Projects 228 are typically user developed components that may be used to develop and save keyword research projects and related data. For example, a user may wish to perform keyword research for a particular site on multiple occasions. Additionally, a user can track the progress of the marketing campaign over time and the user will need to view the project at a later time and view updated data if it is available. The user can create and save a "project." Additionally, the user can use a site management page to include projects in folders for specific websites. Projects 228 may be stored as part of database 223.

Figure 3:
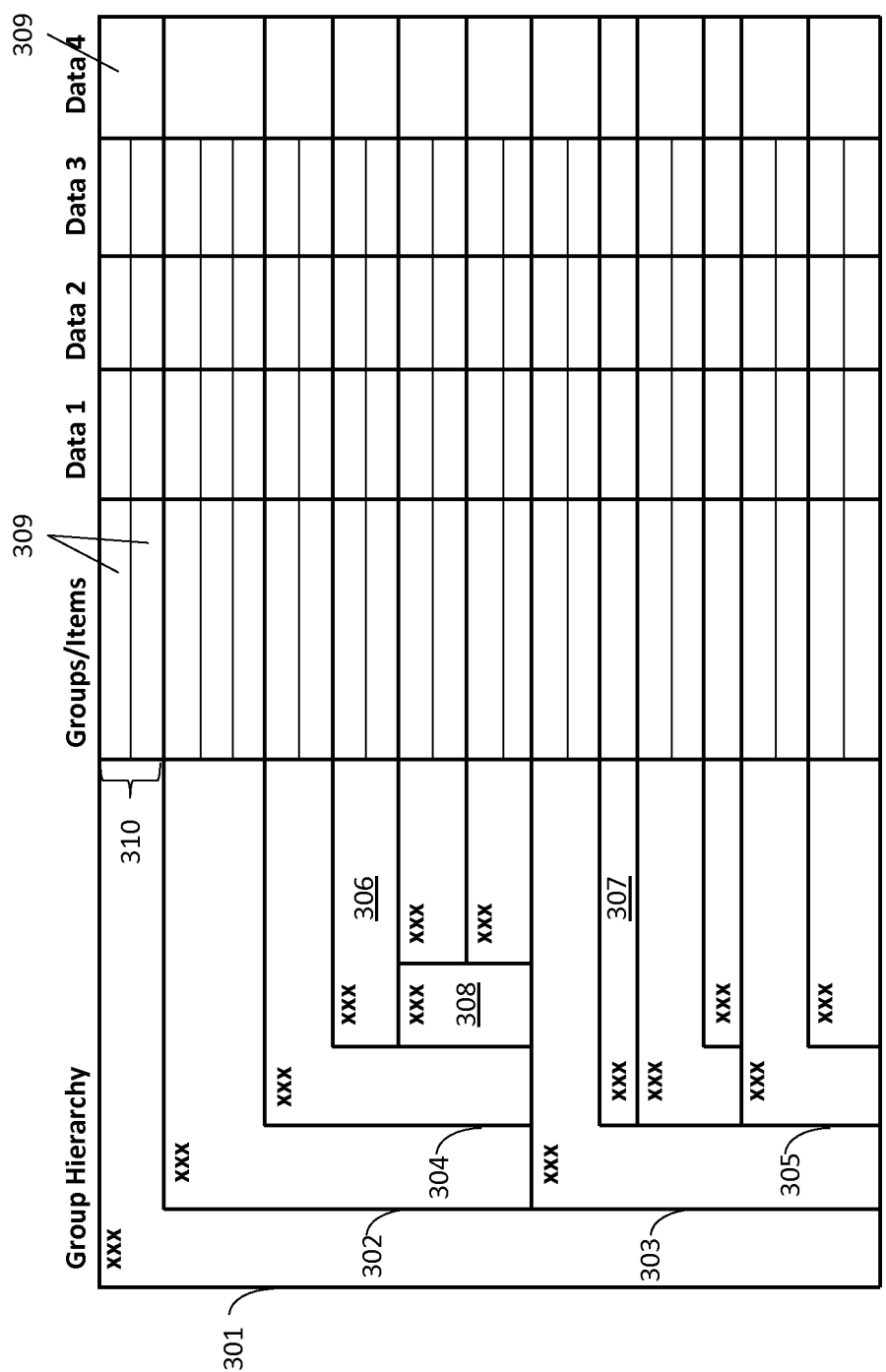
FIG. 3 is a schematic diagram illustrating a user interface element for manipulating and displaying data in accordance with a preferred exemplary embodiment of the present invention.

Referring now to FIG. 3, a user interface 300 for use in manipulating and displaying data in accordance with a preferred exemplary embodiment of the present invention is depicted. As shown in FIG. 3, a series of nested "L" shaped grouping blocks 301, 302, 303, 304, and 305 are displayed to a user as well as several rectangular "horizontal only" grouping blocks such as 306 and 307 and a "vertical only" grouping block 308. Each grouping block indicates a specific set or subset of items or keywords (located to the right of the block) that have been grouped together (for example the items in the Keyword column), either programmatically or manually or a combination of programmatically and manually with user intervention. For convenience the diagram numbers 301, 302, 303, 304, 305, 306, 307, and 308 correspond to numbers in other diagrams as 502, 503, 504, 505, 506, 507, and 508, respectively (with the omission of a corresponding block for 301 due to space limitations in the diagram) respectively.

The keywords within the scope of each grouping block typically have been identified based on multiple factors and from multiple sources such as external keyword data sources available via API, import using CSV, copy and paste into a textbox in the application, or by the user entering one or more initial "seed" keywords where for each the systems calls out to an external data source via API or pulls related keywords from its internal database. After system 100 of FIG. 1 has gathered related keywords, the related keywords (which can include one or more of the initial seed keywords) are displayed in user interface 300.

In addition to the grouping blocks, a series of horizontal rows and vertical columns are displayed. Each horizontal group row contains one or more keywords that have been grouped together, representing a group of keywords that could be targeted on a single webpage to provide Internet search engine traffic to that webpage, based on the keywords. Each group row can contain subrows or "item" rows, each containing one item such as a keyword. Each vertical column is titled and will contain the labeled information. If a column measures data about individual keywords then it will contain a value in the item row. If the column displays data about a group it will contain a data value in a cell large enough to span the height of the group row and not just an item row.

Each grouping block has "area" (unlike a line) and this allows it to display information and provide user controls within the area of the block about the information it groups.

Information such as a word, phrase, or other textual information that indicates the type of information contained in that group can be displayed within the area of the block. This makes it easy for the user to quickly understand what information is contained in the group and how that group relates to other groups. Grouping blocks not only group keywords but other grouping blocks to reveal the hierarchical relationship between groups.

In addition, summary or aggregate information relating to the keywords in a group can be displayed within the area of the block 880 and 892. Two types of aggregate data are displayed: 1) aggregate information relating to an item group (horizontal leg) 880 and 2) aggregate information about all keywords within the scope of a larger grouping block including all of its subgroups 892. Typical aggregate information includes the sum of all search volume of the keywords in an item group and the sum of all search volume of the keywords within the scope of the entire block including all subgroups.

Grouping blocks not only display the relationships between information but offer the user functionality to perform their work. Functionality is built into the grouping blocks such as user controllers that allow the user to modify the default grouping block display so as to fine tune the results for each specific project. For example, the user can add or delete keywords to groups and the grouping blocks change dimensions to accommodate the addition or deletion. The configuration of the grouping block also makes it easy for the user to select a grouping block and move it (e.g., use a mouse to click and drag) or combine it with other groups.

When a keyword is manually moved from one grouping block's scope to another's, the receiving grouping block's dimensions will adjust to accommodate the moved item row containing the keyword and all of its associated data.

When two grouping blocks are combined, the dimensions of the receiving block will change to accommodate moved item rows. Additionally, when one grouping block is combined with another grouping block, the defining terms in the group's rule in the upper left corner are also combined and will be viewed as an equivalent (e.g., "car"="automobile" if the user combined a grouping block where "car" was the defining term and a second grouping block where "automobile" was the defining term).

Figure 5:
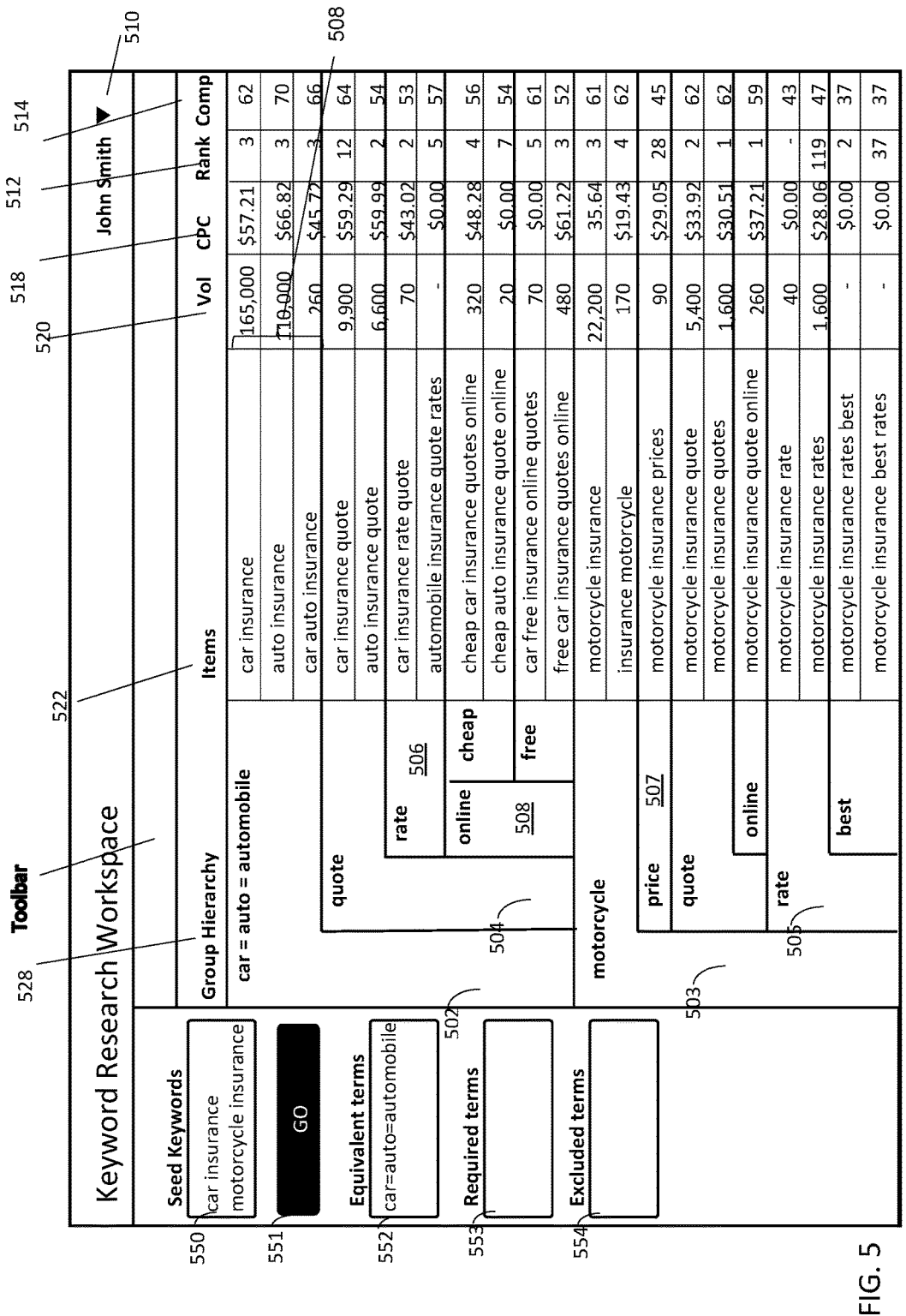
FIG. 5 is provided to illustrate the location of the hierarchy controller user interface element illustrated in FIG. 3 in the context of the entire user interface.

As seen in FIG. 5 the figure is the fact that all keywords are displayed in a single left aligned list 522 while still being grouped by the grouping blocks in a way that allows a user to easily understand the relationship between groups (i.e. the words are grouped visually in a hierarchical manner while still in a single vertical list).

Seed keyword box 550: Where user enters one or more keyword phrases to be used as input for pulling related keywords from the keyword data source (either an API or database) (e.g., "car insurance").

A user interface element such as a button 551 initiate the retrieval of keywords based on the seed and retrieval of keywords from other internal and external data sources. System 100 may also be configured to begin retrieval based on a keystroke or keystroke combination (e.g., pressing the "enter" key).

A user interface element including an equivalent terms input box 552 that allows the user to indicate equivalent terms to be used by the grouping algorithm. For example ["car"="auto"="automobile"] would treat each of these words as equivalent and the grouping algorithm would treat them as if they were the same word when applying grouping rules.

A user interface element including a required terms input box 553 that specifies one or more words that must appear in each keyword phrase in the list. Ex. "insurance" would ensure that all keyword phrases had this word. This functions as a filter. If the user removes a word from the Required terms box and presses the Go button the keyword column list would no longer be constrained to display only keyword phrases that contain at least one of the words entered into the Required terms box.

A user interface element for indicating words that should be used as a basis for excluding keywords from the resulting list. The Excluded terms input box 554 allows the user to eliminate keyword phrases from the list that contain at least one of the indicated words. For example, entering the word "truck" would ensure that no keyword phrase including the word "truck," such as "truck insurance," would appear in the keyword column list. This functions as a filter. If the user removes a word from the Excluded terms box and presses the Go button the keyword column list would contain the previously excluded phrases.

Other such user interface elements may be included such as (Not Illustrated): "brand input box" that allows the user to enter words that represent their company. For example, if the company name is "Joe's Cookies," then "joe" could be entered into the brand input box to eliminate any keywords from the keyword list containing "joe" or to group them separately. Similarly, a "competitor input box" that allows the user to enter words that represent their competitors. For example if the company has a primary competitor "Fred's Biscuits" then the user could enter "fred," to eliminate any keyword phrase with this term or group those terms separately.

"Stop words" configuration—Allows the user to enter words that they want ignored during grouping since they do not affect the meaning of the keyword phrase. For example, words like "of", "a", "in" do not typically change the meaning of the words in a keyword phrase. For example "car insurance phoenix" and "car insurance in phoenix" mean the same thing and should be in the same group. The system has a default list of stop words built in but the user can override the list.

Data grid contains a keyword list that contains keywords grouped together 522. All keywords are left aligned. The groupings are either determined by the grouping algorithm, the user or a combination of the two. The data grid also contains data associated with each keyword, group or targeted page.

As seen in FIG. 14 the data grid can contain keyword level data that is independent of a specific website 520, 518, 512. For example, data associated with each keyword such as known search volume in Google organic search 520, Average Cost per Click in Google® Adwords® 518 or competition level measured by a third party API or internal calculation 512. This information is independent of the particular site being optimized.

Data grid can also contain data regarding which data sources the keyword was discovered in. <add numbering; add source column to diagram>

Data grid can contain keyword level data for individual website under consideration. For example, the data grid can also include the keyword ranking position of the specified website 516 in one or more specified search engines (such as Google or Bing).

Data grid contains grouped items (keywords) 510 that are visually grouped together by the horizontal leg of a grouping block.

Figure 12:
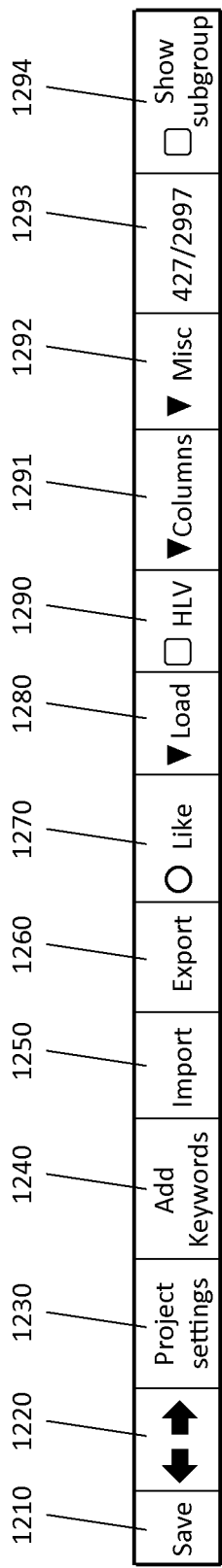
FIG. 12 is a schematic representation of toolbar containing UI controls for a user interface element for manipulating and displaying data in accordance with a preferred exemplary embodiment of the present invention.

As seen in FIG. 12, the invention includes a toolbar (and optionally a menu) to allow for operations to be performed on the project's information or display in the user interface.

UI contains controller to undo or redo 1220 one or more user actions.

UI contains controller to set project level settings 1230. These include setting the project's name, target domain (used during rank checking and other domain level operations), integration settings for third party APIs such as Google Webmaster Tools, Google Analytics, SEMRush. Other APIs can be integrated as desired.

In the project settings the user has the ability to control how much data is retrieved from each resource. These include limiting the number of keywords returned for each seed entered and limiting the number of keywords returned from a third party API. Additionally, the user has the ability to turn on or off the pulling of data for a data source or part of a data source. For example, a user may wish to pull traffic data from Google Analytics but not keywords.

In the project settings the user has the ability to enter the domains of other sites and have keywords and other associated information pulled in. This information can be obtained by third party APIs or an in house database.

In the project settings the user has the ability to toggle on or off the synonym generation functionality. If the user turns on this functionality then seeds entered are first processed through software that generates synonyms of the seeds and then passes those synonyms and the user entered seeds to the processing system that generates the keyword recommendations list. We call this functionality the Synonym Engine™. The synonyms generated are "entity equivalents" meaning that they represent the same concept exactly. For example entering "pool table" would generate the synonym "billiard table", "billiard tables" since they mean the same thing as "pool table."

The project settings contain the ability to enable the user to ensure that imported keywords are inserted into the project so that the keywords are visible in the UI. Since the system can be configure to only display say the top 200 groups some imported keywords might be placed in groups that are outside of this range. Enabling this feature ensures that the keywords and groups they are in are displayed in the UI.

UI contains a controller to allow the user to manually type or paste a list of keywords for import 1240. Additional information associated with the list as a whole or the individual keywords can be included.

UI contains a controller to allow the user to import keywords using a common file format like CSV 1250. The file is structured so that it includes all information required to load a previously exported project thus restoring the complete project including all seed keywords, Equivalent terms, required terms, excluded terms, grouping hierarchy, keywords and all data associated with keywords or groups.

The import system is flexible enough to allow the user to simply import a subset of the total data. For example the user can import a list containing just keywords and the systems will import them and perform appropriate processing based on project settings such as grouping the keywords and pulling data associated with them into the project. Any subset of the full data set that can be imported may be imported. User or system settings will determine what processing occur during import. For example, if the user imports simply a list of keywords they system can be configured to automatically pull volume and cpc values. Or if the import contains these values already then the system does not overwrite them.

The import system also can import CSV files containing a structure that is the result of export from a third party tool such as Google Keyword Planner.

UI contains a controller to allow the user to export data 1260. The user can export the entire project. The output is stored in a format such as CSV or other custom format. The configuration of the export file is such to allow the user to reimport the exported file and have the project fully restored. The format of the export is flexible enough to allow the user to edit the file before importing it. The system also allows the user to just export the portion of the project that is loaded in the current view in the UI. For example, if the user is viewing the "white" color tag view of the project then the user can export the current view's data.

Figure 37:
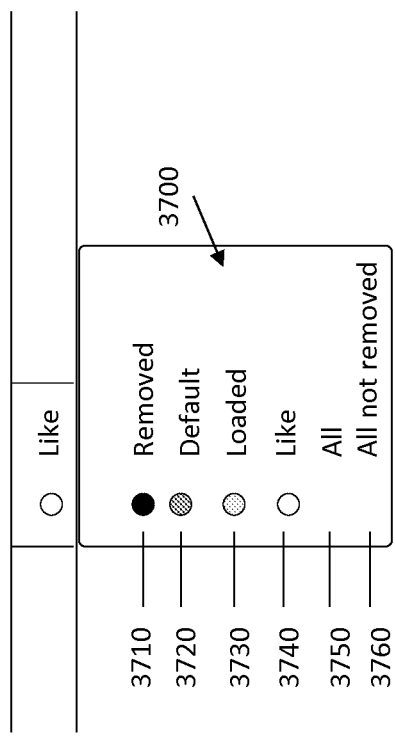
FIG. 37 is a schematic representation illustrating a user interface element for manipulating and displaying data in accordance with a preferred exemplary embodiment of the present invention—illustrates the UI controller for changing the "view" of the data based on "color tagging" of groups and keywords.

FIG. 37 displays a UI controller 3700 to select a color tagged view of the project. Since user's can tag groups and keywords the user will want to limit the view to view groups or keywords tagged in various ways. For example the user may want to view just the "white" tagged groups. The user can select from the menu "white" (3740) and only keywords and/or groups tagged as white would display in the UI. The user can select "black" (3710) to view keywords that have been removed from the project, or "gray" (3720) to view keywords and groups that are in their default state. The tagging system is flexible and can allow for custom tags and multiple tags to be applied to individual groups or keywords. In addition to viewing just a particular "color" view, the user can view the full list of keywords (3750) or the keywords that have not been tagged "black" (3760). Note that that these controllers are depending on the current systems configuration regarding the number of items to be loaded in the browser at one time. For example, if only the top 200 groups by volume are loaded in the browser then the color tag view controller (3700) displays only those items. The user needs to configure the system differently if they wish the result to calculate based on all keywords in the project.

UI contains a controller to allow the user to load additional groups in the display that are not loaded 1280. Since the system can be configure to display a subset of the data such as the top 200 groups by volume the user has a controller to load additional groups. For example the user can request to load the next 50 groups by volume or whatever other available parameters are configure at the time.

UI contains a controller to allow the user to display or hide columns in the grid 1291.

UI contains a controller to allow the user to toggle on or off the "high level view" 1290. See FIG. 48 for an example.

UI contains a controller to allow the user to pull on demand data for the entire project or current view 1292. For example the user can pull rankings for all keywords in the project or in the current view. Any data available in the grid that can be pulled for a keyword, group or block can be pulled at the project or view levels.

UI contains a controller to allow the user to recalculate the hierarchy 1292.

UI contains a controller that displays information about the number of keywords in the project and number of keywords loaded in the browser. Optionally this can be configured to show the number of keywords displayed in the browser (not necessarily the same as the number loaded), the number of groups in the project, the number of groups loaded or displayed in the browser.

UI contains a controller that allows the user to toggle on or off the display of "subpage groups" 1294. These are the rectangles that are displayed inside of the standard grouping blocks that are created in certain circumstances when two groups are combined.

UI contains controller to navigate to other areas of the tool such as to select a project, check usage limits for data, clear the current project so that it is in the state of a brand new project, upgrade or downgrade current subscription level, change password or sign out of the application 514 to work on.

The most preferred embodiments of the present invention comprise a user interface ("UI") that displays a visual representation of the hierarchical relationship between groups 528.

In the most preferred embodiments of the present invention, a grid contains page level (or group level) information for individual website under consideration (see FIG. 14). For example, the data grid can also include the number of visits 1420 from search engines to a specific webpage 1410 of the website under consideration. As another example, a metric that measures the strength of the webpage as measured by ways that are known to those experienced in SEC) utilize 1430. These values relate to a page (URL) 1420 as a whole and not any specific keyword.

Data grid can display miscellaneous user defined or system defined group level information in a column in a similar way to the way the number of organic visits to a page is displayed.

In addition to the automatically calculated display of grouping blocks, the user may adjust the display as necessary or desired for more effective and efficient processing. Manual changes to groups and grid data include at least the following capabilities:

Manually move a keyword 1030—A user can click and drag a keyword from one group to another.

Referring now to FIG. 21, FIG. 22, FIG. 23, FIG. 24, FIG. 25, FIG. 26, FIG. 27, FIG. 28, FIG. 29, and FIG. 30, the most preferred embodiments of the present invention allow a user to manually combine groups by drag and drop.

Keyword delete button 1010—Each item row for each keyword will have a button that when clicked will remove the keyword from the list. When deleted the keywords will be tagged as "black" using the color tagging system. The system will also provide users with the option of deleting the keywords permanently from the project.

Each grouping block will have two delete buttons 870 and 893. The one located on the horizontal leg will remove the horizontal leg of the grouping block and all of its associated keywords and data in that row. The one on the vertical leg will remove the entire block including all keywords and subgroups within its scope. These functions are also available by contextual menu or keyboard shortcut or "delete key."

Figure 16:
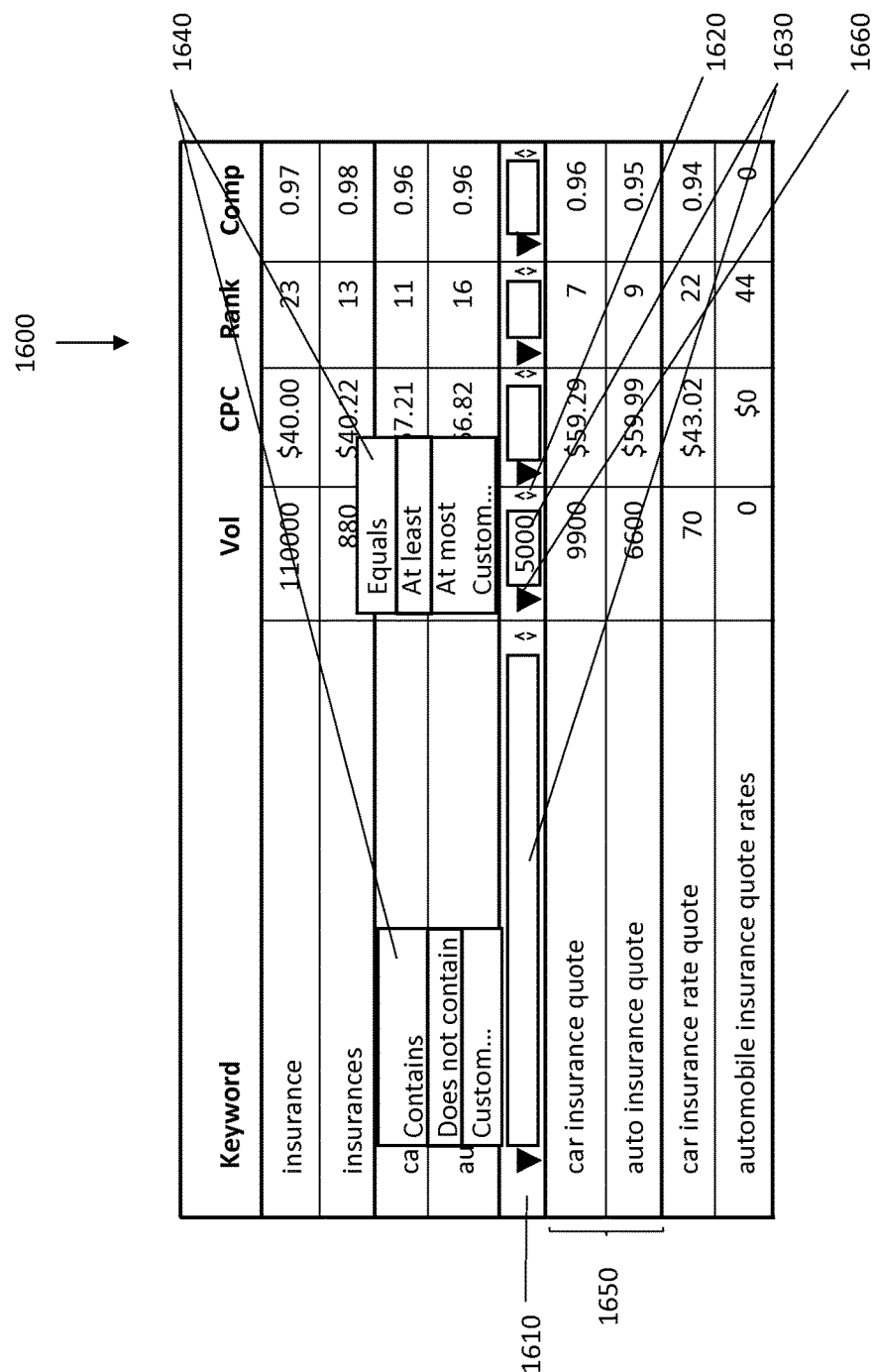
FIG. 16 is a schematic representation of a data grid illustrating the column controls available at the group (page) level used in conjunction with a user interface element for manipulating and displaying data in accordance with a preferred exemplary embodiment of the present invention.

Sort functionality at the group level FIG. 16—Functionality to allow a user to sort and/or filter the data in that group by any column metric or combination of metrics. This same functionality is available at the top of the entire table of data to sort and filter the entire project's data or a subset of the data such as what is currently viewed in the browser or based on user or system defined parameters.

Page and Group level keyword recommendation generation interface elements 910, 920—Users may want to generate more keywords for individual groups or all subgroups (including the parent group) of a given group (similar to the way a seed keyword is used to generate the original keyword list). To accommodate this each grouping block can have two buttons. The first interface element 910 when clicked will allow the user to enter a seed keyword to populate a particular group with additional keywords. The second interface element 920 when clicked allows the user to enter a seed keyword to populate the group and all subgroups with additional keywords. There is also a way to indicate to the software that the user is done entering the seed keyword and wants the software to perform the action of adding the additional keywords to the group or groups such as pressing the Enter key or clicking a button. This method can also be used on empty blocks that the user has created and that they want to populate with keywords and data.

Manually add a keyword to group 1020, 1110—The user can manually create a new item row in a group and enter a keyword. A button will be provided when the user places the mouse at a location where a keyword can be inserted (or another mechanism such as a contextual menu will be provided). This function also allows the user to add a word to a group that is already in another group. Although the default algorithm groups keywords into mutually exclusive groups there are times where a user may need to optimize two pages for the same term.

Button 1210 is a user interface element that allows the user to save current state of the data in the display.

Column in grid to represent the URL of the page the user wishes to target the keyword group to 1420. This URL can be manually added by the user or an algorithm can suggest the URL contained on the site entered in the "domain" setting in the project settings.

Other Grid Data

Each item row can display a keyword optimization score for each keyword 1710. This value indicates how well the page at the indicated url is optimized for each keyword listed in the group. This value is on the item row for each keyword. This is accomplished when an algorithm analyzes content and meta data of the page on the website identified by indicated page url to determine how well optimized the page is for each of the keywords in the group. Each keyword is scored individually. The score may be a letter grade or numerical score. This allows the user to see, at a glance, the relative on-page SEO optimization for a given set of keywords assigned to a given page. Additionally, the user may establish a minimum threshold to ensure a baseline level of SEO success. By adjusting the groupings and keywords within the groupings, the user can try to maximize the SEO ranking for a page. System 100 may be programmed to automatically make adjustments until the SEO score meets or exceeds the user configurable threshold.

Each item row can display the sources of the row item 1720 (i.e. data source or sources where that item/keyword was found). For example if a keyword such as "insurance" was imported into the system manual the letter "I" could be indicated to mean "imported." If the keyword also appears in the Google Webmaster Tools data pulled in the letters GWT could display, if the keyword is also in databases containing information about two competitors C1 and C2 could be displayed representing the two competitors in the order they were entered into the system. This information helps the user determine the value of each keyword and whether they wish to include it in their strategy at the present time. These abbreviations are either system defined or user defined or a combination of the two.

In at least some preferred embodiments of the present invention, the user interface may also provide an interface element for the user to toggle the functionality of the "delete" keyword buttons into "keep" keyword buttons in any page group or larger group. This may particularly useful if there are only a few of the keywords listed in a group that the user wants to keep.

User controls at various levels of the grouping block hierarchy and data grid are available to make interacting with the UI easy, intuitive and highly productive. For example, cell controls interface elements (e.g., buttons or contextual menus) may be included to allow control within individual grid cells such as the one containing a keyword there will be controls to allow a user to delete, add, etc. the data in that cell. In yet another example, the user may use the keyword in the cell as a seed for a group it belongs to. Another example, is right-clicking a cell in the ranking column and selecting from a context menu a command to initiate an on-demand rank check for the keyword.

Figure 10:
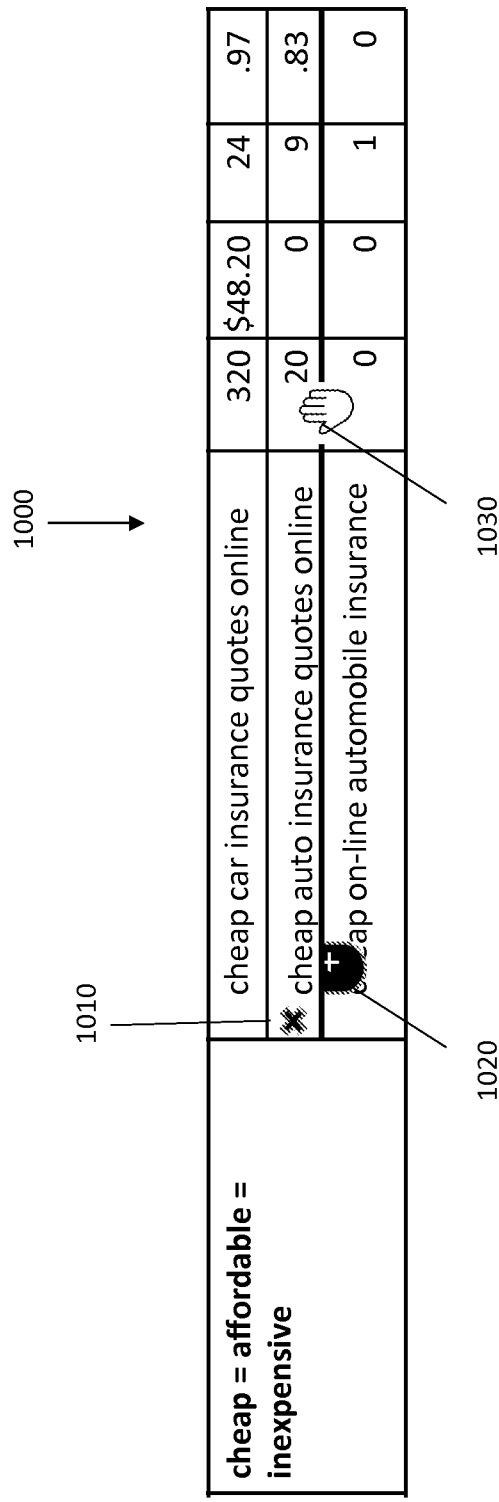
FIG. 10 is a schematic representation of grouping blocks and UI controls for a user interface element for manipulating and displaying data in accordance with a preferred exemplary embodiment of the present invention—this diagram illustrates functionality available for an individual item row.

The item row controls shown in FIG. 10 may be used for interacting with individual rows such as those containing individual keywords. Available controls include a delete button 1010 that serves to remove the keyword from the group, a controller for inserting a keyword into a group 1020, a controller for dragging and dropping a row into another group 1030. Also available to an individual row is a context menu that allows the user to perform operations on that row such as checking the target site's ranking for the keyword or requesting a metric representing the difficulty of ranking for that keyword. Any metric or data that can be displayed in the row can be requested via context menu. In general controllers, widgets or icons or displayed information on an individual row control or represent information for a group defined by that row. A context menu available by right-clicking the row constrains its function to the information or functions available for that row. When a row is clicked it is highlighted so that it is clear to the user that it has been selected.

Figure 8:
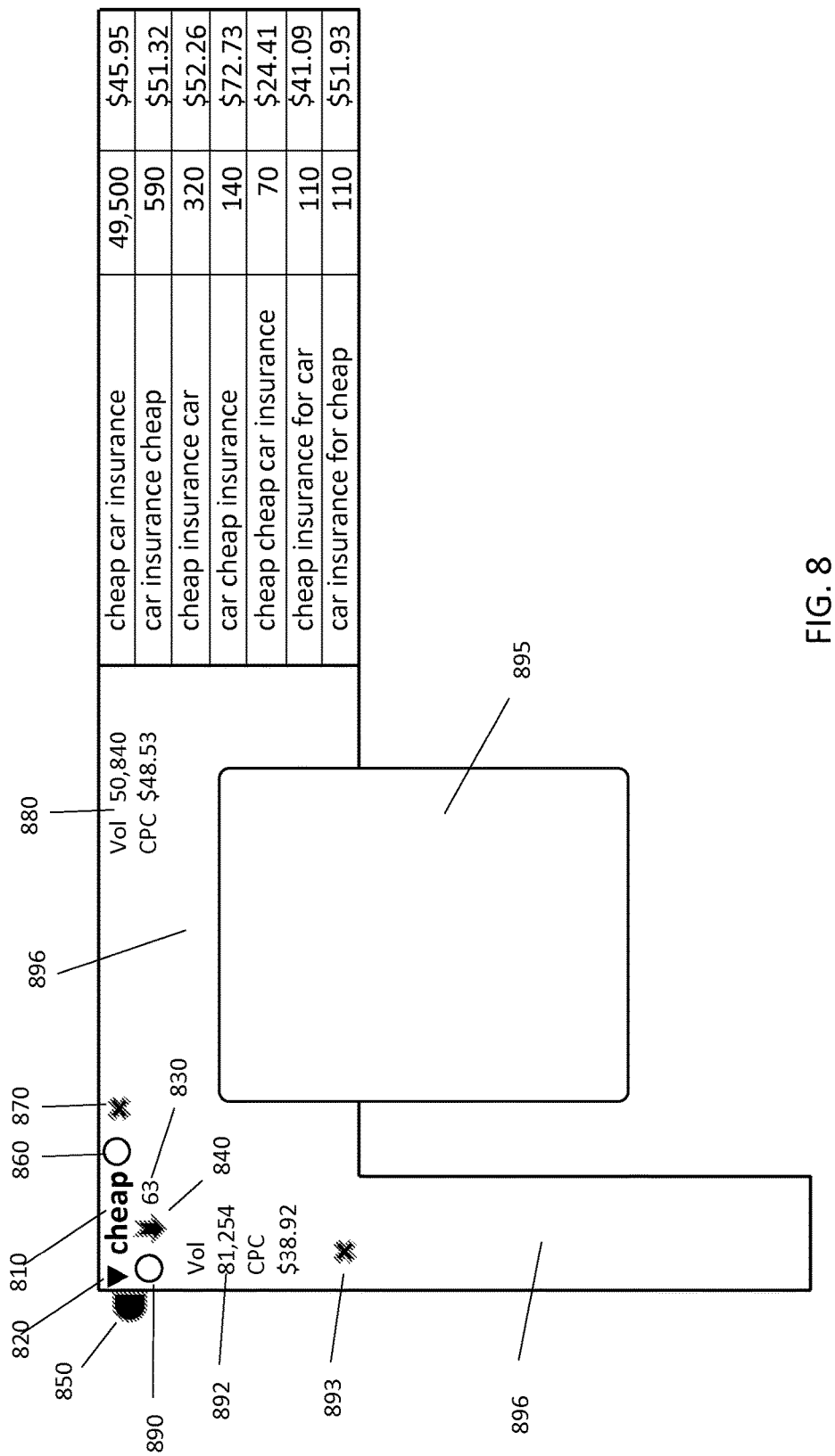
FIG. 8 is a schematic representation of grouping blocks and their associated data that displays available UI controls within the grouping block via a user interface element for manipulating and displaying data in accordance with a preferred exemplary embodiment of the present invention—this diagram illustrates a grouping block and typical data and user controls.

As seen in FIG. 8., group row controls (860, 870, 880, 895) lie on the horizontal leg and affect item rows within a group row. Just like the functionality available to the individual keyword row such as requesting rankings the same functions can be performed at the group level for all of the keywords in that group at the same time. Functions can be performed with available widgets on the horizontal leg of the grouping block or via context menu. For example, the user can initiate rank checking for all of the keywords in the group Also, populating additional keywords 910 to the item group by entering a seed or checking rankings for all keywords in the page group. Button or contextual menu as appropriate. A color tag controller is also available on the group level 860. In general controllers, widgets or icons or displayed information on the horizontal leg control or represent information for a group defined by the horizontal leg. A context menu available by right-clicking the horizontal leg constrains its function to the information or functions available for items within the scope of that horizontal leg. A function is available, via context menu for example, that allows the user to enter the defining term represented by that current blocks defining term into the "Excluded terms" box. Each row item, such as a keyword, can contain data associated with the item. This information is displayed in the table's columns. Not all controllers display at all times on a grouping block. For example, when a user hovers the mouse over the block certain controllers become visible such as the delete buttons and the widgets that allow the creation of horizontal and vertical legs. When a horizontal leg is clicked it and all of the information in the grid to its right is also highlighted so that it is clear to the user what information has been selected.

As seen in FIG. 8., group block controls 890, 893 lie on the left side of the block to indicate that they are associated with the vertical leg. At the block level there are controls analogous to those for the group row controls (horizontal leg controls) are available at the block level. The difference is that these perform their function on all information within their scope which is the entire block. This includes a contextual menu affecting all item rows and group rows falling within the scope of the grouping block that currently has the focus. Also, contains a control for adding additional keywords to the entire group 920 and all subgroups or checking rankings for all keywords within the scope of the group. If the block is a "vertical leg only" block then there is a function available via context menu for example that adds a horizontal leg to the current vertical only leg. If the block is an L-block then there are separate controllers on each leg. Those controls on the horizontal leg affect items associated with the horizontal leg. Those controls on the vertical leg affect items within the scope of the entire block including all subgroups and the horizontal leg.

For example, this information can contain summary information such as the total search volume for the keywords within the scope of that horizontal leg. The type of information need not be limited to summary information. This information can be system defined or user defined. The block will display as many lines of this information as will fit in the visible part of the horizontal leg. Hovering the cursor over this information will reveal a popup that displays all of the information including any that was out of view. Similarly, hovering the cursor over the defining term will reveal a popup displaying it in its entirety. This is useful if the defining term is very long is truncated. If the user A horizontal leg (whether "horizontal only" or part of an L-block displays metrics associated with the information within the scope of the horizontal leg. The vertical leg contains information and controls analogous to the horizontal leg but reflect the scope that the entire block encompasses. Each grouping block regardless of its type can display a controller that can load additional keywords that are already in the project but not yet loaded in the browser.

This controller also has a number next to it that displays how many subgroups that are not yet loaded exist for this group. The user can use this controller to load some or all of these subgroups. Every block is at a particular level in the hierarchy. As a convenience to the user there is a controller that allows all blocks at a particular level to be collapsed so that only a horizontal leg is visible. This is available through a context menu. Since grouping blocks can be moved to change their precedence in the hierarchy a controller is available to move them higher in the hierarchy by using the context menus as opposed to using the drag and drop functionality. When a vertical leg is clicked it and all of the information within its scope including the horizontal leg if there is one and all subgroups within its scope is highlighted so that it is clear to the user what information has been selected.

Grouping blocks are not limited to use only with keywords. They are general purpose grouping and hierarchy management tools. As such the grouped items can be an informational construct such as those used in the medical industry, construction industry, financial industry or and other use where grouping information particularly grouping hierarchical information can be utilized. This means that the controllers and displayed information for these groups will be significantly different from those for keyword research. In any event, the principle that rows represent items with their associated data, horizontal legs represent groups of items, and blocks represent groups of groups of information will remain. This means that the controllers will perform different functions than depicted here but functions available at a row level will affect only elements in the row, that items within the scope of a horizontal leg will be affected by controllers associated with the horizontal leg and controllers associated with the entire block, and generally displayed on the vertical leg, will affect the entire block including any horizontal leg and all of the subgroups within the scope of the block.

Since grouping blocks are ultimately general purpose they need not only represent concretes like keywords, or shoes. But can represent the grouping and hierarchy inherent in processes. If multiple processes must per performed at the same time or must start or complete at the same time grouping blocks can be used to represent the process. Since grouping block do not simply present information but are tools for interacting with that information grouping blocks can be used for driving and managing processes much the same what that project management software is used. In particular, grouping blocks can be deployed in a similar fashion to Gantt charts. But grouping blocks have particular advantages over Gantt charts in that Gantt charts don't involve vertical rectangles, only horizontal rectangles. This means that Gantt charts do not make is easy to perceptually see what depends on what or what processes must start after others. The grouping block's vertical leg can provide a more definitive visual cue where processes start and stop and showing what processes are contained within other processes or before or after other processes. In this scenario the grouping block could have multiple types of vertical legs. A vertical leg could be upward instead of down as used in our keyword research scenario. Grouping blocks could have multiple simultaneous vertical legs both up and down. And the blocks can have controllers that perform on the items within the scope of each type of leg to help the user do their work.

Figure 59:
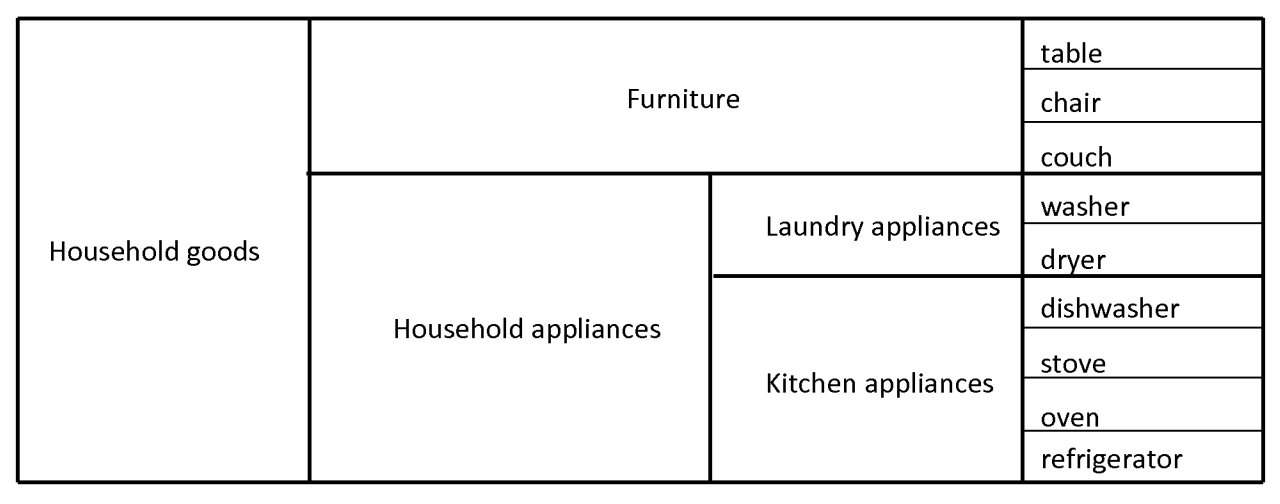

Referring now to FIG. 59. This is an example of grouping blocks used to group types of object found in a home. The grouped items are listed in the far right column which includes "table", "chair", etc. The groups to the left of this list are the grouping blocks. So the category grouping block with defining term "furniture" has three items in its group namely "table, "chair", "couch." Notice in this example only "vertical only" and "horizontal only" grouping blocks are used. There is no need for an L-block in this case. The reason for this is that in the real world only physical objects exist. For example, the concept "chair" is a first level concept because it refers to an existent (a thing that exists) namely a chair. Chairs actually physically exist in the world and you can point to one. But higher level concepts such as furniture do not directly refer to things in the world. They refer to other concepts. So in the case of the concept "furniture" there is no generalized "furniture" object in the world. There are tables and chairs but no standalone "furniture" objects. That is why there is no L-block in this example. Alternatively, although there is no real world construct that is "furniture" the business owner could have a room dedicated to displaying the furniture. The diagram could be updated to include an L-block with the horizontal leg designating that room. For each room the diagram could use an L-block in a similar manner.

Referring now to FIG. 60. This is an example of grouping blocks used to group types of spiders in the field of arachnology, the scientific study of spiders. In this example only vertical only and horizontal only grouping blocks are used. The reason that no L-block is needed is for the same reason as in the furniture example.

For each of these cases specialists in these areas would have need for manipulating this grouped hierarchical information in ways that are appropriate to their fields. A household goods store would have needs for manipulating their inventory based on categories that could be managed by grouping block based user interface controllers. They could display specialized data within the blocks to show total units on hand in much the same way that for keyword research total search volume was displayed within the grouping block. Any metrics that make sense to those in the field could be displayed within the grouping block. Additionally controls could be added to the block to allow users to manipulate the data or perform specialized functions to items within the scope of blocks. For example, a homegoods store owner could click a controller on a block to initiate an inventory check on all items listed in the group. Additionally standard grouping block functions like moving, combining, deleting them, etc. could be made available to the user.

Similarly, scientists may also have specific information they would find useful displayed in the vertical and horizontal legs of the grouping blocks as well as specialized functions that the grouping blocks should perform.

Figure 61:
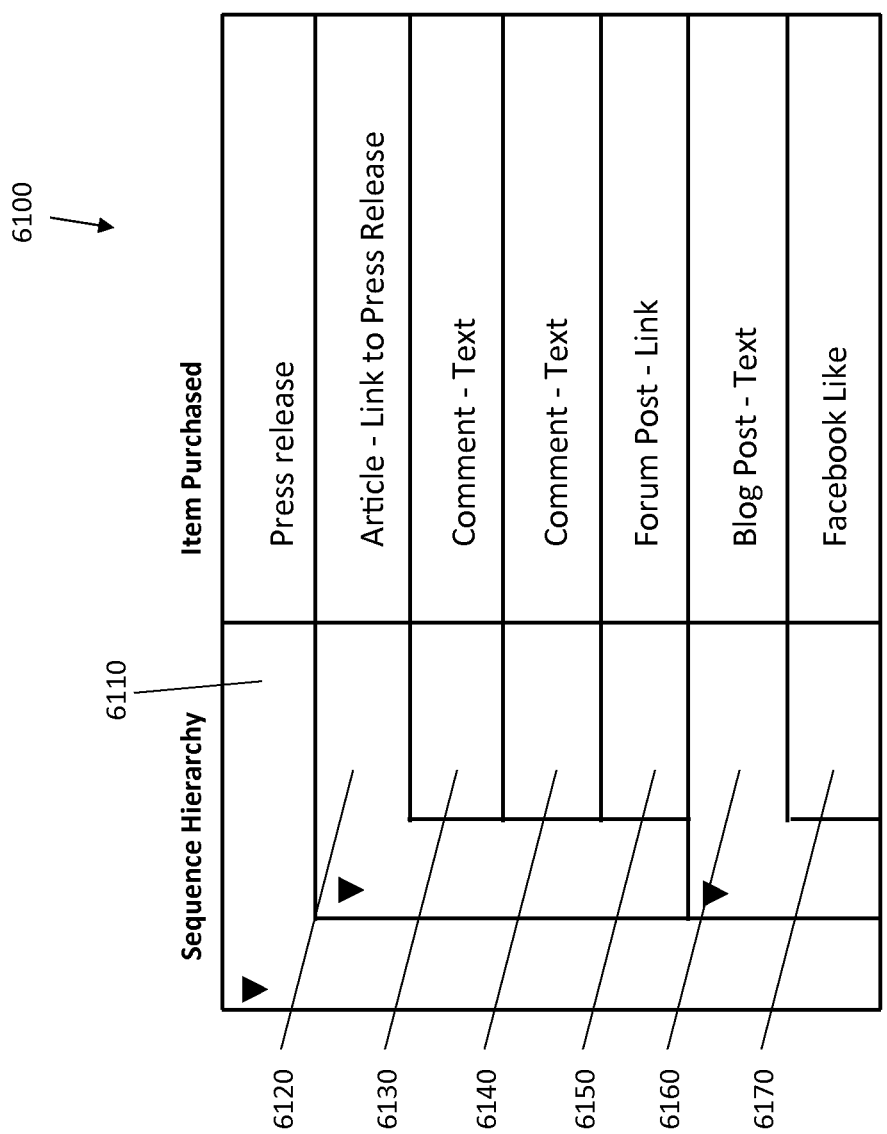
FIG. 61 is a schematic representation illustrating a user interface element for manipulating and displaying data in accordance with a preferred exemplary embodiment of the present invention—illustrates the use of grouping blocks to group tasks in a process relating to the field of Internet marketing to illustrate the use of grouping blocks outside the area of keyword research.

Referring now to FIG. 61. Grouping blocks are not just limited to category and semantic groupings. They can be used to group processes. FIG. 61 shows an example use in the area of Internet marketing. In Internet marketing there are many tasks that must be performed during a marketing campaign. Often these tasks are time dependent on one another. The placement of an article on a web site that is to link to a press release on another website cannot be placed live on the site until the press release is live on the press release site. This relationship can be displayed using L-blocks (6100) with the placement article containing the link (6120) as a subgroup of the task of getting the press release live (6110). If the Internet marketer then wants to coordinate multiple people who will then go to the article and place comments (6130)(6140) on the article page plus have a person comment on a forum (6150) with a link to the article then these tasks are subtasks of the article placement since they can't be performed until the article is live. This type of time depended relationship is very difficult to visually interpret by users using conventional visual tools for displaying time dependent relationships such as Gantt charts. The vertical leg of the grouping block makes it easy for users to instantly perceive the time dependent nature of the tasks.

Just as in other scenarios listed here the grouping blocks can both display relevant information to the users within the area of the block as well as provide tools through visible widgets on the blocks or through a context menu or other UI controllers. Automatic processes can also manage these blocks based on system defined or user defined rules. As with other grouping blocks a full complement of tool can be made available such as collapsing grouping blocks, combining, moving, deleting, etc.

System 100 comprises standard user management functionality that will also be accessible via user interface 300.

Figure 4:
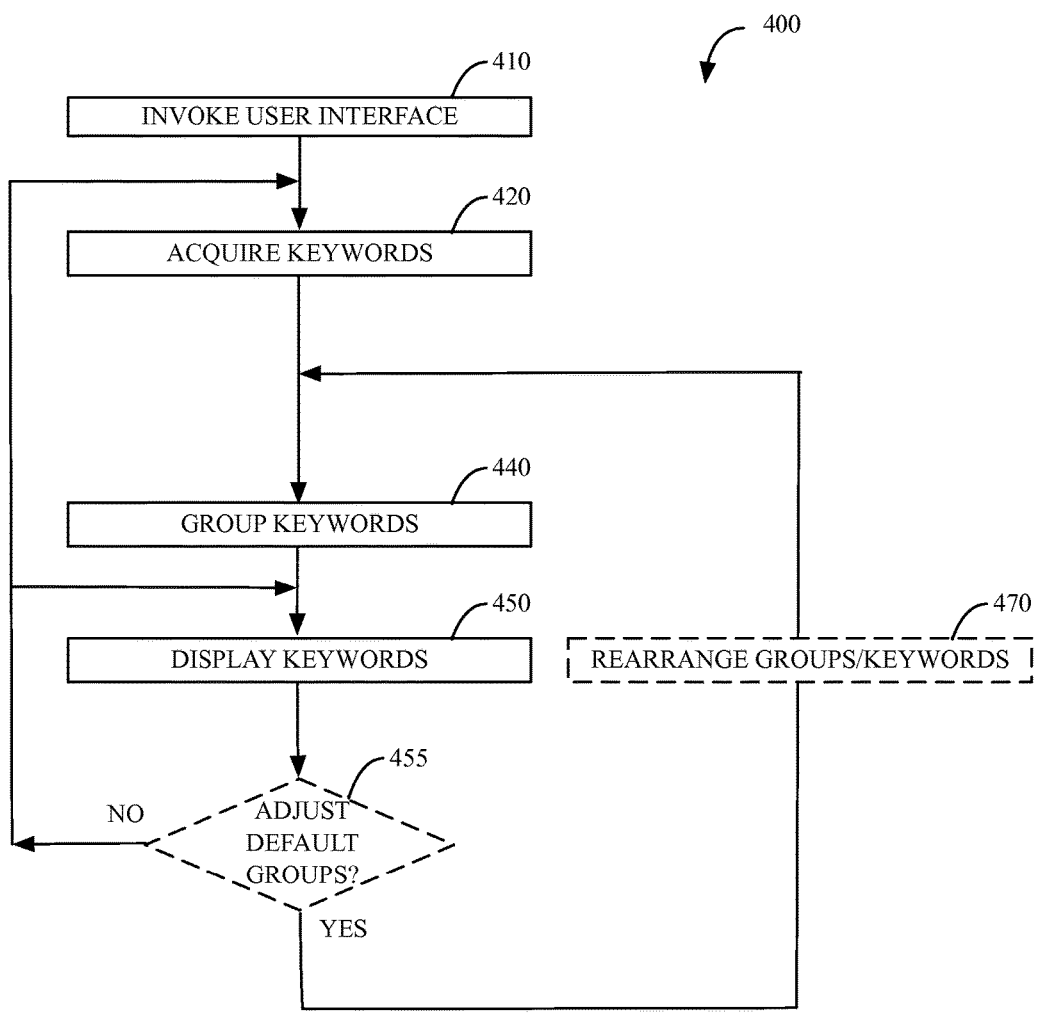
FIG. 4 is a flow chart of a method of manipulating and displaying data in accordance with a preferred exemplary embodiment of the present invention.

Referring now to FIG. 4, a flow chart for a method 400 for in accordance with a preferred exemplary embodiment of the present invention is depicted. As shown in FIG. 4, a user will invoke a user interface (step 410) to begin interaction with system 100 of FIG. 1. Those skilled in the art will recognize that the various steps show in FIG. 4 are not necessarily conducted in the exact sequence shown and other sequences may be readily adapted to accomplish the objectives a given campaign or application of grouping as set forth herein. For example, the equivalency, negative terms, and required terms very often might be entered at the same time the seed is entered.

The user will initiate the input of keywords into the system. The system is design to take input of keywords from many sources including pulling from third party APIs, the system's internal database, external databases, manual import directly into the system by the user using a variety of methods.

In the case where the user identifies one or more seed keywords of interest and input the keyword(s) into the appropriate user interface element as described in FIG. 3 (step 420) and the algorithm associated with system 100 will fetch and return a set of related keywords (step 430). As previously explained, the related keywords may be obtained from any viable source, including external databases offered by various commercial providers as well as other sources, including a database of previously created search results or any combination thereof.

System 100 will then group and display the keywords that where input into the system through the multiple ways available in the user interface, as shown in FIG. 3 (step 440 and step 450). The keywords are initially displayed in a hierarchical grouping determined by the algorithm associated with grouping mechanism of FIG. 2. As shown in FIG. 3, each grouping may contain multiple subgroupings. In general, the smallest grouping displayed to the user will represent a single page of a website when the invention is used for keyword research. Since all of the keywords in this group are very similar, it will generally make sense to target these related keywords on the same page of the target website.

The user will then have the option of adjusting the default group display (step 455) by adjusting the default groupings and subgroupings and/or adjusting the default sort order. The user can manually adjust the groupings in at least these ways:

The user may define word equivalency instructions as part of user interface 300. There is one of these boxes on the left side of the interface (e.g., "car"="auto"="automobile"). Additionally, the user can decide whether or not to treat singular and plural versions of a word as considered equivalent.

Negative terms: User enters words that must not be in any keyword displayed. The keyword list is updated displaying only keywords that do not include the user entered "negative" terms. The grouping blocks are reconfigured and redisplayed to reflect the changes.

Required terms: User enters keywords that must be in all keyword phrases. The display updates.

Next, the User may optionally choose to manually drag an individual keyword phrase from one group to another. This word should stay in the group it is dropped into even if some of the groups are auto updated when a user enters new seed keywords. The user may also optionally chose to manually drag a group onto another group to combine them. Click a grouping block and drag onto another one. (Step 470).

User adds or deletes keywords in the seed list. If the user has not saved then the whole display recalculates. If the user has saved, then entering new seeds adds new keywords among the existing saved keywords.

Delete groupings and associated keywords from the display. Two levels of delete may be selected by the user: 1) Never show this again; and 2) keep available for potential later use. User interface 300 will make it easy to view keywords of the second type and make it harder to view keywords that have been placed in first type (e.g., more steps to locate and placed on submenus, etc.). In this fashion, screen real estate can be used to make the search and review process more efficient.

Use seed entry textbox for keyword generation at the item group level 910. User clicks a button on a grouping block to populate additional keywords to the "page" level group. This process can also be initiated by contextual menu. Alternatively, the user can elect to use one or more of the keywords already in the group as a seed. Those skilled in the art will recognize the time saving advantages and ease of use by a system that allows users to initiate additional keyword discovery at the group level "inline" in the UI and not having to change screens.

In at least one preferred embodiment of the present invention, a user may use seed entry textbox for keyword generation at any group level 920. User clicks a button on grouping block 920 (a different button than that for seed entry for the item group level) allowing the user to enter a seed keyword to populate additional keywords to the entire group including all subgroups. This process can also be initiated by contextual menu. Alternatively, the user can elect to use one or more of the keywords already in the group as a seed. Those skilled in the art will recognize the time saving advantages and ease of use by a system that allows users to initiate additional keyword discovery at the group level "inline" in the UI and not having to change screens.

Manually add an empty group (e.g., a grouping block with no items). This could be performed by right clicking on an existing grouping block to insert above the current block, or a + icon could appear when you hover over the line between two grouping blocks. If there are no grouping blocks in the display then the user can add a grouping block by using a contextual menu available by right clicking on the background (canvas).

The user may also choose to alter the default sort order. In general, the default will be to sort the relevant keywords by volume, from high to low. However, the user may wish to alter this and choose to alter the search and sort functions for various displays of the relevant keywords.

If the user chooses to make any of these adjustments (step 455="YES") then the user interface will continually present an updated display of the keywords by regrouping the keywords (step 440) and displaying the keyword groupings (step 450). If the user elects not to adjust the default group display (step 455="NO"), then the user may continue to interact with System 100 and identify one or more keywords for searching as before (step 420).

Figure 18:
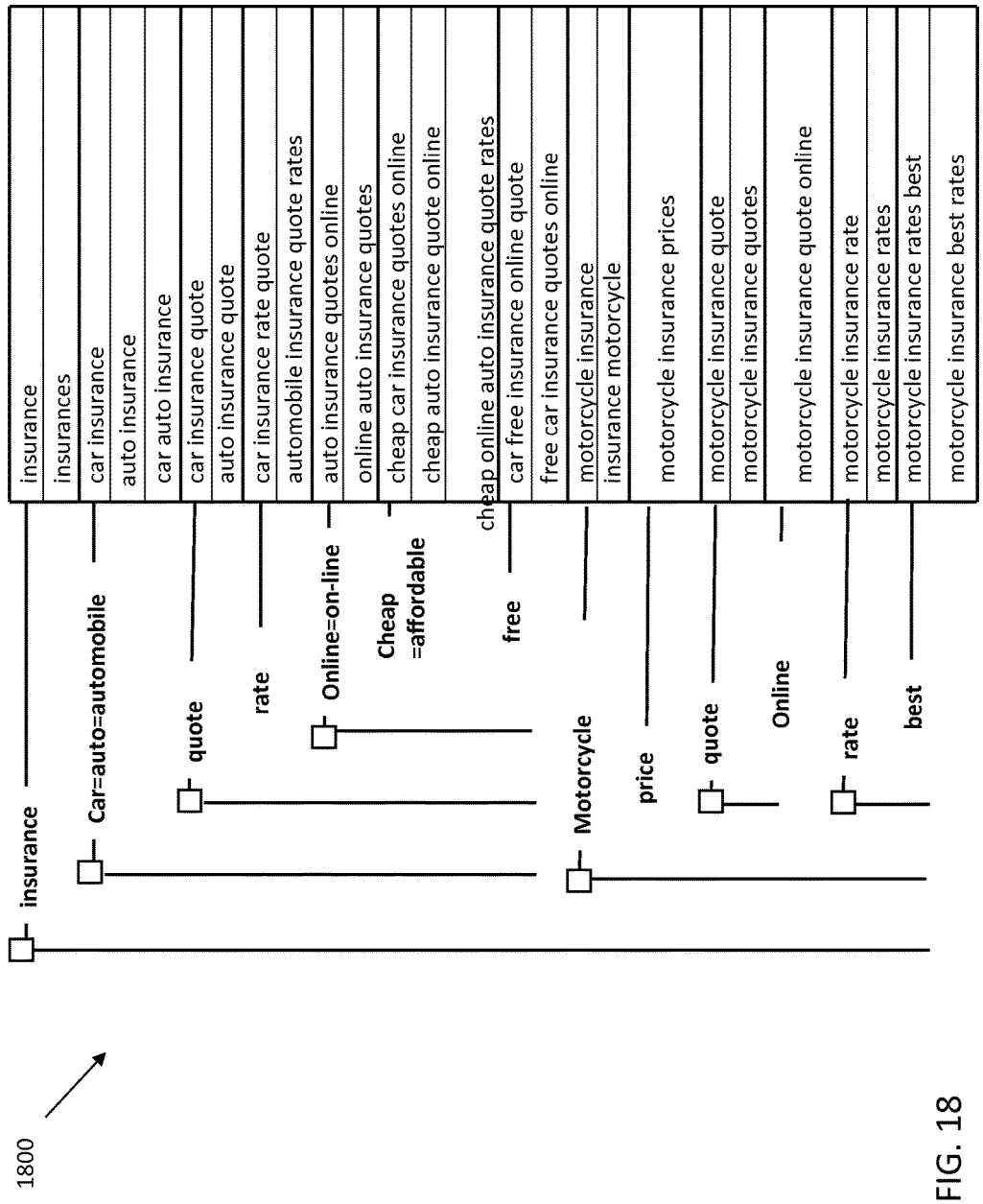
FIG. 18 is an alternative version of the main data grid schematic representation of grouping blocks and UI controls for a user interface element for manipulating and displaying data in accordance with a preferred exemplary embodiment of the present invention.

Referring now to FIG. 18, a schematic diagram illustrating a user interface element 1800 for manipulating and displaying data in accordance with a preferred exemplary embodiment of the present invention is depicted. As shown in FIG. 18, an alternate version of a hierarchy controller in accordance with a preferred embodiment of the present invention is displayed. This version embodies many of the features that make grouping blocks so useful yet display the hierarchy UI controllers with lines instead of blocks including: allowing all items to remain left aligned in a single list while provide providing functionality such as collapsibility. This version uses lines instead of blocks for illustrating and manipulating the hierarchy. Each horizontal line is at the top (or middle) of each group and goes through the defining term of the group if there is one.

Figure 6:
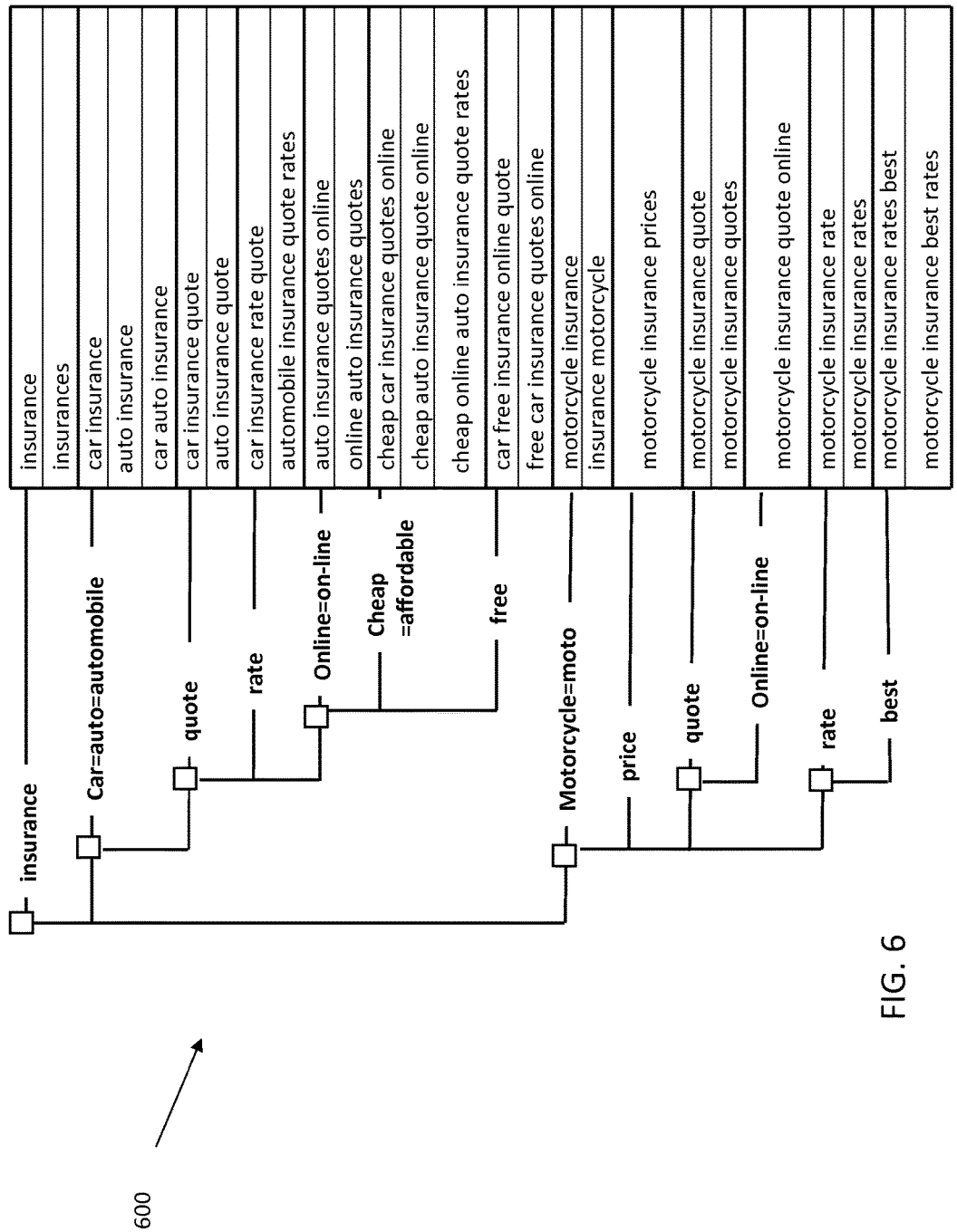
FIG. 6 is an alternate version of a hierarchy controller user interface element for manipulating and displaying data in accordance with a preferred exemplary embodiment of the present invention.

Referring now to FIG. 6, a schematic diagram illustrating a user interface element 600 for manipulating and displaying data in accordance with a preferred exemplary embodiment of the present invention is depicted. As shown in FIG. 6, an alternate version of the grouping block hierarchy controller is depicted.

Figure 7:
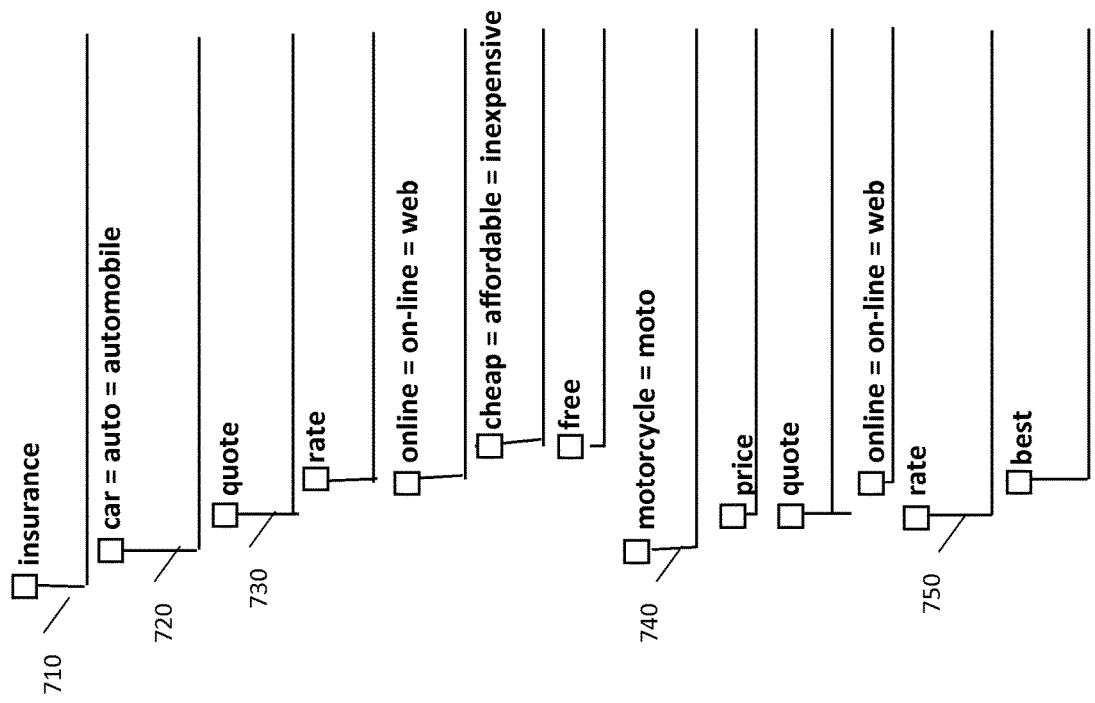
FIG. 7 is another alternate version of a hierarchy controller user interface element for manipulating and displaying data in accordance with a preferred exemplary embodiment of the present invention.

Referring now to FIG. 7, a schematic diagram illustrating an alternative user interface element 700 for manipulating and displaying. As shown in FIG. 7, an alternate version of the grouping block hierarchy controller. This version is similar the version seen in FIG. 6 except in this version there are no visible horizontal connectors at the top of each group. The group is most preferably indicated by a vertical line that turns to the right to indicate the bottom of the group.

The hierarchy controllers illustrated in FIG. 6 and FIG. 7 have many usability differences when compared the "block" style FIG. 3 or even the line style in FIG. 18. One of those differences is that some users may find it visually more difficult to visualize the groups at the same level in the hierarchy. A solution to this problem is to optionally introduce vertical lines (or shaded areas) behind the hierarchy controllers create vertical columns or "swim lanes" to help the user visualize how many levels down a particular level is in the hierarchy.

Referring now to FIG. 8, a schematic diagram illustrating a user interface element 800 for manipulating and displaying data in accordance with a preferred exemplary embodiment of the present invention is depicted. As shown in FIG. 8, the UI displays the defining term (810), provides a widget to collapse the vertical leg of a block to hide all of the block's subgroups (820), number displaying the number of not yet displayed subgroups that are subgroups in the scope of this block (830), widget to display the not yet displayed subgroups (840), widget to manually insert a grouping block to the left of the current block (850), "color tag" widget on the horizontal leg that user clicks to indicate their interest in targeting the group defined by the horizontal leg (860), delete group widget that deletes the horizontal leg and it's group (870), summary metrics (880) that summarize data in the table columns such as providing total search volume for the group and average CPC, analogous vertical leg widgets (890)(892)(893) clicking the color tag on the vertical leg (890) changes all subgroup color tags to the same color (user can manually change individual subgroup color tags at anytime), delete entire block widget (893), summary metrics on the vertical leg (892) summarize the table data for the table data within the entire block's scope, context menu available by right-clicking on the horizontal leg (895) (the vertical leg also has a context menu (not pictured). Context menu provides functions that apply within the horizontal leg's scope if using the context menu on the horizontal leg or functions applicable to the entire block if using the context menu available on the vertical leg. User can click the right leg (896) to drag it as well as click the vertical leg (896) to drag the entire block.

a method such as a grabber hand 830 to drag grouping blocks, and two buttons used to make available textboxes used to enter seed keywords for page level 810 or block level 840 keyword (item) discovery. Grouping blocks also contain a "color tag" widget, "load subgroup" widget and various context menu functions as explained elsewhere in this document.

Figure 9:
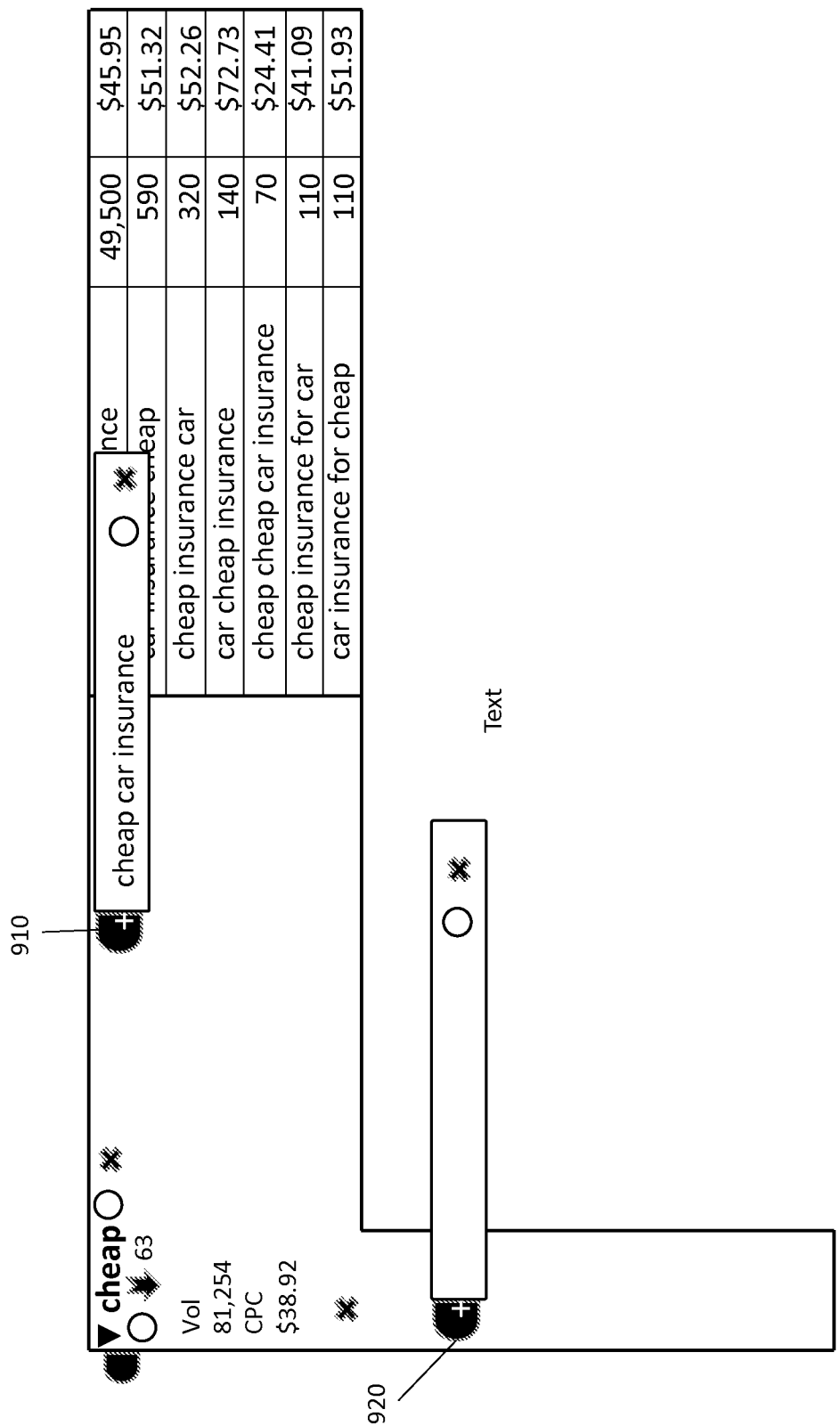
FIG. 9 is a schematic representation of grouping blocks and shows UI controls for entering seed keywords for the group ("page level") or larger block level (including subgroups) ("group level").

Referring now to FIG. 9, a schematic diagram illustrating a user interface element 900 for manipulating and displaying data in accordance with a preferred exemplary embodiment of the present invention is depicted. In addition to the method previously described where the user can manually build a grouping block hierarchy and manually indicate the Group Rule for each block in the hierarchy and then have the system populate the blocks with keywords, the user can insert seed phrases directly into the grouping block and have each block populated based on that seed. As shown in FIG. 9, a close up of grouping blocks and shows UI controls for entering seed keywords to have the system pull additional keyword recommendations into the group ("page level") 910 or larger block level (including subgroups) ("group level") 920;

Referring now to FIG. 10, a schematic diagram illustrating a user interface element 1000 for manipulating and displaying data in accordance with a preferred exemplary embodiment of the present invention is depicted. As shown in FIG. 10, a close up of a group row showing UI controls for inserting a row item (keyword) 1020, as well as deleting a row 1010. The tab with the + symbol 1020 is clicked by the user which when clicked inserts a new row and provides a textbox 1110 for the user in the new row where the user can enter the keyword.

Figure 13:
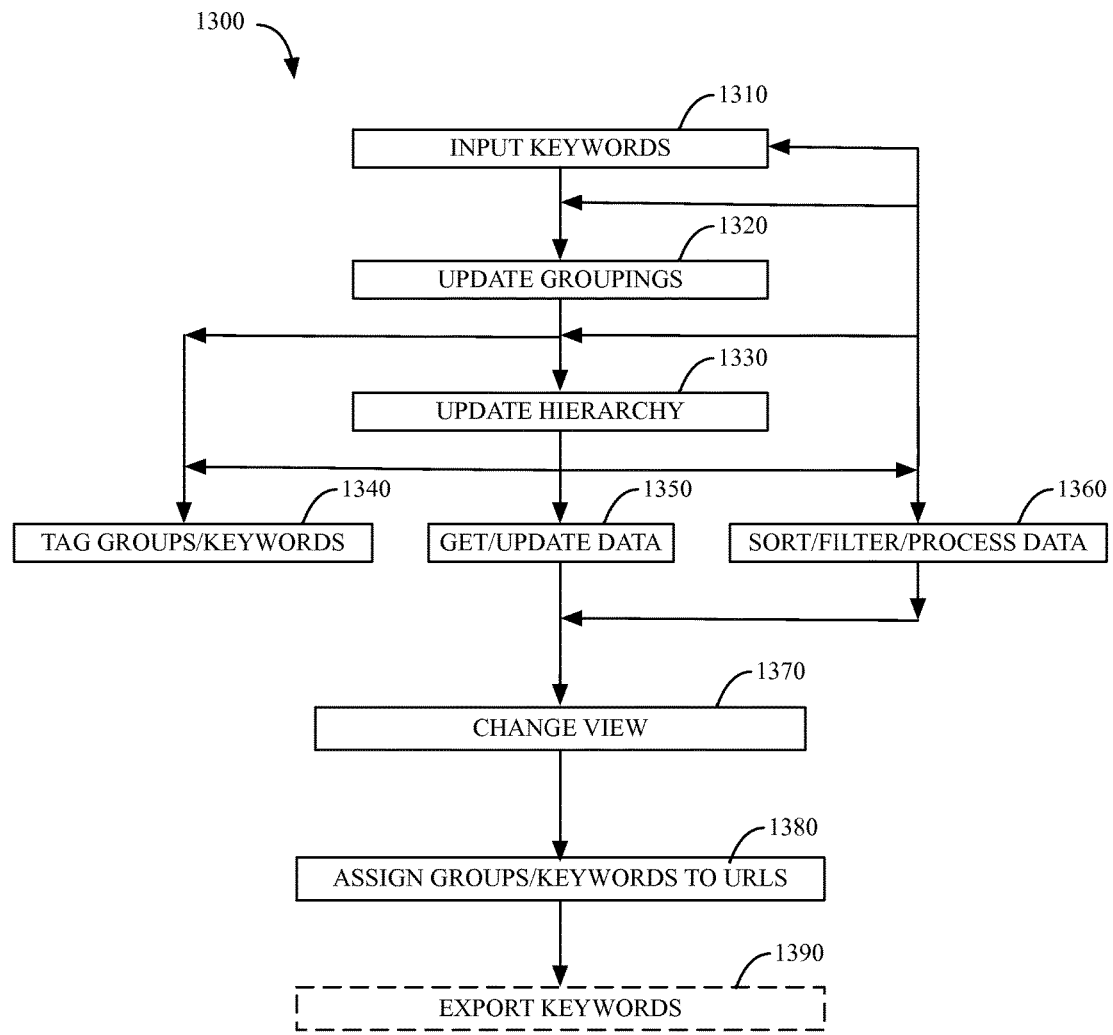
FIG. 13 is a flow chart of a method for manipulating and displaying data in accordance with a preferred exemplary embodiment of the present invention.

Referring now to FIG. 13, a flowchart for a method 1300 for manipulating and displaying data in accordance with a preferred exemplary embodiment of the present invention is depicted. As shown in FIG. 13, the user can input keywords (step 1310) and update groupings (step 1320) and update the keyword hierarchy (step 1330) and then get or update the data results (step 1350) and change the view (step 1370). With the desired view selected, the user can then assign single keywords or groups of keywords to URLs (step 1380) and, optionally, export the keywords (step 1390). Additionally, the user can tag individual and groups of keywords (step 1340) and sort, filter, and otherwise process the data (step 1360).

Referring now to FIG. 14, a schematic diagram illustrating a user interface element 1400 for manipulating and displaying data in accordance with a preferred exemplary embodiment of the present invention is depicted. As shown in FIG. 14, a view of the main data grid that includes the Page URL 1410 and Traffic column 1420 and PA (page authority) column 1430. Page authority (PA) is a numerical method of measuring the strength of a webpage in the eyes of search engines. There are multiple methods for measuring this strength and the invention can deploy one or more of these methods. The invention uses its ability to group keywords to the page level to allow users to easily view page level data alongside all keywords in the group assigned to that page. This allows users to compare page level data with each other or with keyword level data. The "blockiness" of the grouping blocks makes this particularly easy for the user to perceive. In particular, users can compare the PA 1430 value of their page with the average PA value of say the top 10 ranking sites in Google for each keyword or some other suitable metric 1440. This allows the user at a glance to directly relate the strength of their site's page with the average strength of the top competitors for any keyword.

Figure 15:
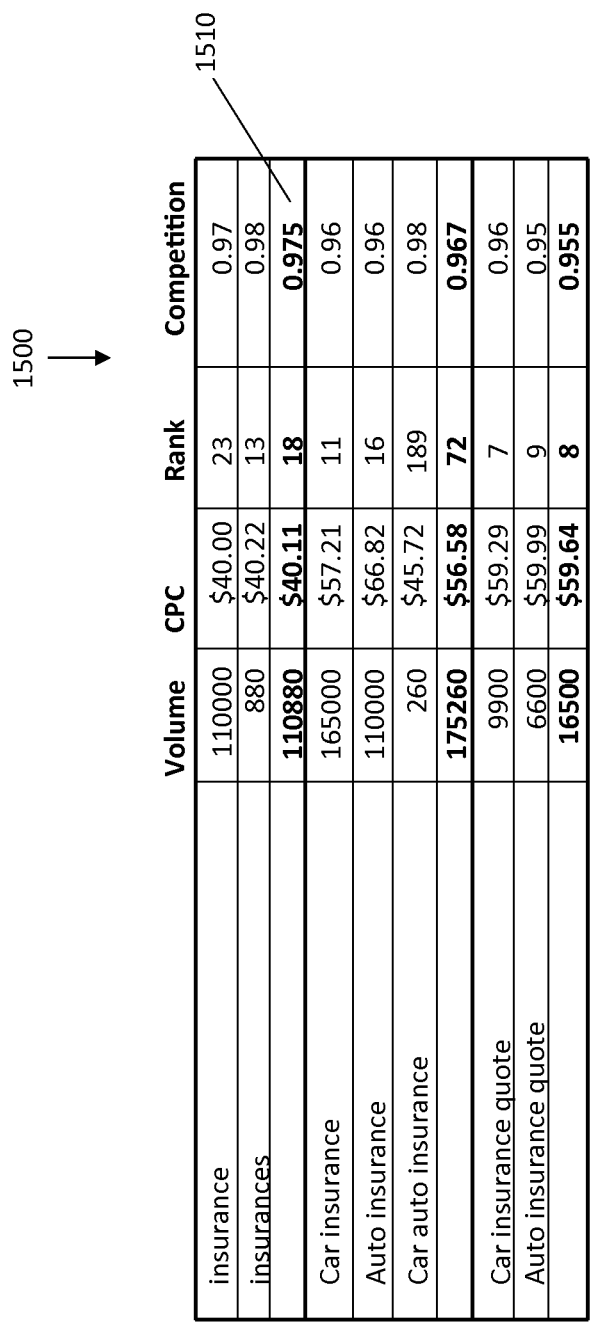
FIG. 15 is a schematic representation of grouping blocks and UI controls for a user interface element for manipulating and displaying data in accordance with a preferred exemplary embodiment of the present invention—illustrates the main data grid including aggregate data row at the bottom of each group's data columns.

Referring now to FIG. 15, a schematic diagram illustrating a user interface element 1500 for manipulating and displaying data in accordance with a preferred exemplary embodiment of the present invention is depicted. As shown in FIG. 15, a version of the main data grid that includes aggregate data row 1510 at the bottom of each group's data columns. This aggregate data may be a sum, an average, or any other desired mathematical or numerical calculation. Each column can utilize a different calculation method as best suits the situation or user. Additionally, these summary values can be available at the block level when a user clicks a block such as clicking a vertical leg and also available for the entire list of keywords.

Referring now to FIG. 16, a schematic diagram 1600 illustrating a user interface element 1600 for manipulating and displaying data in accordance with a preferred exemplary embodiment of the present invention is depicted. As shown in FIG. 16, a view of a data grid 1600 illustrating the column controls available at the group (page) level (1650) used in conjunction with a user interface element for manipulating and displaying data in accordance with a preferred exemplary embodiment of the present invention is depicted. The controller depicted allows the user to sort and filter table data at a page-level (group level). Similar controls are also available at the block level (if the user clicks the vertical leg for example) and overall project level available by clicking in the table header area or via another method such as context menu, main menu, or toolbar button;

Referring now to FIG. 17, a schematic diagram 1700 illustrating a user interface element 1700 for manipulating and displaying data in accordance with a preferred exemplary embodiment of the present invention is depicted. As shown in FIG. 17, a view of the data grid illustrating the columns for on-page optimization score 1710 and item (keyword) source 1720.

Referring now to FIG. 38 and FIG. 39, a schematic diagram illustrating a user interface element 3800 and 3900 for manipulating and displaying data in accordance with a preferred exemplary embodiment of the present invention is depicted. As shown in FIG. 38, one horizontal only group is click and dragged onto another horizontal group that is at the same level in the hierarchy (i.e. peers). As a result of the drag and drop operation in FIG. 39, the two groups are combined into one group that contains two "subpage group" blocks (3910) and (3920). The subpage groups keep the original relationship between the groups intact so the user can easily see that the group is the result of two other groups. This process can be repeated as many times as the user desires to combine as many groups as they would like. So there can be 3, 4, 5, etc. subpage groups within a group. The defining terms in the subpage groups keep the logical integrity of the entire hierarchy so that a user can easily predict the keywords in any group by following tracing down the hierarchy.

Referring now to FIG. 19 and FIG. 20, a schematic diagram illustrating a user interface element 1900 and 2000 for manipulating and displaying data in accordance with a preferred exemplary embodiment of the present invention is depicted. As shown in FIG. 19, illustrates user click and drag of horizontal only grouping block to an L-block's horizontal leg. As a result of the drag and drop operation in FIG. 19, items (ex. keywords) are combined into one page-level group with subpage grouping block (2040) inside the standard page-level grouping block (horizontal leg) as shown in FIG. 20. Defining terms in upper left corner combine (2010).

Parentheses in defining term indicate that the terms in parentheses apply only within the page-level group and not the entire block-level group (i.e. not the entire L-block). Summary metrics in the horizontal leg of the block (2030) display information relevant to the entire page-level as they normally do (this includes the items in the subpage blocks). These metrics do not exclude the subpage blocks. Summary data in the upper-left corner (2020) applies to the entire inverted-L block as usual. The subpage block symbol (2040) is a box within the standard grouping block. It can optionally display its own summary data (either directly in the box or when a user requests the data by clicking an icon in the block, holding the cursor over it to reveal a popup box containing the information, or using the context menu (not shown)). The display of subpage blocks are optional and can be toggled on and off by the user using a controller elsewhere in the UI. In at least one preferred embodiment of the present invention, when subpage blocks are turned off, the items at the page level can be sorted by data in the metrics columns such as search volume, cpc, etc.

Figure 21:
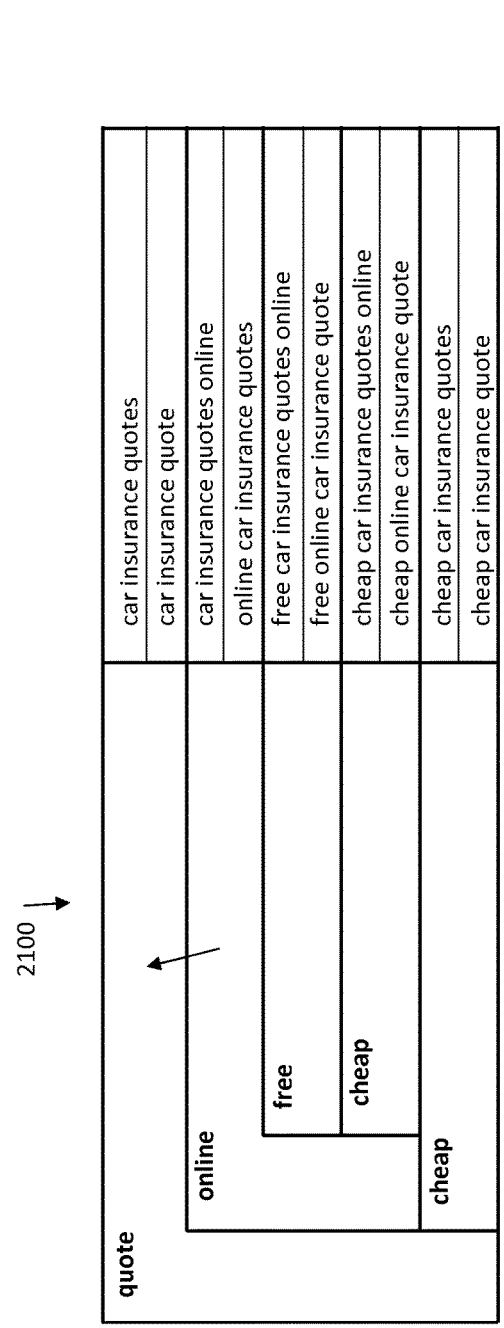
FIG. 21 is a schematic representation illustrating a user interface element for manipulating and displaying data in accordance with a preferred exemplary embodiment of the present invention—diagram illustrates the before state of the user action of clicking and dragging a grouping block's horizontal leg to another grouping block's horizontal leg in a parent/child block relationship. This is the same action shown in FIG. 19 but is presented here to illustrate the effect on subblocks in FIG. 22.
Figure 22:
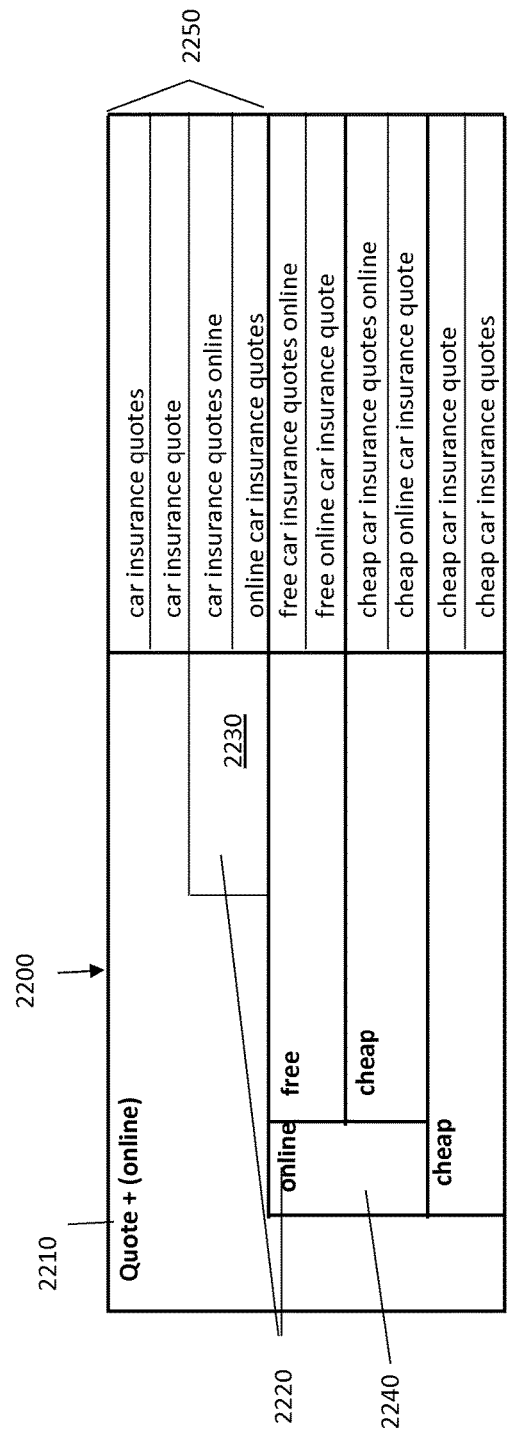
FIG. 22 is a schematic representation illustrating a user interface element for manipulating and displaying data in accordance with a preferred exemplary embodiment of the present invention—diagram illustrates the after state of the user action of clicking and dragging a grouping block's horizontal leg to another grouping block's horizontal leg in a parent/child block relationship. This is the same result shown in FIG. 20 but this diagram illustrates the effect on subblocks.

Referring now to FIG. 21 and FIG. 22, a schematic diagram illustrating a user interface element 2100 and 2200 for manipulating and displaying data in accordance with a preferred exemplary embodiment of the present invention is depicted. As shown in FIG. 21, a user may click and drag the horizontal leg of an inverted-L block to the horizontal leg of another inverted-L block (2100) that is a parent in the hierarchy. The result of this operation is to combine the horizontal legs into one horizontal leg (i.e. page-level group)

(2250) that then contains a subpage level grouping block (2230) to group the items added as shown in FIG. 22. This operation moves only the horizontal leg (i.e. clicking and dragging a horizontal leg only moves the horizontal leg not the entire block). As a result the vertical leg of the inverted-L block that had its horizontal leg moved remains in place forming a vertical only block (2240). Essentially, the horizontal leg and vertical legs are separated.

The defining term in the upper left corner of the receiving page block (2210) places the defining term from the horizontal leg of the moved block within parentheses. This indicates that the term is an exception to the rule for the page. Although the inverted-L block has been broken into two independent components a user can still easily see the relationship between the two previously connected components. The user would look for the vertical leg in the hierarchy that contains the same defining term (ex. "online") within the hierarchy to mentally combine them into one inverted-L block.

Figure 23:
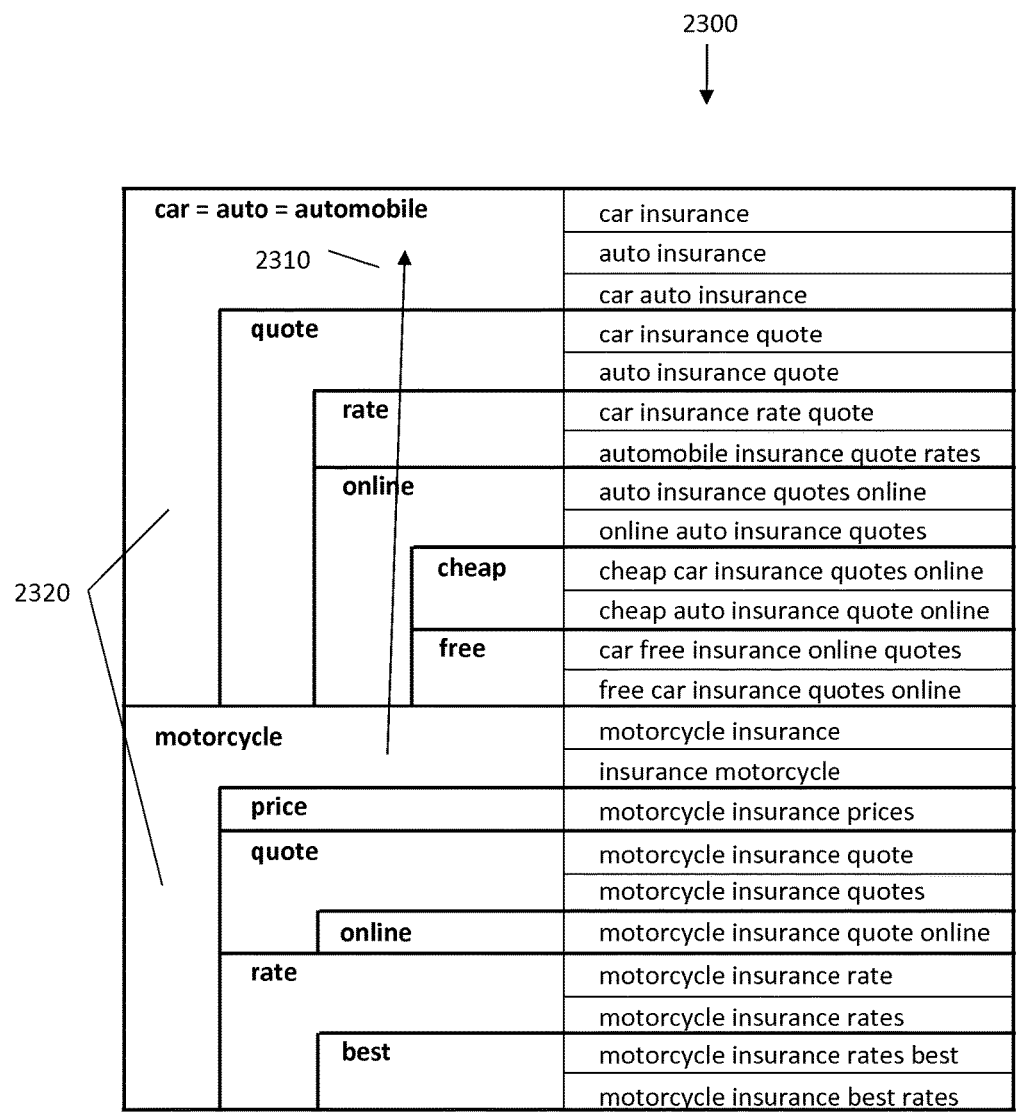
FIG. 23 is a schematic representation illustrating a user interface element for manipulating and displaying data in accordance with a preferred exemplary embodiment of the present invention—diagram illustrates the before state of the user action of clicking and dragging a grouping block's horizontal leg to another grouping block's horizontal leg for two peer level grouping blocks.
Figure 24:
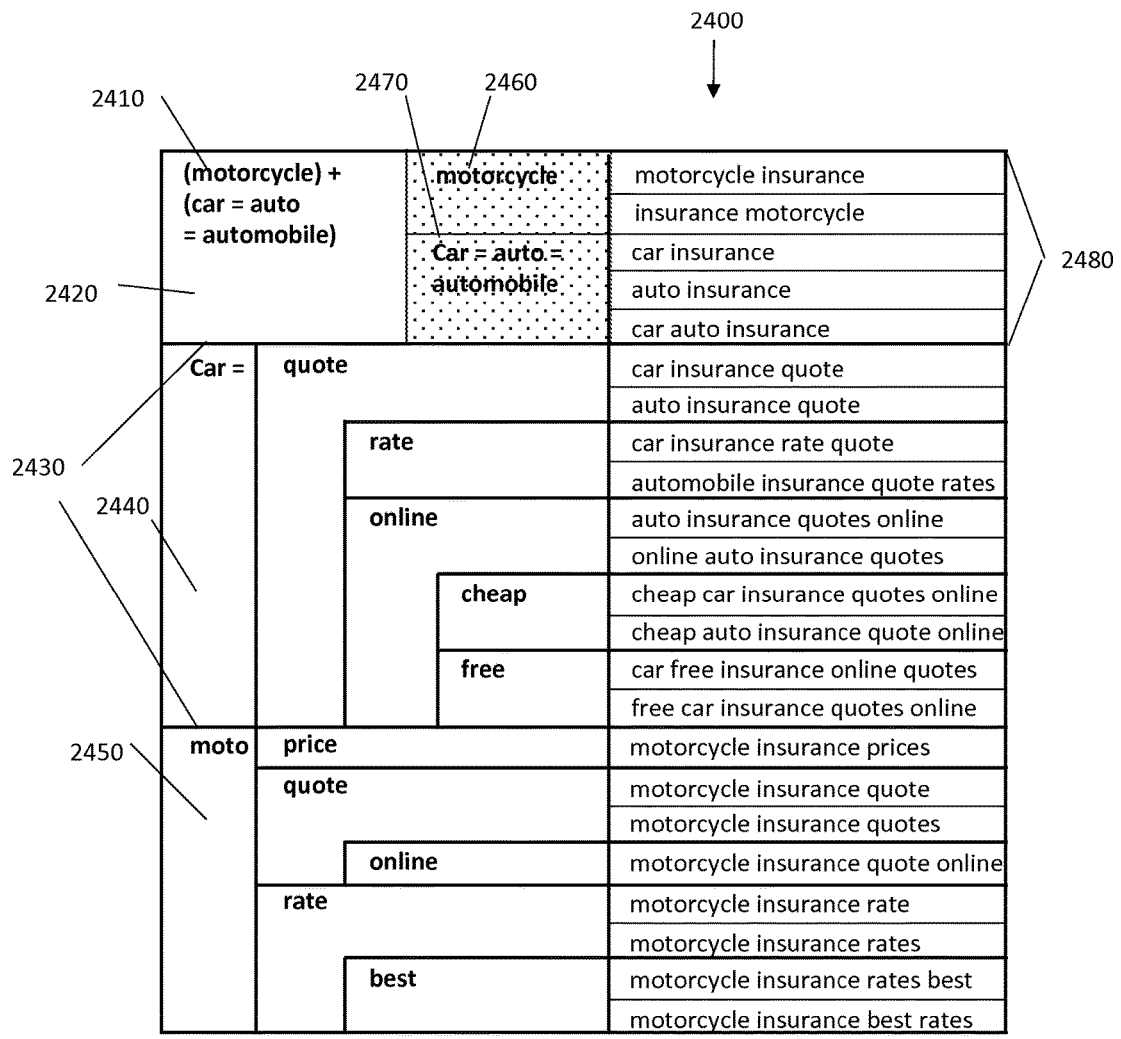
FIG. 24 is a schematic representation illustrating a user interface element for manipulating and displaying data in accordance with a preferred exemplary embodiment of the present invention—diagram illustrates the after state of the user action of clicking and dragging a grouping block's horizontal leg to another grouping block's horizontal leg for two peer level grouping blocks.

Referring now to FIG. 23 and FIG. 24, a schematic diagram illustrating a user interface element 2300 and 2400 for manipulating and displaying data in accordance with a preferred exemplary embodiment of the present invention is depicted. As shown in FIG. 23, a user may click and drag from horizontal leg of inverted-L block to horizontal leg of another inverted-L block (2310) of two peer level (i.e. at the same level in the hierarchy) inverted-L blocks (2320) with the resulting block arrangement as shown in FIG. 24. The result of this operation is to combine the horizontal legs into one page-level group (2480) containing subpage level grouping blocks (2460) (2470). The vertical legs of both L-blocks are kept in place (2440) (2450). Horizontal lines (2430) separate the vertical legs from each other and from the parent page horizontal block (2420). These separation lines are to indicate that the vertical legs are their own (vertical) grouping blocks. Solid lines are used although alternatively dashed lines could be used to emphasize that the all three blocks (resulting horizontal leg and both vertical only legs) have a close relationship to each other and can be considered a single block. The defining term in the upper left corner of the receiving page block (2410) places each of the defining terms from the original horizontal legs within parentheses. This indicates that each is an exception to the rule for the page (in this case there is no single dominate rule for the page). The user visually can look at each subpage block and look for the vertical leg in the hierarchy that contains the same defining term at the same level within the hierarchy to mentally combine them into individual inverted-L blocks.

Referring now to FIG. 25, a schematic diagram illustrating a user interface element 2500 for manipulating and displaying data in accordance with a preferred exemplary embodiment of the present invention is depicted. FIG. 25 is the same as FIG. 24 but annotations indicate the meaning of the summary metrics in the blocks. For example, summary metrics 2520 relate only to the keywords within the scope of this segment of the vertical leg, likewise for 2530. In the horizontal leg summary metrics 2510 relate to the page level as usual. Optionally, the system can be configured to display the summary metrics for the entire "implied" L-block (i.e. the L-block that would exist if the vertical only legs that were left behind were connected to the horizontal leg containing the combined horizontal legs. Optionally, the horizontal lines at 2430 could be dashed to more strongly imply the relationship between the three blocks allowing the eye to easily perceive the three blocks as one continuous block.

All grouping block drag and drop operations also have corollary inverse operation. If two grouping blocks can be combined then they can be uncombined. The method for combining them can be drag and drop, context menu, or another suitable UI controller. This inverse operations is not limited to what would be considered an "undo" operation undoing the last operation. These are true inverse operations that can be performed at any time. For example for the combination of two peer horizontal legs as seen in FIG. 23 and FIG. 24 the inverse operation can be performed by clicking one of the subpage blocks in FIG. 23 and dragging it outside the current page-level group and dropping it on the line just below the page-level group or any other peer location of the page-level group. The result of this operation would be as seen in FIG. 23. This operation could be performed by context menu or another suitable UI controller. To clarify this in a more complex example consider the following.

Referring now to FIG. 26, a schematic diagram illustrating a user interface element 2600 for manipulating and displaying data in accordance with a preferred exemplary embodiment of the present invention is depicted. As shown in FIG. 26, a user may click and drag one or more subpage blocks 2620, 2630 in a horizontal leg 2610 to equivalent vertical leg blocks (i.e. have same defining terms) 2640, 2650 at the same level in the hierarchy as the horizontal leg containing the subpage blocks. The result of each operation is to create an inverted-L block in each case as seen in the original diagram in FIG. 23 that contained two L-blocks. In essence this operation reversed the process of breaking apart the vertical and horizontal legs of each L-block. This example contained two separate inverse operations. The user has the freedom to perform a single inverse operation if they choose or performing multiple inverse operations.

Figure 27:
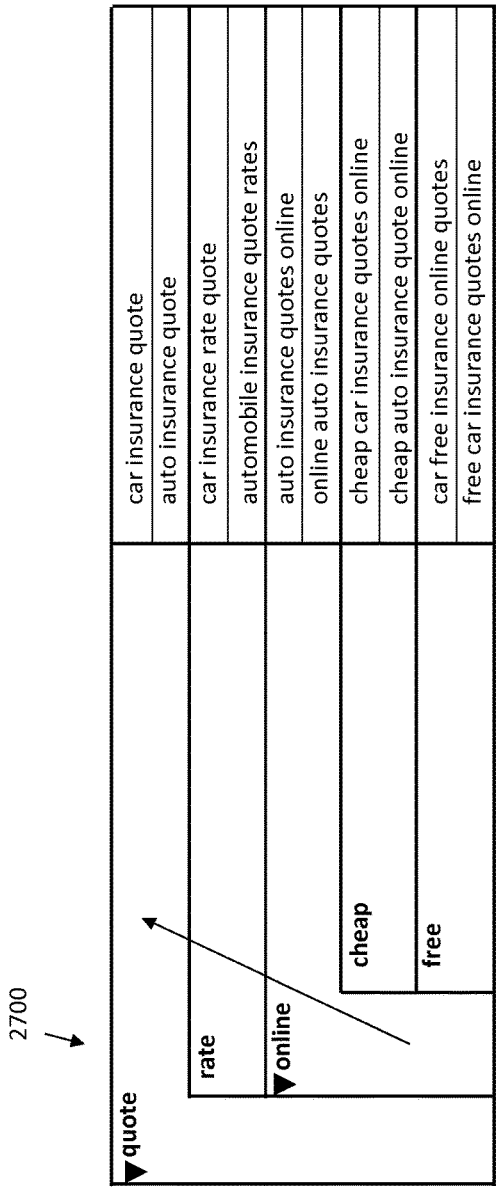
FIG. 27 is a schematic representation illustrating a user interface element for manipulating and displaying data in accordance with a preferred exemplary embodiment of the present invention—diagram illustrates the before state of the user action of clicking and dragging a grouping block's vertical leg to another grouping block's horizontal leg in a parent/child grouping block relationship.
Figure 28:
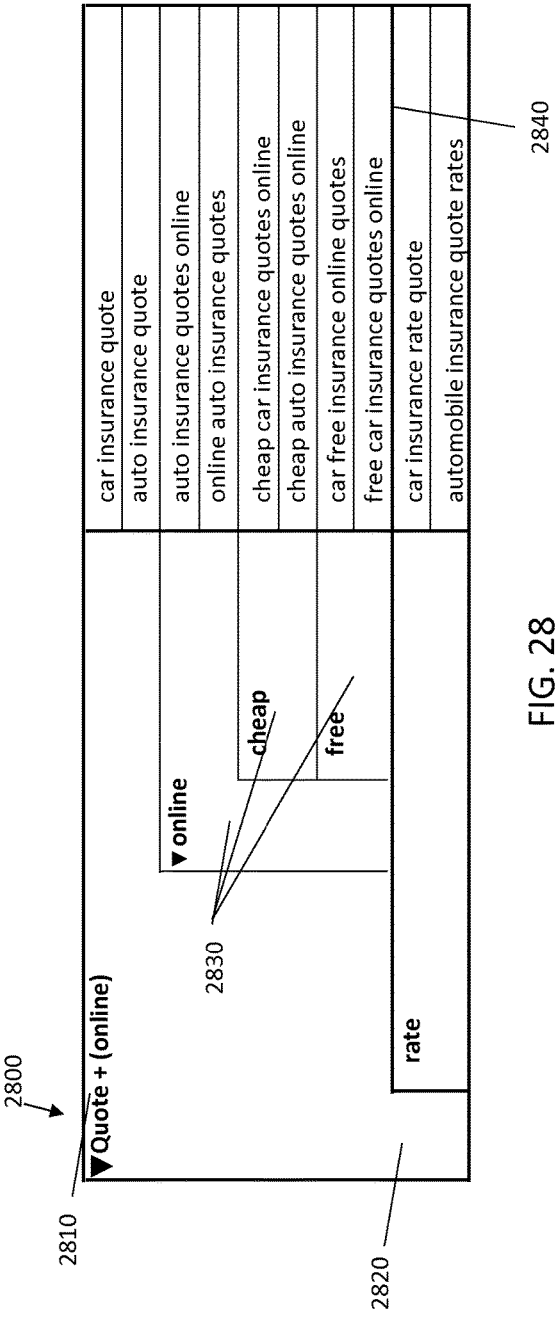
FIG. 28 is a schematic representation illustrating a user interface element for manipulating and displaying data in accordance with a preferred exemplary embodiment of the present invention—diagram illustrates the after state of the user action of clicking and dragging a grouping block's vertical leg to another grouping block's horizontal leg in a parent/child grouping block relationship.

Referring now to FIG. 27 and FIG. 28, a schematic diagram illustrating a user interface element 2700, 2800 for manipulating and displaying data in accordance with a preferred exemplary embodiment of the present invention is depicted. As shown in FIG. 27, a user may drag and drop originating from a vertical leg to a horizontal leg (2700) in this case the horizontal leg of a parent group. The result of this operation is to move all blocks that are within the scope of the vertical leg (including its subgroups and horizontal leg if it is an L-block) into the horizontal leg of the receiving block and display them as subpage block (2830) as shown in FIG. 28. Note that the original grouping blocks that were dragged into the other block are converted to subpage grouping blocks including their look and feel. The defining term in the upper-left corner of the resulting inverted-L block (2810) encapsulates the defining terms of the moved items within parentheses to indicate that they are exceptions within the page-level group.

Additionally, subpage blocks can be drag and dropped. They can be drag and dropped within the existing subpage block group and obey the standard drag and drop rules of regular grouping blocks. Also they can be dragged outside of the current primary grouping block. In this case they are converted to regular grouping blocks. This is the standard inverse operation for the blocks in question. Any subpage grouping block no matter when it was moved can be move again either within or outside the current regular grouping block. When a subpage grouping block is dragged outside its containing regular group it is converted to a regular group and when it is dropped the location that it is dropped will determine if any parent blocks will need to be created to maintain the logical integrity of the hierarchy and they will be automatically inserted just as they would for cases where a regular block is moved to an arbitrary location in the hierarchy (i.e. appropriate parent blocks will be created whether they be vertical only, horizontal only or L-blocks). Subpage blocks can also be collapsed just like other block types. The operations of moving subpage blocks, just like for other blocks, is not confined to drag and drop only. Any appropriate UI controller can be used such as a menu, context menu or toolbar controller.

Optionally, a dashed horizontal line (2820) is used to emphasize that the sub-blocks are within the page level. This is not strictly necessary since the horizontal line (2840) indicates the boundary between any other remaining groups within the scope of the parent block. This operation can be reversed by performing its inverse operation. This could be accomplished by clicking the vertical leg of the L-block in the subpage group and dragging it outside the horizontal leg it is currently contained within and placing it at the same level in the hierarchy where it originally was. This and all inverse operations can be performed at anytime, not just immediately after the original operation.

Figure 29:
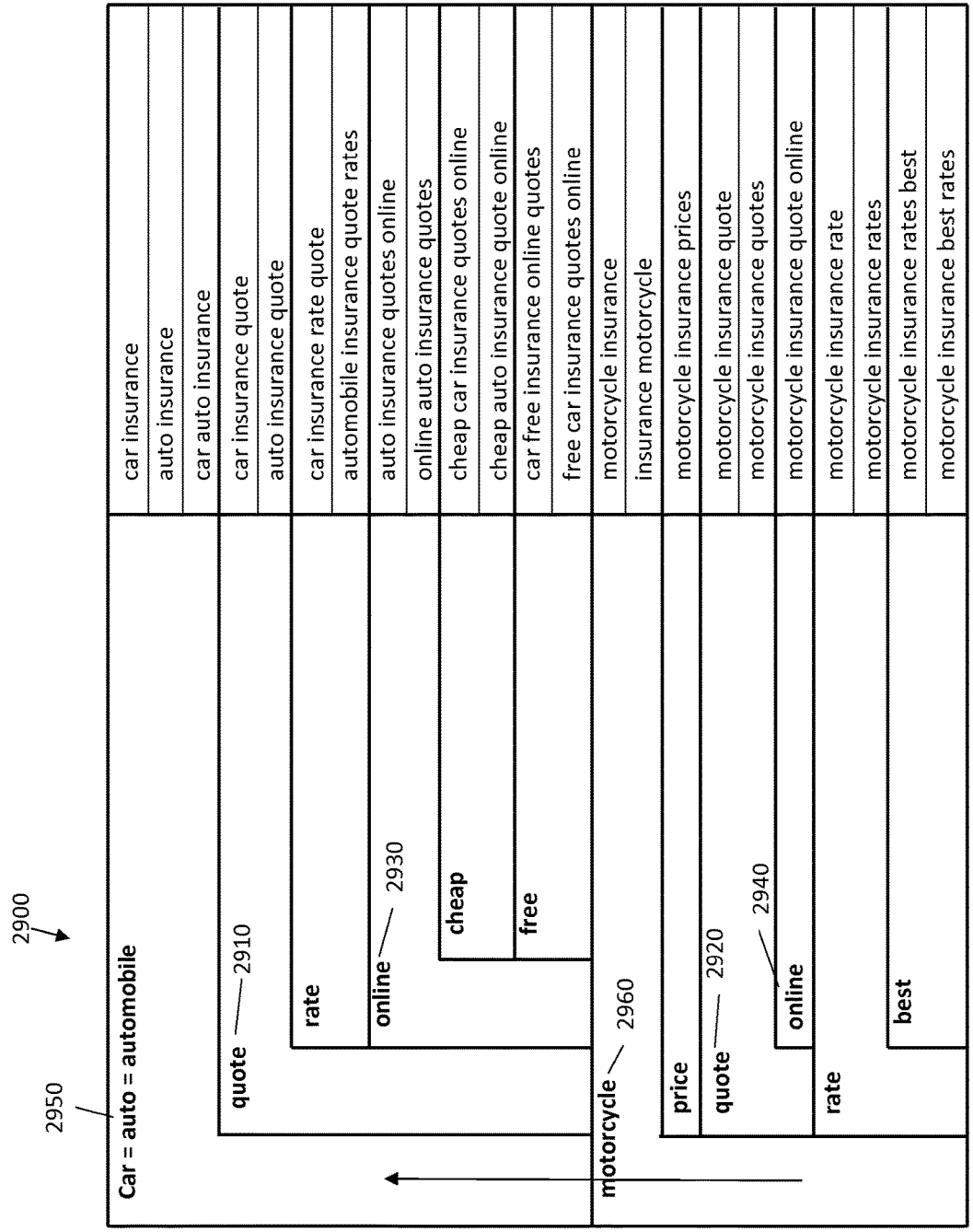
FIG. 29 is a schematic representation illustrating a user interface element for manipulating and displaying data in accordance with a preferred exemplary embodiment of the present invention—diagram illustrates the before state of the user action of clicking and dragging a grouping block's upper left corner to another grouping block's upper left corner in a peer grouping block relationship.
Figure 30:
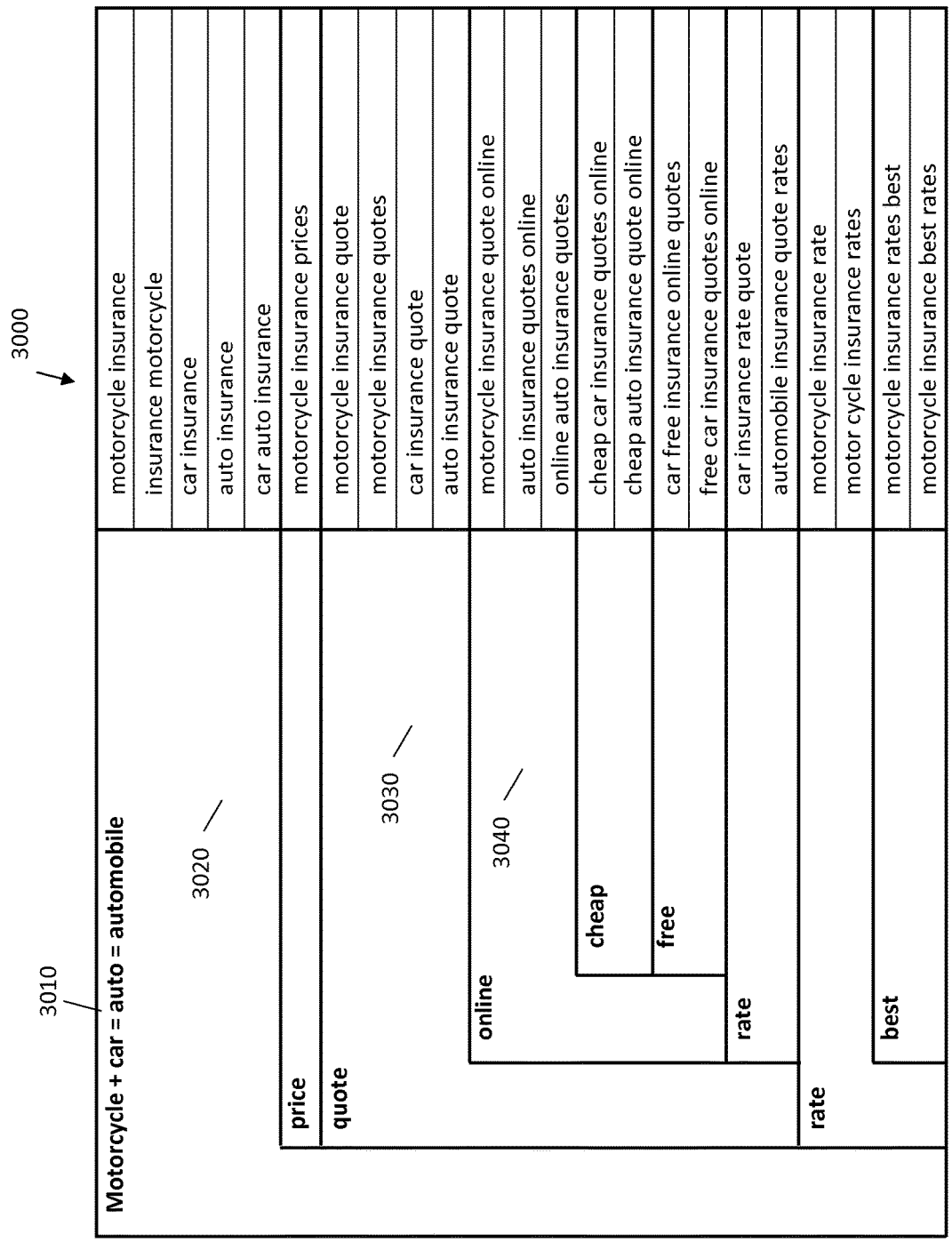
FIG. 30 is a schematic representation illustrating a user interface element for manipulating and displaying data in accordance with a preferred exemplary embodiment of the present invention—diagram illustrates the after state of the user action of clicking and dragging a grouping block's upper left corner to another grouping block's upper left corner in a peer grouping block relationship.

Referring now to FIG. 29 and FIG. 30, a schematic diagram illustrating user interface elements 2900 and 3000 for manipulating and displaying data in accordance with a preferred exemplary embodiment of the present invention is depicted. As shown in FIG. 29, a user may click and drag the vertical leg of a grouping block such as an L-block and drop it onto the vertical leg of another L-block. Then the block that is being moved is moved the user can see the block and all subblocks move along with the cursor as is typical drag and drop behavior. This is the case with all drag and drop operations involving grouping blocks or item rows in the invention. The result of dropping a vertical leg onto a vertical leg operation is that the groups and all subgroups combine as shown in FIG. 30. The items in the horizontal leg of the moved block and the receiving block combine into one horizontal leg (3020). The defining terms are treated as equivalents throughout the resulting structure and the defining terms are concatenated using the plus sign. Defining terms concatenated with the plus sign act as exact equivalents within the scope of the defining term's block. The entire structure within the scope of the defining term is recalculated using this equivalency. The result of this equivalency is that groups with the same defining term at the same level within the hierarchy combine together (3030) (3040). Regarding the combination of subgroups notice that in FIG. 29 "quote" is at the same depth in hierarchy for both car (2910) and motorcycle (2920) so they combine into one "quote" group 3030 seen in FIG. 30. Likewise, "online" (2930) (2940) is at same depth in the hierarchy under "quote" as seen in FIG. 29 so those combine into a single "online" group (3040) as seen in FIG. 30. The other subgroups remain and are included in the result, placed in the hierarchy as to maintain the logical structure of the hierarchy.

The groupings are recalculated with the defining terms that were in the upper-left corners (2950) (2960) of each block treated as synonyms (car=auto=automobile are treated as equivalent to "motorcycle"). The defining term 3010 of the resulting block uses the addition sign (or another appropriate symbol) but does not use any parentheses because the result is a total combination so that the entire term (ex. "car=auto=automobile+motorcycle") applies to the entire block. This is unlike other combinations previously shown where the combination is that of a page containing a group that is an exception to the rule (indicated by parentheses around the word that is the exception such as 2010 seen in FIG. 20).

If the blocks are both horizontal only blocks then the user can achieve the result of setting the defining terms as equivalencies by clicking the left side of the horizontal only leg and dragging and dropping onto the left side of the horizontal only leg of the receiving block. In this way the left side of the horizontal only block acts as a vertical leg of the block allowing the equivalency to be set and the blocks combined in the same way as if it have a visible vertical leg. Note that this is different behavior than if the right side of the horizontal leg is dragged and dropped which would result in subpage blocks as previously described.

Figure 31:
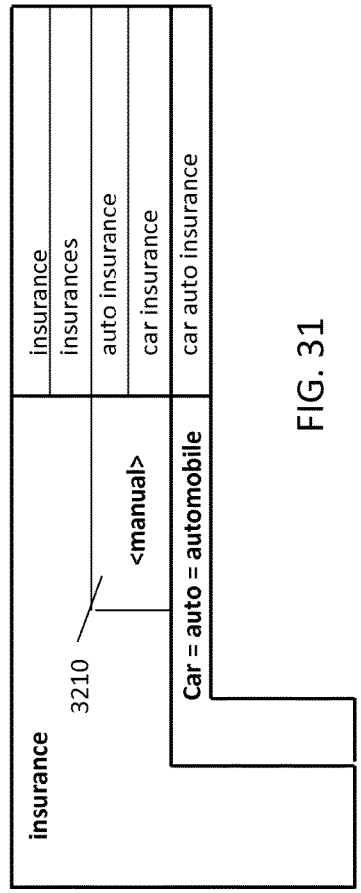
FIG. 31 is a schematic representation illustrating a user interface element for manipulating and displaying data in accordance with a preferred exemplary embodiment of the present invention—illustrates the subpage grouping block used for manually moved items (such as keywords)

Referring now to FIG. 31, a schematic diagram illustrating a user interface element 3100 for manipulating and displaying data in accordance with a preferred exemplary embodiment of the present invention is depicted. As shown in FIG. 31, a manual subpage block (3210) is used to identify items moved from one group into another. The "manual" subpage grouping block (3210) makes it clear which items were manually moved into the page-level group. In this example the words "auto insurance" and "car insurance" were manually moved from the "car=auto=automobile" group. This manual designation makes it clear to the user that these words are potentially exceptions to the hierarchy and violate the defining term definition for the group they are contained in.

Optionally, the system can be configured so that if the moved term already obeys the defining term of the block then that item does not need to be grouped within a manual subpage block and can be displayed as usual in the regular grouping block. Or if the term naturally fits within the hierarchy of an existing subpage block of the regular block then the term can be placed in that location either automatically by the system or manually by the user. If the user manually enters in item in to a group then the subpage grouping block rules just described for manually dragging the item into a group will be obeyed in this case too. Manually moved items can be moved again including in a way that is equivalent to an inverse operation.

Figure 32:
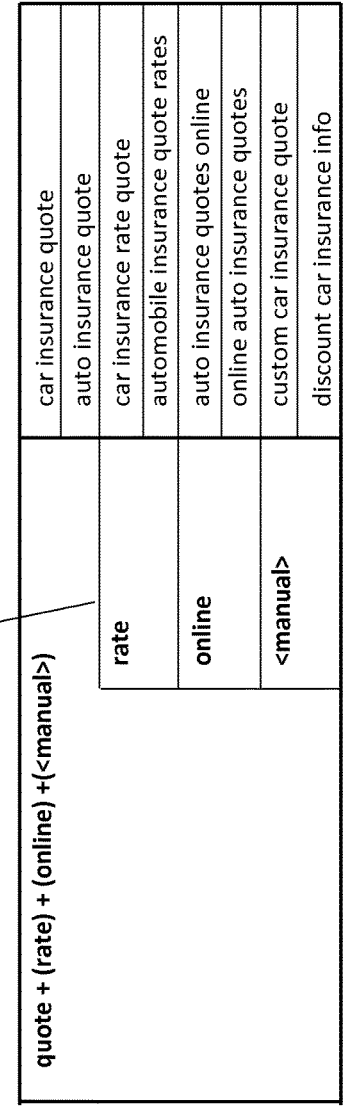
FIG. 32 is a schematic representation illustrating a user interface element for manipulating and displaying data in accordance with a preferred exemplary embodiment of the present invention—illustrates multiple subpage blocks in a single page's horizontal leg.

Referring now to FIG. 32, a schematic diagram illustrating a user interface element 3200 for manipulating and displaying data in accordance with a preferred exemplary embodiment of the present invention is depicted. As shown in FIG. 32, multiple horizontal legs (i.e. pages) can be combined into one page-level group. Subpage-level blocks (3210) in the preferred implementation of the present invention visually look different (shown here shaded) than the standard page-level grouping blocks. The difference in appearance allows the user to clearly identify them as contained within a group. Note any suitable visual difference will do. Shading is not the only method. Dashed lines (or any lines) (3220) separating subpage-level groups are optional. The user can toggle this feature on and off. Special subpage group blocks for "uncategorized" (not pictured) items within the page can be created. These are similar to the "manual" subpage grouping blocks.

Figure 33:
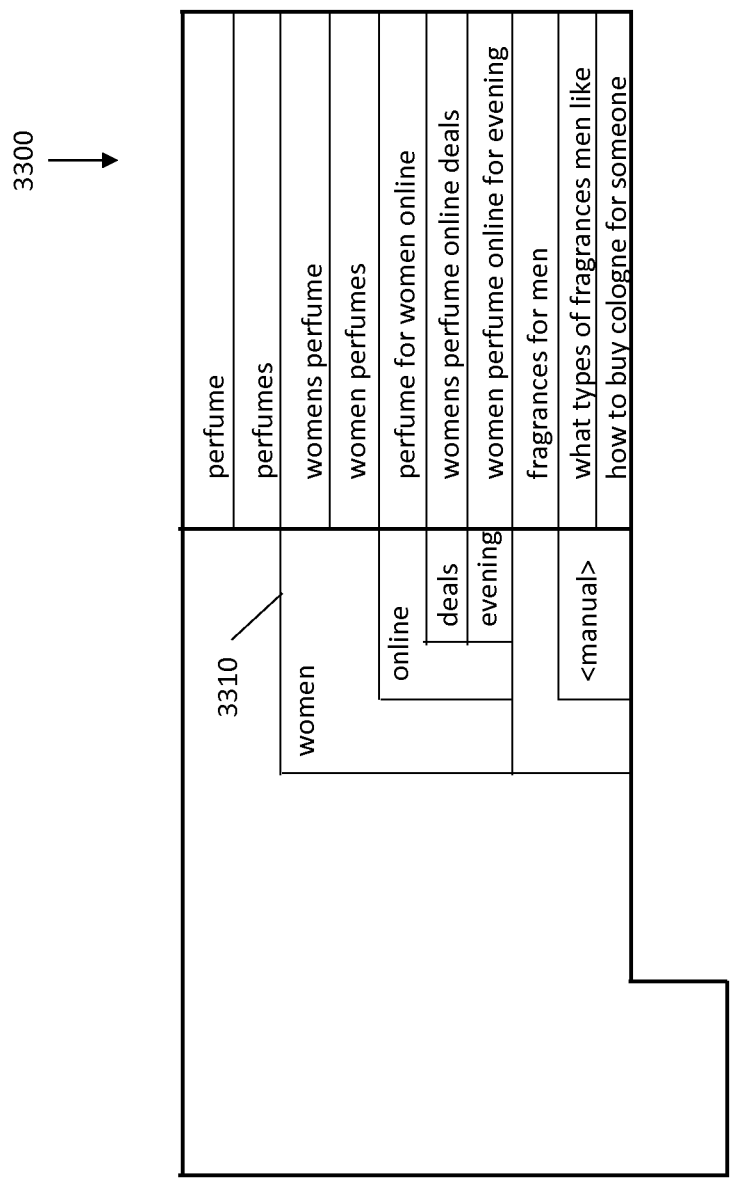
FIG. 33 is a schematic representation illustrating a user interface element for manipulating and displaying data in accordance with a preferred exemplary embodiment of the present invention—illustrates multiple nested subpage blocks.

Referring now to FIG. 33, a schematic diagram illustrating a user interface element 3300 for manipulating and displaying data in accordance with a preferred exemplary embodiment of the present invention is depicted. As shown in FIG. 33, various levels of nesting to any arbitrary hierarchy level of subpage-level grouping blocks within page-level level group can be accomplished 3310.

Figure 50:
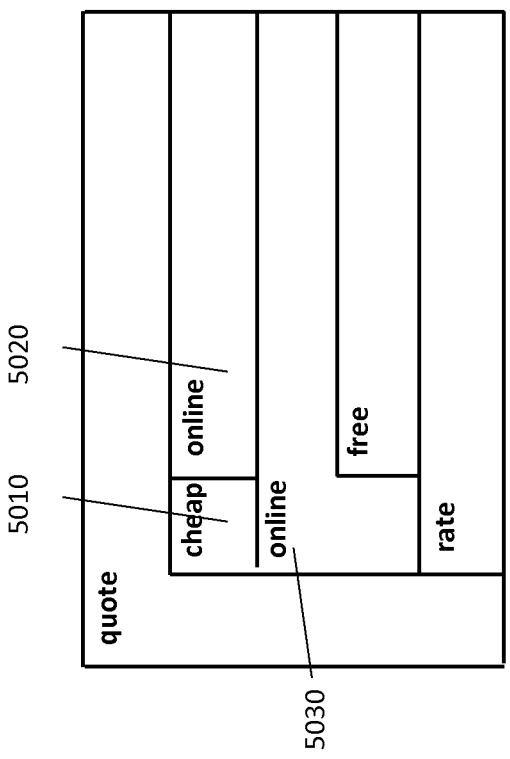
FIG. 50 is a schematic representation illustrating a user interface element for manipulating and displaying data in accordance with a preferred exemplary embodiment of the present invention—illustrates the after state where a grouping block is moved outside of its immediate parent's scope. It illustrated the additional grouping block that must be created to accommodate such a change.
Figure 49:
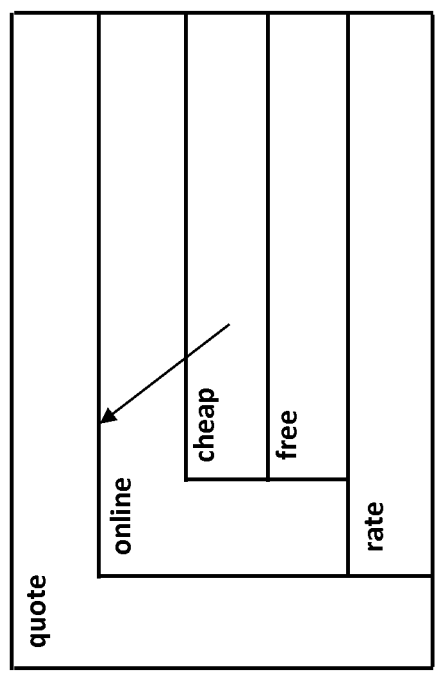

Referring now to FIG. 49 and FIG. 50, a schematic diagram illustrating a user interface element 3300 for manipulating and displaying data in accordance with a preferred exemplary embodiment of the present invention is depicted. As shown in FIG. 49, a grouping block can be moved to a location outside of its parent block. When doing additional blocks must be inserted to keep the logical structure of the hierarchy. For example, the block with defining term "cheap" is moved (by drag and drop or another method provided by the system) to a location between the blocks "quote" and "online."

To accomplish this the user could drag and drop the block on the line between the indicated blocks (the system highlights the line between the blocks when the cursor dragging the block is over the line to indicate that the block can be dropped at that location). The result of the operation is shown in FIG. 50 two blocks 5010, 5020 are added at the drop location instead of just the one that was dragged to the location. The reason for this is that to maintain the logic of the hierarchy an additional block was needed. The reason for this is that the items grouped in the block "cheap" actually contain both "cheap" and "online" since "cheap" is a subgroup of "online". When the "cheap" group is moved outside of the "online" group the resulting hierarchy must still reflect the fact that the items in the group have both of these qualities. So both "cheap" and "online" blocks are needed. One is inserted as a vertical only block 5010 and the other as a horizontal only leg 5020.

Essentially, the move of the "cheap" group outside of the "online" group is requesting that the order of the hierarchy be changed. The request is to place "cheap" higher in the hierarchy. This means that "online" will thus be lower in the hierarchy than it was originally (in this area of the hierarchy only). Thus, "cheap" went from being in this area of the hierarchy from being a child in the relationship "online>cheap" to a parent in the new relationship "cheap>online". This is why the block 5020 must be created. Also note that one of the defining terms is now repeated in two block as result of this operation 5020 and 5030.

Figure 52:
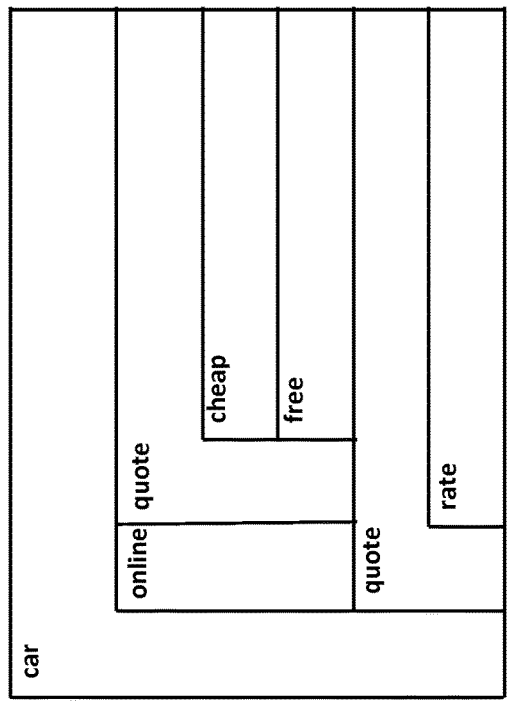
FIG. 52 is a schematic representation illustrating a user interface element for manipulating and displaying data in accordance with a preferred exemplary embodiment of the present invention—illustrates the after state of the grouping blocks where the order of the hierarchy is changed by dragging an L-block but not its subgroups to a higher position in the hierarchy.
Figure 51:
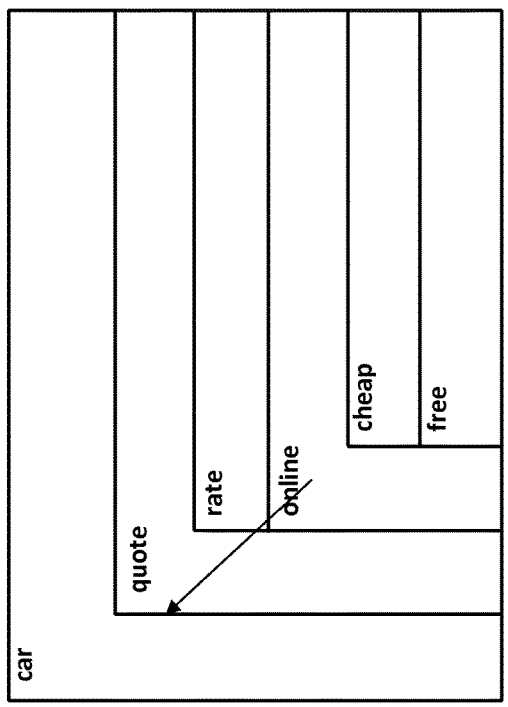
FIG. 51 is a schematic representation illustrating a user interface element for manipulating and displaying data in accordance with a preferred exemplary embodiment of the present invention—illustrates the before state of the grouping blocks where the order of the hierarchy is changed by dragging an L-block but not its subgroups to a higher position in the hierarchy.

Referring now to FIG. 51 and FIG. 52, a schematic diagram illustrating a user interface element 3300 for manipulating and displaying data in accordance with a preferred exemplary embodiment of the present invention is depicted. As shown in FIG. 51, the hierarchical order of the blocks can be changed by dragging the corner of the block to a position higher in the hierarchy. In this case only the "L" shape moves and not its subblocks. The result of this type of operation is to change the calculation of the structure of all blocks within the scope of the moved block since it is higher in the hierarchy the hierarchy of all blocks below it must be recalculated. We see that the grouping block can be moved to a location outside of its parent block in this example an L-block is moved to a position in the hierarchy one level higher. In this case the hierarchical arrangement between blocks with defining terms "quote" and "online" change from "quote>online" to "online>quote." The blocks reconfigure in an analogous way following the same principles to the way seen in FIG. 49. and FIG. 50.

As seen above blocks can be moved to arbitrary locations within the hierarchy, thus changing the hierarchical structure, and a suitable restructuring of the blocks can performed to accommodate the move yet maintain the logical integrity of the hierarchy.

Referring now to FIG. 53 and FIG. 54, a schematic diagram illustrating a user interface element 3300 for manipulating and displaying data in accordance with a preferred exemplary embodiment of the present invention is depicted. As shown in FIG. 53, a grouping block can be moved to a different location within its subgroup. This operation does not change the hierarchical relationship between the blocks but merely reorders them visually as seen in FIG. 54.

Figure 56:
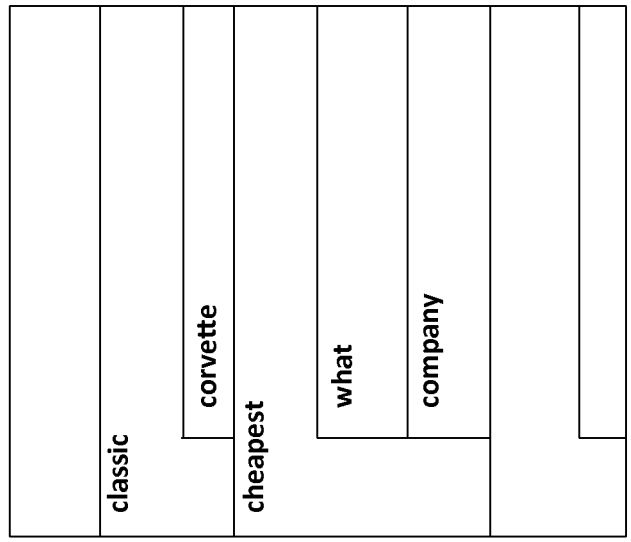
FIG. 56 is a schematic representation illustrating a user interface element for manipulating and displaying data in accordance with a preferred exemplary embodiment of the present invention—illustrates the after state when moving an L-block to a hierarchically equivalent location among its peer blocks.
Figure 55:
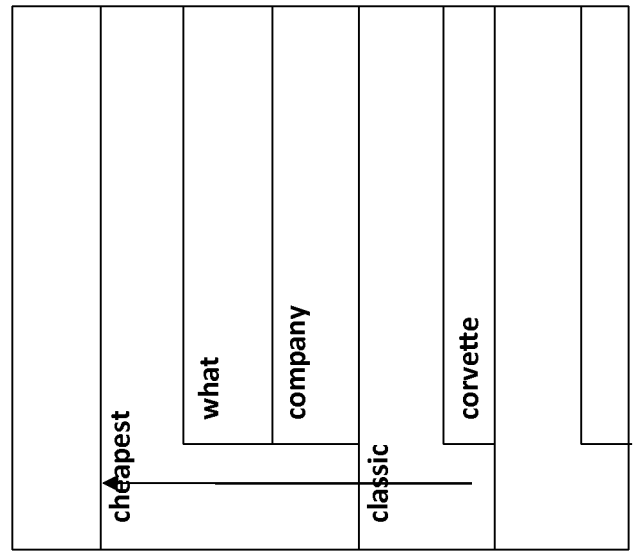
FIG. 55 is a schematic representation illustrating a user interface element for manipulating and displaying data in accordance with a preferred exemplary embodiment of the present invention—illustrates the before state when moving an L-block to a hierarchically equivalent location among its peer blocks.

Referring now to FIG. 55 and FIG. 56, a schematic diagram illustrating a user interface element 3300 for manipulating and displaying data in accordance with a preferred exemplary embodiment of the present invention is depicted. As shown in FIG. 55, move an L-block to another location in the hierarchy that is not a change in the hierarchical structure but simply a move to a different location among peer groups. To move an L-block and all of its subblocks the user clicks the vertical leg of the block to be moved, that will select the L-block, all of its subblocks and all rows including the items and data within the scope of the block. The user drags to a location between two blocks, the line between the blocks is highlighted to indicate that the user can drop in that location and where the result of the operation will reside. The result of the drag and drop operation is seen in FIG. 56.

The user can also accomplish such a move by using cut and paste. The user can click the vertical leg to select the entire block and all within its scope, select cut from the context menu or another available control method place the cursor in the location where the user wants to paste the blocks, click to finalize the location for the paste, and select from the context menu or using another available methods such as a keyboard shortcut paste the copied blocks. The user can also copy a block and paste it.

Cut and paste can perform any operation that drag and drop can perform. For example, the user can copy a block and all within its scope, click on another block and paste. The result of the paste will be the same as if the user dragged and dropped. There are additional convenience methods for a user to drop an item such as allowing the user to paste the item above, below or within an item. So the user could cut a block, click on another block and use a controller such as a context menu to "paste here", "paste above", "paste below", etc.

Drag and Drop operations involve multiple states, conditions and results. Additionally each type of drag and drop operation requires the user to click in a particular location of a block and drag to a particular location within each grouping block or between grouping blocks to achieve different combination or move results. Once the fundamental principle that the result of all drag and drop operations or other similarly operations whether performed automatically by the system, by the user using drag and drop or other UI controllers that the result of the operation must maintain the logical integrity of the hierarchy it becomes clear which additional display arrangements are logical and a practitioner expanding the system will be able to define additional function and arrangements of the blocks to stay consistent with the principles outlined in this document. What follows is a description of various states, conditions and results for many of the drag and drop operations available to the user. Other operations not listed here or elsewhere in this document that are consistent with the principles set forth will be apparent to one skilled in the art.

If in FIG. 55 the user preferred to move just the horizontal leg in the "classic" block they would click the horizontal leg of the block (not the vertical leg as shown in the diagram) and dragged it to the indicated location. In that case there would still remain a vertical only leg to the left of "corvette" block to maintain the logical integrity of the hierarchy.

What portion of a block is clicked affects the results of the drop just as the location of the drop does. For example clicking a horizontal only leg on the left side can allow the block to behave as if it had a vertical leg.

Figure 62:
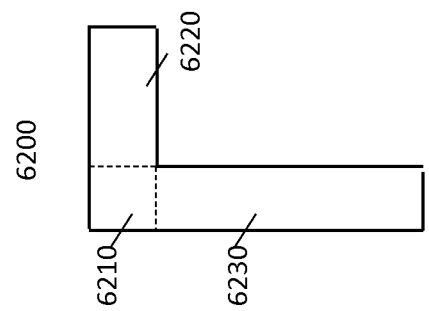
FIG. 62 is a schematic representation illustrating a user interface element for manipulating and displaying data in accordance with a preferred exemplary embodiment of the present invention illustrates the click and drop zones on the "L-block" grouping block type used for drag and drop operations, to click to display contextual menus or perform other operations on the block.
Figure 67:
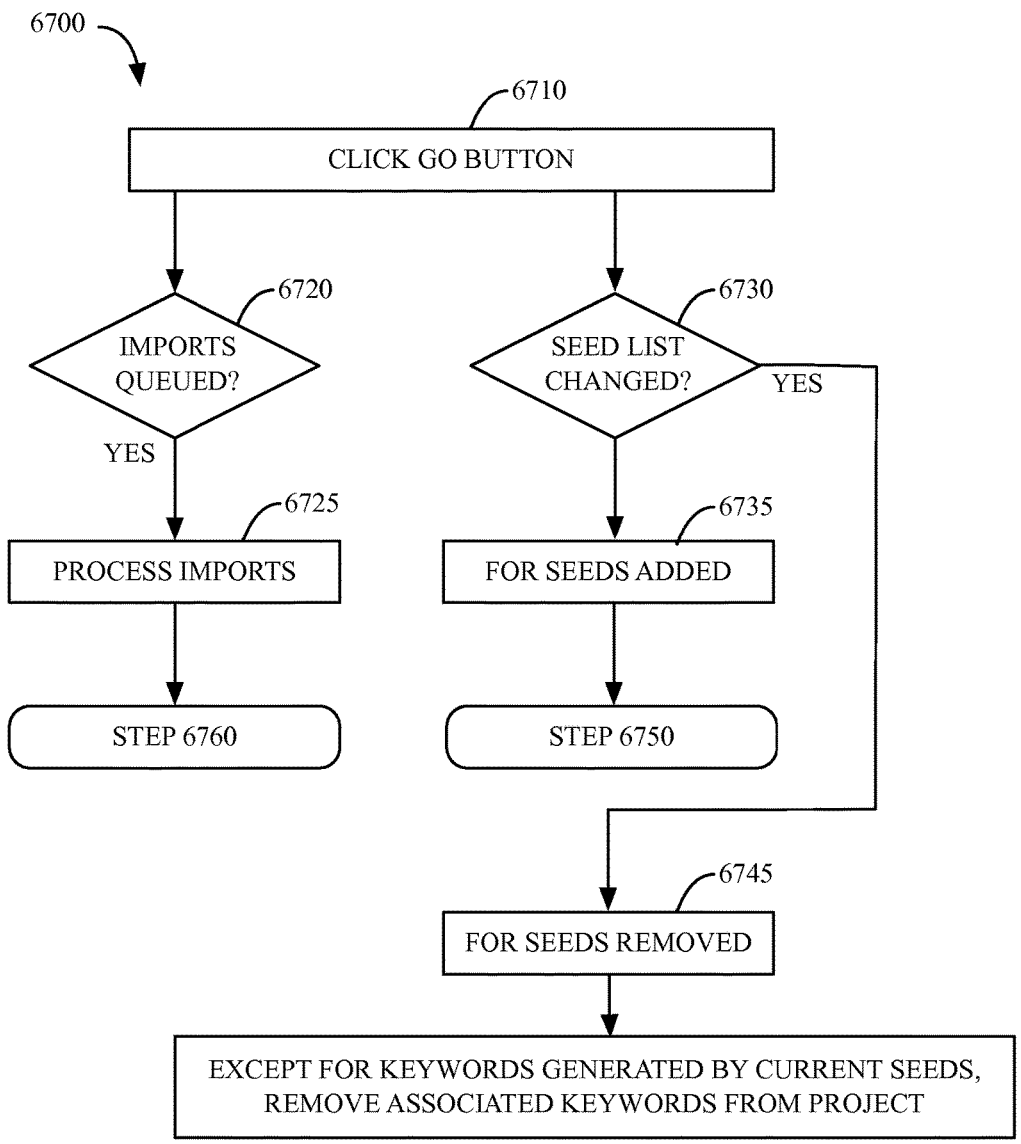
FIG. 67 is a flow chart illustrating a method for manipulating and displaying data in accordance with a preferred exemplary embodiment of the present invention.
Figure 67:
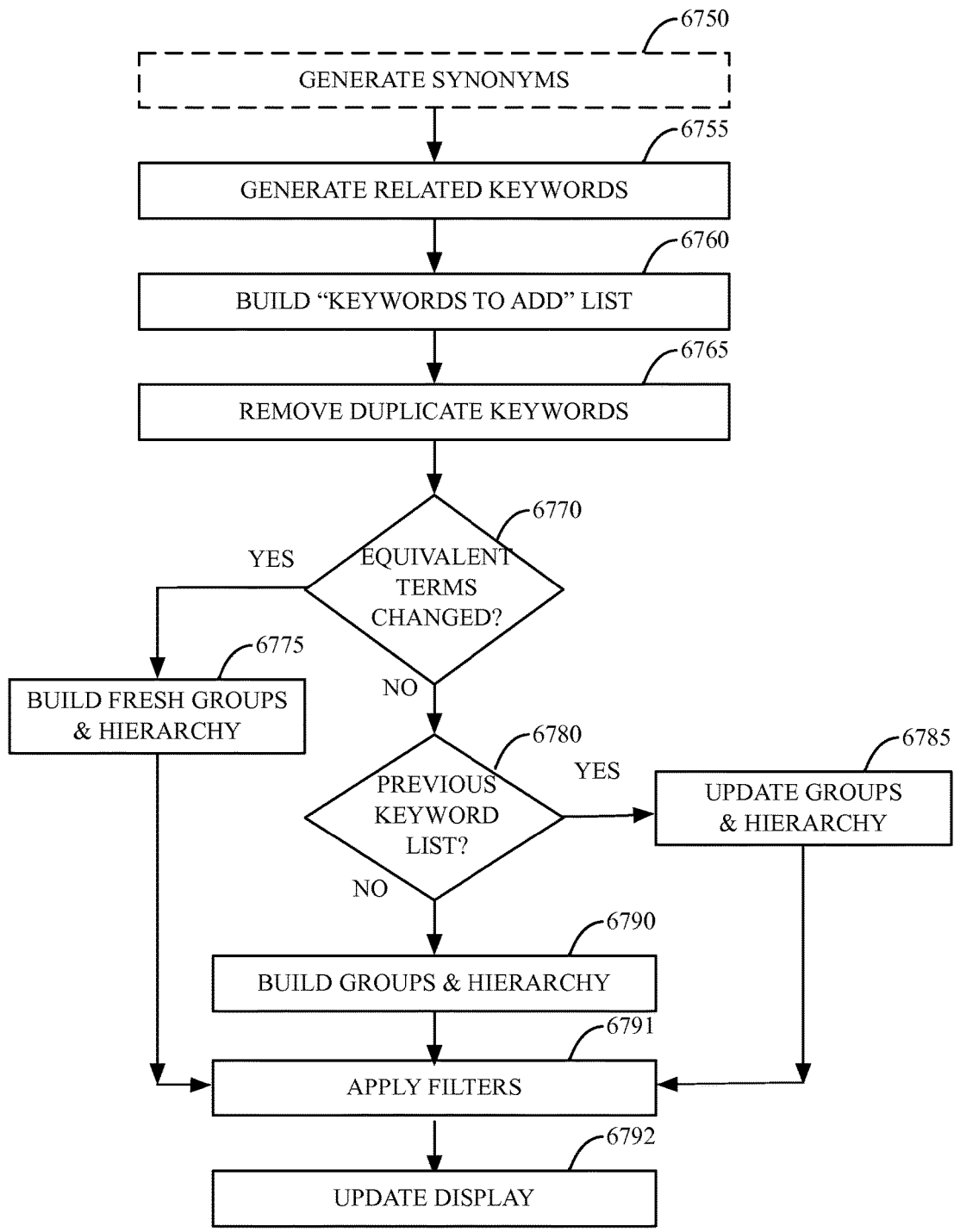

Referring now to FIG. 62, a schematic representation illustrating a user interface element 6200 for manipulating and displaying data in accordance with a preferred exemplary embodiment of the present invention is depicted. FIG. 62 illustrates the click and drop zones 6210 and 6220 and 6230 on the "L-block" grouping block type used for drag and drop operations, to click to display contextual menus or perform other operations on the block.

Figure 64:
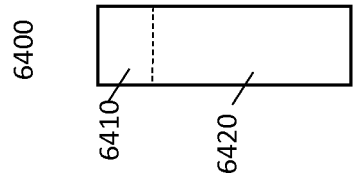
FIG. 64 is a schematic representation illustrating a user interface element for manipulating and displaying data in accordance with a preferred exemplary embodiment of the present invention—illustrates the click and drop zones on the "vertical only" grouping block type used for drag and drop operations, to click to display contextual menus or perform other operations on the block.
Figure 63:
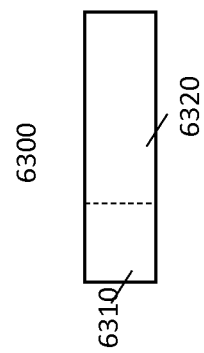
FIG. 63 is a schematic representation illustrating a user interface element for manipulating and displaying data in accordance with a preferred exemplary embodiment of the present invention illustrates the click and drop zones on the "horizontal only" grouping block type used for drag and drop operations, to click to display contextual menus or perform other operations on the block.

Referring now to FIG. 63, is a schematic representation illustrating a user interface element 6300 for manipulating and displaying data in accordance with a preferred exemplary embodiment of the present invention is depicted. FIG. 63 illustrates the click and drop zones 6310 and 6320 on the "horizontal only" grouping block type used for drag and drop operations, to click to display contextual menus or perform other operations on the block;

Referring now to FIG. 64, is a schematic representation illustrating a user interface element 6400 for manipulating and displaying data in accordance with a preferred exemplary embodiment of the present invention is depicted. FIG. 64 illustrates the click and drop zones 6410 and 6420 on the "vertical only" grouping block type used for drag and drop operations, to click to display contextual menus or perform other operations on the block;

Turning now to FIGS. 62, 63 and 64. There are three types of grouping blocks in the present invention including horizontal only (6300), vertical only (6400) and L-block (6200). Note that other block shapes are possible. For example block shapes for managing processes such as workflows may require different shapes than are required for keyword research. The three grouping block types shown in FIG. 62, FIG. 63, FIG. 64 have collectively three click zones and two drop zones. The click zones are the horizontal leg, the vertical leg and the corner. The drop zones are the vertical leg and the horizontal leg. In FIG. 62, FIG. 63, FIG. 64 all numbered areas are click zones (6210), (6220), (6230), (6310), (6320), (6410), (6420). The drop zones within blocks are all but the corner of the L-block (6210).

Optionally this area could be configured as a drop zone if there was a need. In addition to drop zones within blocks there are drop zones between blocks that are used for moving block to different locations within the hierarchy or changing the hierarchical order of groups. The results of clicking in each zone and dropping to other zones is elsewhere described in this document. Note that when a click and dragged block is hovering over other blocks before being dropped the potentially receiving blocks are highlighted if it is acceptable to drop the block in that location. In general clicking the vertical leg (6230) of an L-block, the "vertical leg" portion (6310) of a horizontal only leg or any part of the vertical only leg (6410)(6420) will allow the user to select the entire block level of the grouping block.

From a click and drag perspective dragging the vertical leg will move the entire block and all of its associated sub-blocks and data. Clicking a horizontal leg (6220)(6320) will only select the row defined by the horizontal leg that may also include the left side of the block (6210)(6310). From a click and drag perspective only the horizontal leg will be moved if it is clicked and dragged which includes (6210)(6310). In the case of horizontal legs being dragged a click on either 6220 or 6320 that is dragged to either 6220 or 6320 will result in a subpage group like that seen in FIG. 20 or FIG. 39 But a click on the left side of the horizontal leg 6210 or 6310 that is dragged to 6210 or 6310 will result in a combination as seen then the left side of the horizontal only block see in FIG. 65 was dropped onto the left side of another horizontal only block with result in FIG. 66.

Referring now to FIG. 21 and FIG. 22, additional features of the UI can be further explained.

Block Relationship: Direct subgroup L-block and parent group L-block.
User action: Clicks and drags horizontal leg of subgroup to horizontal leg of parent group. (Horizontal leg to horizontal leg.)
Result: Subpage block created in horizontal leg of receiving block. Vertical leg of moved block remains in its original location. Dashed line separating keyword rows at subpage block boundary optional. (toggle on off)
Number of subpage blocks: 1 (only the moved keywords are in a subpage block).
Defining term formula: Parent defining terms concatenated with the plus sign with the direct subgroup's terms in parentheses. Formula: "parent terms+(direct subgroup's terms)".
UI visualization: Highlight the horizontal leg and the items and all associated data in the row and animate the highlighted horizontal leg, items and data being dragged.
2) Regarding FIG. 23 and FIG. 24.
Block Relationship: Two peer blocks containing horizontal legs (i.e. Peer meaning same level in the hierarchy.)
User action: Drag horizontal leg onto horizontal leg.
Result: Two horizontal legs combine into one horizontal leg. If one or more of the blocks is an L-block then leave the vertical leg(s) in place. Solid lines between vertical legs just as between any regular blocks. Optional, dashed lines between vertical legs instead. Optional, dashed lines between items (e.g. Keywords) at border between subpage block items.
Number of subpage blocks: 2 (two subpage group blocks within resulting horizontal leg group block)
Defining term formula: (One peer's defining term)+(Other peer's defining term)
UI visualization: Animate highlight horizontal leg and all associated items and data in the row and it being dragged. Optional, dashed lines between vertical legs instead. Optional, dashed lines between items (e.g. Keywords) at border between subpage block items.
3) Regarding FIG. 27 and FIG. 28.
Block Relationship: Direct subgroup L-block and parent L-block (or Vertical only leg not pictured here).
User action: Clicks and drags vertical leg of subgroup to horizontal leg of parent group.
Result: Entire grouping block including subgroups of moved group placed inside horizontal leg of parent group. Optional, dashed line between keywords (not shown in diagrams)
Number of subpage blocks: 1 group with all of its subgroups
Defining term formula: parent term+(formula representing the structure of the moved group)
UI visualization: Animate highlight and move of the entire moved grouping block (vertical and horizontal leg and all subgroups) being dragged.
Misc: Optionally display horizontal dashed line in vertical leg of blocks to indicate where the page group ends.
4) Regarding FIG. 29 and FIG. 30
Example: Block Relationship: Two peer blocks User action: User clicks and drags the vertical leg of one L block to the vertical leg of another L block.
Result: All groupings within the scope of the two original L groups recalculated as one group with the defining terms treated as synonyms.
Number of subpage blocks: 0 (Optionally, display subpage blocks)
Defining term formula: Peer's term+Other peer's term (no parentheses).

UI visualization: Animate the highlight of entire grouping block (vertical and horizontal leg and all subgroups) and it being dragged.

5) Regarding FIG. 31:

User action: Manual keyword move.

Result: Create subpage block called "<manual>" to contain all manually moved keywords for that page.

6) Regarding FIG. 32:

Illustrating "Uncategorized" subpage block. This is a user defined block that can contain any keywords the user desires or keywords the algorithm finds relevant but not clearly part of a definable group.

Based on the above detailed examples the scenarios not explicitly listed here can be inferred by one skilled in software development and/or user interface design to be consistent with the principles implicit in the above examples. For example, the above does not mention the case where a horizontal only leg is combined with another horizontal only leg. But based on the examples above the expected results should be clear.

Notes:

Use of parentheses in defining term means "exception" to the rule.

If subpage blocks are toggled off then rows in groups can be sorted and filtered by metric columns.

Subpage blocks do not need to display the summary metrics. All processes are reversible at any time by clicking and dragging to recombine the blocks. Or in the case where the user dragged corners then the user can right click the defining term to select an option from a contextual menu to create a new block based on the defining term clicked to break apart the previously combined blocks. Alternatively the user can click one of the defining terms and drag it out of the block to create new block using that defining term.

Figure 34:
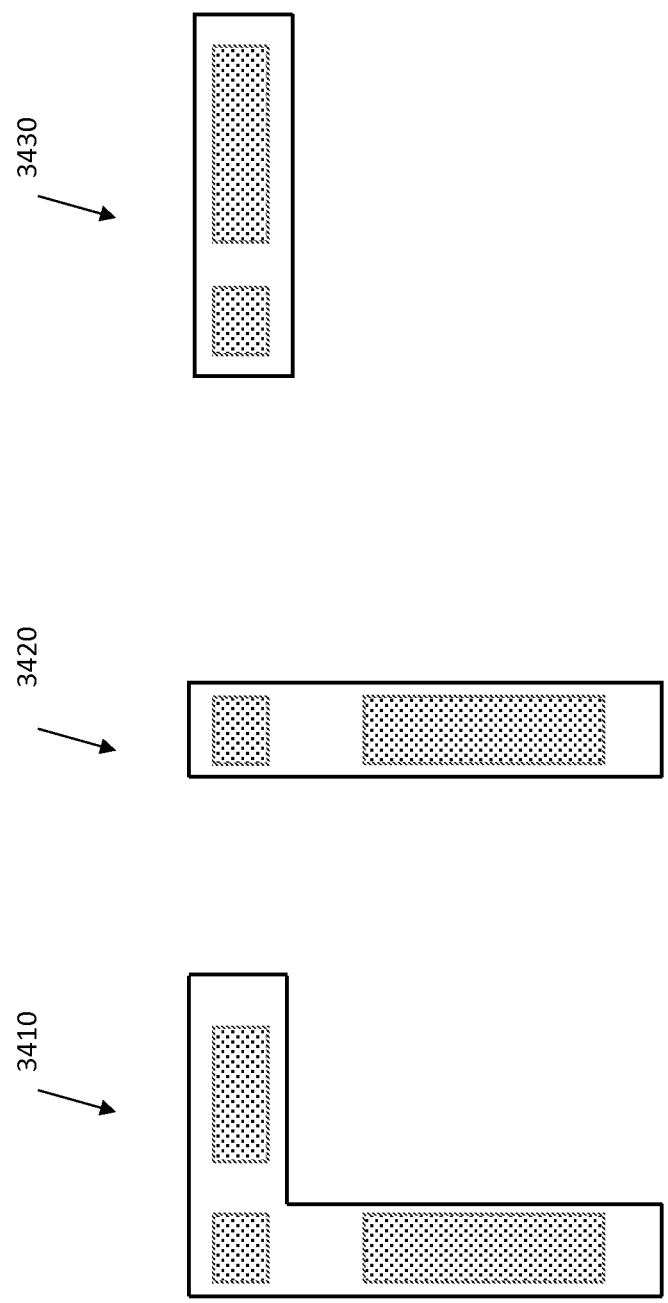
FIG. 34 is a schematic representation illustrating a user interface element for manipulating and displaying data in accordance with a preferred exemplary embodiment of the present invention—illustrates the "grabbable" areas in different shaped grouping blocks used during drag and drop operations. Includes diagrams for inverted-L, vertical and horizontal only grouping blocks.

Referring now to FIG. 34, a schematic diagram illustrating a user interface element for manipulating and displaying data in accordance with a preferred exemplary embodiment of the present invention. As shown in FIG. 34, examples of grab handles for Inverted-L block 3410, vertical leg block 3420, and horizontal leg block 3430 are depicted. Grab handles are optionally provided to offer a visual cue to the user that the blocks can be dragged and where the cursor must be placed. When the cursor is positioned over the block, rectangular "grabber" areas appear. This is an optional feature.

Figure 35:
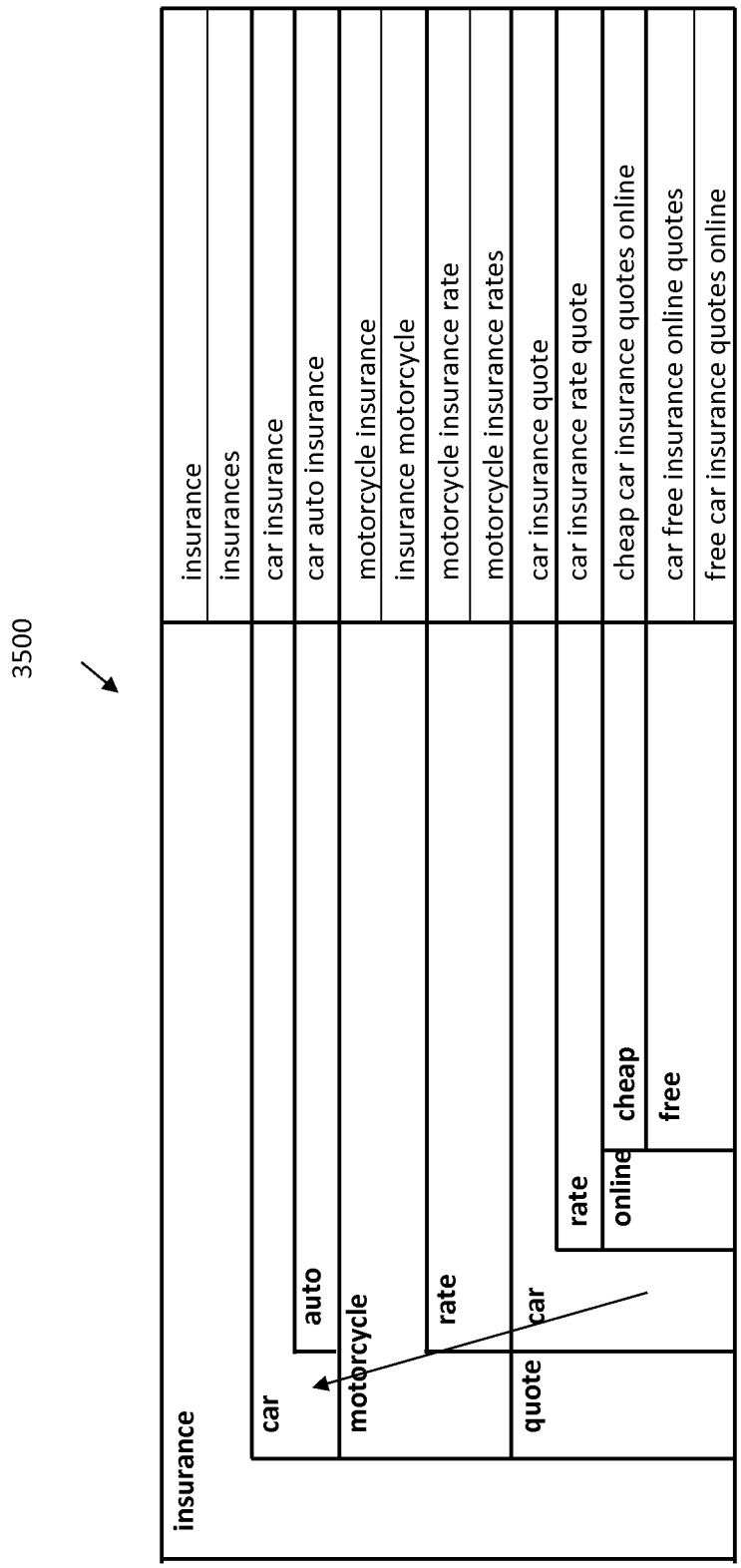
FIG. 35 is a schematic representation illustrating a user interface element for manipulating and displaying data in accordance with a preferred exemplary embodiment of the present invention—illustrates the before state for the combination of two groups using drag and drop where the groups are at different levels in the hierarchy.
Figure 36:
FIG. 36 is a schematic representation illustrating a user interface element for manipulating and displaying data in accordance with a preferred exemplary embodiment of the present invention—illustrates the after state for the combination of two groups using drag and drop where the groups are at different levels in the hierarchy.

Referring now to FIG. 35 and FIG. 36, a schematic diagram illustrating user interface elements 3500 and 3600 for manipulating and displaying data in accordance with a preferred exemplary embodiment of the present invention is depicted. As shown in FIG. 35, a user may click and drag the vertical leg or corner of a grouping block (not necessarily an L-block) onto the vertical leg or corner of another block (not necessarily an L-block). The result of this type of drag and drop operation is that the groups and all subgroups combine as shown in FIG. 36. In this case, the blocks both have the same defining term "car." Also the blocks do not have to have a peer to peer level relationship or a parent, grandparent, or other hereditary relationship. They can be any two blocks. If they have the same defining term then they can be combined. Additionally, if the blocks do not have the same defining term the operation will result in setting the two defining terms as equivalent terms in the defining term and combine the blocks in an analogous way.

Referring now to FIG. 16 illustrating user interface 1600. At the top of each group above the displayed metric data (such as search volume, ranking, etc.) the user has the option of displaying a horizontal bar 1610 that provides functionality to sort and/or filter the group items 1650 by any column or combination of columns. This function is made available to the user in a user friendly was such as if the cursor hovers above the relevant data in the grid, hovers near the line dividing two groups or by another method such as context menu or other method. A user interface element such as up or down arrow 1620 is available that when clicked sorts the keywords by the relevant metric from high to low or vise-versa. Additionally, users will have the ability to enter filter criteria 1630, 1640 and click to view filter types available 1660 to filter the list by criteria the user enters (such as to show only keywords in a group that have search volume greater than 150. Another filter example: a user could enter a word into the filter criteria to only view items (e.g. Keywords) in that group containing that word. The order that the filter and sort criteria are applied across the columns can be defined by the user using an appropriate controller. This same controller is available at the block level and controls the sorting of either the subblocks based on summary metrics for the blocks or ignores the subblock grouping and sorts and filters all the items within the block by the selected metrics. In this case the subgroup blocks are temporarily hidden to allow for the sorting. Additionally these same controls are available at the project or view level. The controller is located at the top of the entire table in either of these cases. Similarly, the blocks are hidden to accommodate the sorting and filtering. Also, if the system is configured to have loaded only a subset of all available data then the user has the option to sort/filter the currently available data or all data in the project.

The UI will optionally allow the user to view the data grid without any groupings or grouping blocks. In this case the keywords will not be grouped allowing the user to sort and filter the list as a whole.

To accommodate large data sets of items (i.e. many keywords) the system can be configured to load a subset of the data. The configuration is either system defined or user defined or a combination of the two. When this subset is utilized for the purpose of not over burdening the browser hosting the table the system can display grouping blocks without loading the associated items. One example is where every first level group is displayed including its defining term but no items or subgroups. This allows the system to load quickly and give the user the option to view the items in that group using an appropriate user interface controller.

Referring now to FIG. 37, a schematic diagram illustrating a user interface element for manipulating and displaying data in accordance with a preferred exemplary embodiment of the present invention. As shown in FIG. 37, a user interface controller, displayed here as a dropdown menu, allows the user to select a "view" which is based on user tagging of groups. The user selects an item from the menu and only the groups and keywords with the selected color tag are displayed to the user.

Figure 57:
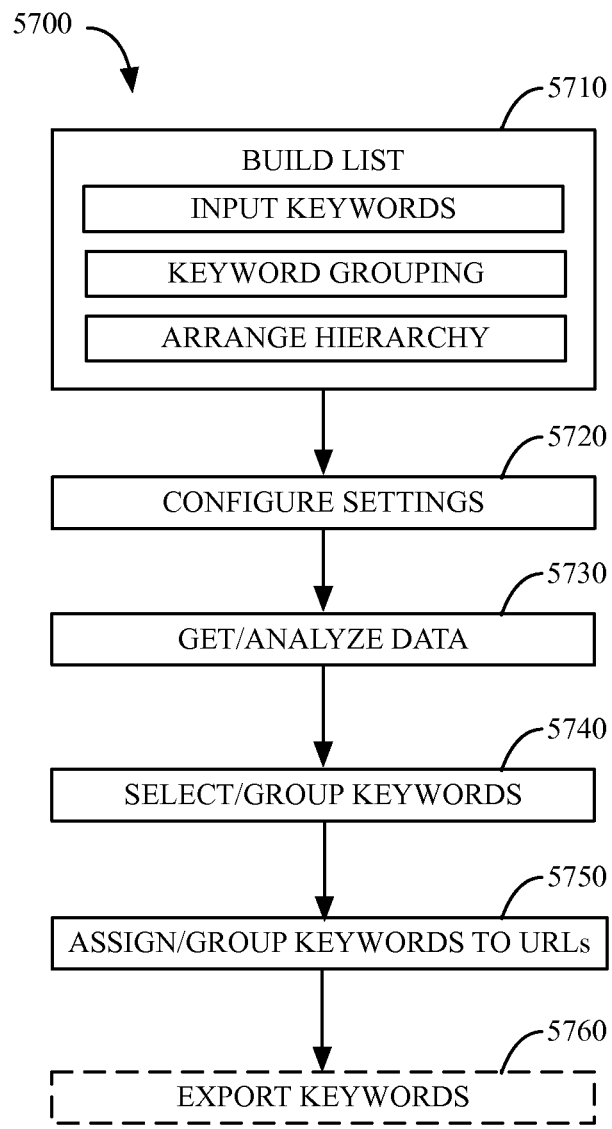
FIG. 57 is a flowchart depicting an idealized workflow for keyword research using the present invention.

Referring now to FIG. 57, a schematic diagram illustrating a user interface element for manipulating and displaying data in accordance with a preferred exemplary embodiment of the present invention is depicted. As shown in FIG. 57, a user may chose to work in a perfectly linear fashion when performing keyword research and the workflow would look like that in FIG. 57. The user would first build a list (step S710) from all available keyword data sources (e.g., imported, manually entered, etc.) and the system could automatically group them and build the hierarchy or the user could do it manually. The user would enter all setting available in the left margin tools such as equivalent terms, required terms, excluded terms (step S720). Then the user can acquire all relevant data such as search volume, cpc, traffic, competition scores etc., then analyze the data perhaps using sorting and filtering functions, select the groups and keywords they want to target, perhaps deleting some keywords or groups, assign the groups/keywords to urls on the site and their keyword research would be complete. They could then optionally export the entire project or just one of the views of the project.

Although FIG. 57 presents one idealized approach, those skilled in the art will recognize that real world keyword research is not typically a linear process. And currently available keyword research tools as well as the most commonly used method of developing keyword strategies using Excel inflict a high cost on users when they deviate from a linear pattern. It is often difficult, time consuming and painful to add keywords at any point in time, pull data for subsets of keywords then later attempt to get data for other keywords in the project, etc.

Figure 58:
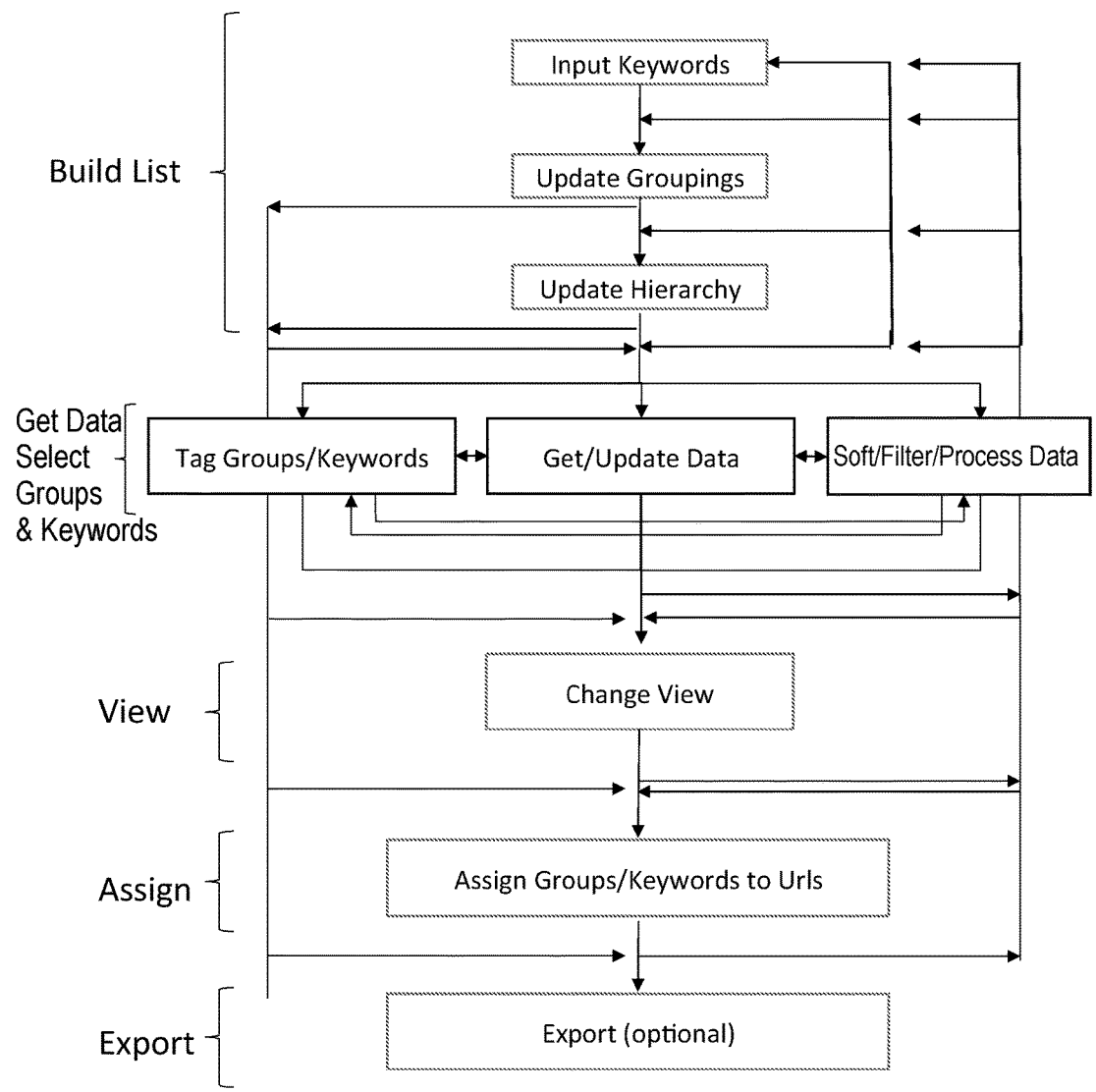
FIG. 58 is a flowchart depicting a real world workflow for keyword research using the present invention.

Referring now to FIG. 58, a keyword search and configuration methodology in accordance with a preferred embodiment of the present invention is depicted. As shown in FIG. 58, the limitations associated with the strictly linear approach to keyword search and configuration may be alleviated these problems the present invention allows the user to work in virtually any order they choose once at least some keywords are in the system. The user can add keywords at any time, get associated data, select keywords/groups, delete keywords/groups, assign keywords/groups to urls, rearrange the hierarchy, add more groups, change excluded terms, required terms, add or delete seed keywords from the seed box, etc.

Just as with word processors such as Microsoft® Word® and photo editing and bitmap graphics editors like Adobe® Photoshop® which allow a user to work in a single workspace to develop complex documents in any order of operations the user chooses the present invention allows users to perform keyword research in an analogously free form way.

The unique nature of the grouping block disclosed in conjunction with the various preferred embodiments of the present invention is what makes this approach possible. By allowing the display to list all keyword in a single view with the associated grouping and hierarchy, including the functions on the grouping blocks, the user is able to iteratively and repeatedly interact, analyze and make selection decisions in a single workspace. This allows the user to "tweak" the keywords, the grouping and hierarchy of the keywords, etc. to achieve the desired results in the most efficient and effective means possible.

The Algorithm

In at least one preferred embodiment of the present invention, the default grouping block algorithm treats all keywords as "unique" and will, accordingly, display each keyword in mutually exclusive keyword groupings.

In the most preferred embodiments of the present invention, the grouping algorithm will count the occurrences of words in each keyword phrase and group the keywords based on the number of occurrences. However, additional algorithms may also be employed and used to enhance the overall performance of the invention.

Sample of Algorithm:

1) Keyword list before grouping:
Motorcycle insurance quotes
Car insurance
Motorcycle insurance quote
Car insurance quotes
Car insurance prices
Motorcycle insurance online
Car insurance price
Car insurances
Motorcycle insurance
Motorcycle insurances
Car insurance quote 2) Count frequency of each individual word
Insurance(s): 11
Car(s): 6
Motorcycle: 5
Quote(s): 4
Price(s): 2
Online 1

3) Create a variation of each keyword phrase where each word from the phrase is ordered left to right by the frequency of its appearance in the entire list (call this the Generic version of the keyword); then group the list containing the original versions of the keywords and the Generic versions of the keywords and by the Generic versions.

For example, in the phrase "motorcycle insurance quotes" the word "insurance" is most frequent in the entire list with a frequency of 11, the word "motorcycle" is the second most frequent with a frequency of 5, the word "quotes" is least frequent with a frequency of 4. So arranging the individual words in this keyword from most frequent to least frequent gives "insurance, motorcycle, quote". Additionally ignore difference between plural and singular words (for example "car" and "cars" are equivalent). Execute this process for each keyword in the list. Here is the result for the entire list:

| Keyword | Words ordered by frequency from most to least frequent (ignoring plural/singular) to form Generic Keyword |
|---|---|
| Motorcycle insurance quotes | Insurance, motorcycle, quote |
| Car insurance | Insurance, car |
| Motorcycle insurance quote | Insurance, motorcycle, quote |
| Car insurance quotes | Insurance, car, quote |
| Car insurance prices | Insurance, car, price |
| Motorcycle insurance online | Insurance, motorcycle, online |
| Car insurance price | Insurance, car, price |
| Car insurances | Insurance, car |
| Motorcycle insurance | Insurance, motorcycle |
| Motorcycle insurances | Insurance, motorcycle |
| Car insurance quote | Insurance, car, quote |

4) Group rows based on identical values in the Generic keyword column (optionally arrange alphabetically)

| Keyword phrase | Generic Keyword phrase |
|---|---|
| Car insurance | Insurance, car |
| Car insurances | Insurance, car |
| Car insurance quote | Insurance, car, quote |
| Car insurance quotes | Insurance, car, quote |
| Car insurance price | Insurance, car, price |
| Car insurance prices | Insurance, car, price |
| Motorcycle insurance | Insurance, motorcycle |
| Motorcycle insurances | Insurance, motorcycle |
| Motorcycle insurance quote | Insurance, motorcycle, quote |
| Motorcycle insurance quotes | Insurance, motorcycle, quote |
| Motorcycle insurance online | Insurance, motorcycle, online |

In the most preferred embodiments of the present invention, a programming language or scripting language is provided so that users can devise their own grouping algorithms. In one preferred embodiment of the present language, the scripting language is called Studio Script™, and also provides for customization of various aspects of the system including controlling how many keywords are returned via API for each specified data source.

As will be appreciated by one skilled in the art, aspects of the computer-based system disclosed herein may be embodied as a system, method or computer program product. Accordingly, aspects of the computer-based system may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the computer-based system for may take the form of a computer program product embodied in one or more computer readable medium(s) having computer readable program code embodied thereon.

Additionally, those skilled in the art will recognize that paid search campaigns are often created and monitored by individuals using various keyword search tools and, accordingly, the present invention is also useful for paid search campaigns and not just organic search campaigns.

Any combination of one or more computer readable medium(s) may be utilized. The computer readable medium may be a computer readable signal medium (transitory or non-transitory) or a fixed computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the computer-based system may be written in any combination of one or more programming languages, including an object oriented programming language such as C#, Objective C, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

From the foregoing description, it should be appreciated that computer-based system 100 and method for data manipulation and display disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A system comprising:
a microprocessor;
a memory coupled to the microprocessor;
a plurality of grouping blocks wherein each of the plurality of grouping blocks displays summary information about at least one keyword contained within each of the plurality of grouping blocks; and
a user interface for displaying and manipulating keywords, the user interface providing a general way to display and interact with groups and hierarchies using at least a first inverted "L" shaped block, wherein the at least a first inverted "L" shaped block represents a single keyword concept.

2. A method comprising the steps of:
manipulating keywords via a user interface;
a plurality of grouping blocks wherein each of the plurality of grouping blocks displays summary information about the keywords contained within each of the plurality of grouping blocks; and
displaying keywords via a user interface, the user interface providing a general way to display and interact with groups and hierarchies using blocks, including an inverted "L" shaped block, wherein at least a first inverted "L" shaped block represents a single keyword concept.

3. The system of claim 1 further comprising at least a second inverted "L" shaped block, the at least a second inverted "L" shaped block represents a single keyword concept and wherein the at least a second inverted "L" shaped block is contiguous on at least two sides to the at least a first inverted "L" shaped block.

4. The system of claim 1 further comprising at least one secondary block wherein the at least a first inverted "L" shaped block and the at least one secondary block share a hereditary relationship.

5. The system of claim 1 wherein the at least a first inverted one "L" shaped block comprises a horizontal leg and a vertical leg with the horizontal leg spanning at least one related keyword concept and with the vertical leg spanning the at least one related keyword concept.

6. The system of claim 1 wherein the user interface displays keyword information regarding volume, cost, rank and other variables related to the single keyword concept represented by the at least one inverted "L" shaped block.

7. The system of claim 1 further comprising at least one secondary block wherein the at least a first inverted "L" shaped block and the secondary blocks share a hereditary relationship and the at least one secondary block contain an additional keyword that is related to the single keyword concept represented by the at least one "L" shaped block.

8. The system of claim 1 wherein the user interface displays a hierarchical relationship that is more than a single horizontal row of related concepts and a single column of vertical concepts are displayed.

9. The system of claim 1 wherein the user interface displays a plurality of hierarchical relationships in a vertical representation and in a horizontal representation related to the single keyword concept represented by the first inverted "L" shaped block and wherein the plurality of hierarchical relationships are dynamically reconfigured by dragging and dropping at least one keyword block.

10. The system of claim 1 further comprising at least a second "L" shaped block, wherein the at least a second inverted "L" shaped block represents an additional keyword concept and wherein the at least a second inverted "L" shaped block and the at least a first inverted "L" shaped block are separated by at least one secondary block wherein the at least one secondary block represents a secondary single keyword concept that is related to the single keyword concept and to the additional keyword concept.

11. The system of claim 1 further comprising a grouping block with a shape other than an inverted "L" shaped block.

12. The system of claim 1 wherein the single keyword concept represents a plurality of associated metrics including search volume, cost per click, and competition level.

13. The system of claim 1 further comprising a plurality of grouping blocks wherein at least one of the plurality of grouping blocks is identified by a user applied tag.

14. The system of claim 1 further comprising a plurality of grouping blocks wherein at least two of the plurality of grouping blocks are dragged and dropped to combine a plurality of keyword concepts associated with the at least two of the plurality of grouping blocks.

15. The system of claim 1 wherein the user interface displays the at least a first "L" shaped block and further displays:

at least a second inverted "L" shaped block, the at least a second inverted "L" shaped block represents a second keyword concept and wherein the at least a second inverted "L" shaped block is contiguous on at least two sides to the at least a first inverted "L" shaped block;

at least one secondary block wherein the at least a first inverted "L" shaped block and the at least one secondary block share a hereditary relationship and the at least one secondary block contain an additional keyword that is related to the single keyword concept represented by the at least one inverted "L" shaped block; and keyword information regarding volume, cost, rank and other variables related to the single keyword concept represented by the at least one inverted "L" shaped block and the at least a second inverted "L" shaped block and the at least one secondary block.

16. The system of claim 15 wherein the at least one secondary block comprises a plurality of secondary blocks and wherein each of the plurality of secondary blocks represents a secondary keyword concept that is related to the single keyword concept represented by the at least one inverted "L" shaped block and the second keyword concept represented by the at least one a second inverted "L" shaped block.

17. The system of claim 16 wherein the single keyword concept, the second keyword concept, and the secondary keyword concept are each derived from a list of related keyword phrases imported from a database via an application programming interface.

18. The method of claim 2 wherein the groups and hierarchies represent at least one hierarchical relationship based on semantics and word definitions.

19. The method of claim 2 wherein the groups and hierarchies represent at least one hierarchical relationship based on categories.

* * * * *